(12) United States Patent
Loginov et al.

(10) Patent No.: US 12,054,000 B2
(45) Date of Patent: Aug. 6, 2024

(54) MAGNETIC ASSEMBLIES AND PROCESSES FOR PRODUCING OPTICAL EFFECT LAYERS COMPRISING ORIENTED NON-SPHERICAL MAGNETIC OR MAGNETIZABLE PIGMENT PARTICLES

(71) Applicant: SICPA HOLDING SA, Prilly (CH)

(72) Inventors: Evgeny Loginov, Renens (CH); Claude-Alain Despland, Prilly (CH)

(73) Assignee: SICPA HOLDING SA, Prilly (CH)

( * ) Notice: Subject to any disclaimer, the term of this patent is extended or adjusted under 35 U.S.C. 154(b) by 488 days.

(21) Appl. No.: 17/598,694

(22) PCT Filed: Feb. 17, 2020

(86) PCT No.: PCT/EP2020/054042
§ 371 (c)(1),
(2) Date: Sep. 27, 2021

(87) PCT Pub. No.: WO2020/193009
PCT Pub. Date: Oct. 1, 2020

(65) Prior Publication Data
US 2022/0144005 A1    May 12, 2022

(30) Foreign Application Priority Data
Mar. 28, 2019 (EP) .................... 19165774

(51) Int. Cl.
*B42D 25/41* (2014.01)
*B05D 3/00* (2006.01)
(Continued)

(52) U.S. Cl.
CPC .......... *B42D 25/369* (2014.10); *B05D 3/067* (2013.01); *B05D 3/20* (2013.01); *B05D 3/207* (2013.01);
(Continued)

(58) Field of Classification Search
CPC .... B42D 25/369; B42D 25/30; B42D 25/387; B42D 25/41; B05D 3/067; B05D 3/20;
(Continued)

(56) References Cited

U.S. PATENT DOCUMENTS 2,570,856 A   10/1951   Pratt et al.
3,676,273 A    7/1972   Graves
(Continued)

FOREIGN PATENT DOCUMENTS

CN    102529326    8/2014
DE    102013015277    3/2015
(Continued)

OTHER PUBLICATIONS

Handbook of Physics, W. Benenson et al., Springer 2002, pp. 463-464.
(Continued)

*Primary Examiner* — Mohamad A Musleh
(74) *Attorney, Agent, or Firm* — Muncy, Geissler, Olds & Lowe, P.C.

(57) ABSTRACT

The present invention relates to the field of magnetic assemblies and processes for producing optical effect layers (OELs) comprising magnetically oriented non-spherical magnetic or magnetizable pigment particles on a substrate. In particular, the present invention relates to magnetic assemblies processes for producing said OELs as anti-counterfeit means on security documents or security articles or for decorative purposes.

20 Claims, 19 Drawing Sheets

(51) Int. Cl.
*B05D 3/06* (2006.01)
*B05D 5/06* (2006.01)
*B42D 25/30* (2014.01)
*B42D 25/369* (2014.01)
*B42D 25/387* (2014.01)

(52) U.S. Cl.
CPC ............. *B05D 5/065* (2013.01); *B42D 25/30* (2014.10); *B42D 25/387* (2014.10); *B42D 25/41* (2014.10)

(58) Field of Classification Search
CPC ......... B05D 3/207; B05D 5/065; G06F 21/34; G06K 19/12
See application file for complete search history.

(56) References Cited

U.S. PATENT DOCUMENTS

| | | | |
|---|---|---|---|
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 2005/0106367 | A1 | 5/2005 | Raksha et al. |
| 2007/0172261 | A1 | 7/2007 | Raksha et al. |
| 2019/0030939 | A1 | 1/2019 | Loginov et al. |

FOREIGN PATENT DOCUMENTS

| | | | | |
|---|---|---|---|---|
| EP | 0686675 | | 2/1998 | |
| EP | 1666546 | | 6/2006 | |
| EP | 1710756 | | 10/2006 | |
| EP | 2157141 | | 2/2010 | |
| EP | 2402401 | | 1/2012 | |
| KR | 20170037898 | A * | 4/2017 | |
| WO | 2002073250 | | 9/2002 | |
| WO | 2003000801 | | 1/2003 | |
| WO | 2005002866 | | 1/2005 | |
| WO | 2006063926 | | 6/2006 | |
| WO | 2007131833 | | 11/2007 | |
| WO | 2008046702 | | 4/2008 | |
| WO | 2008139373 | | 11/2008 | |
| WO | WO-2014108303 | A1 * | 7/2014 | ............... B05D 3/20 |
| WO | 2015082344 | | 6/2015 | |
| WO | 2015086257 | | 6/2015 | |
| WO | 2016026896 | | 2/2016 | |
| WO | 2016083259 | | 6/2016 | |
| WO | WO-2016193252 | A1 * | 12/2016 | ............... B41M 3/14 |
| WO | WO-2017064052 | A1 * | 4/2017 | ............... B05D 3/00 |
| WO | 2018019594 | | 2/2018 | |
| WO | 2018033512 | | 2/2018 | |
| WO | 2018054819 | | 3/2018 | |

OTHER PUBLICATIONS

"Chemistry & Technology of UV & EB Formulation for Coatings, Inks & Paints", vol. IV, Formulation, by C. Lowe, G. Webster, S. Kessel and I. McDonald, 1996 by John Wiley & Sons in association with SITA Technology Limited.

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

Z.Q. Zhu and D. Howe "Halbach permanent magnet machines and applications: a review", IEE. Proc. Electric Power Appl., 2001, 148, p. 299-308.

Magnetic Materials, Fundamentals and Applications, 2nd Ed., Nicola A. Spaldin, p. 16-17, Cambridge University Press, 2011.

Handbook of Condensed Matter and Materials Data, Chap. 4.3.2, Soft Magnetic Materials, W. Martienssen et al., p. 758-793, and Chap. 4.3.4, Magnetic Oxides, p. 811-813, Springer 2005.

Ferromagnetic Materials, vol. 1, Iron, Cobalt and Nickel, E.P. Wohlfarth, p. 1-70, Elsevier 1999.

Ferromagnetic Materials, vol. 2, G.Y. Chin et al., Chap. 2, Soft Magnetic Metallic Materials, p. 55-188, and Chap. 3, Ferrites for non-microwave Applications, p. 189-241, Elsevier 1999.

Electric and Magnetic Properties of Metals, C. Moosbrugger, Chap. 8, Magnetically Soft Materials, p. 196-209, ASM International, 2000.

Handbook of modern Ferromagnetic Materials, A. Goldman, Chap. 9, High-permeability High-frequency Metal Strip, p. 155-182, Kluwer Academic Publishers, 2002.

Smithells Metals Reference Book, E.A. Brandes, Chap. 20.3, Magnetically Soft Materials, p. 20-9-20-16, Butterworth-Heinemann Ltd, 1992.

International Search Report and Written Opinion issued with respect to application No. PCT/EP2020/054042.

Notification of First Chinese Office Action in counterpart Chinese Patent Application No. 202080025885.4 dated Sep. 5, 2022 (and English language translation of Office Action).

* cited by examiner

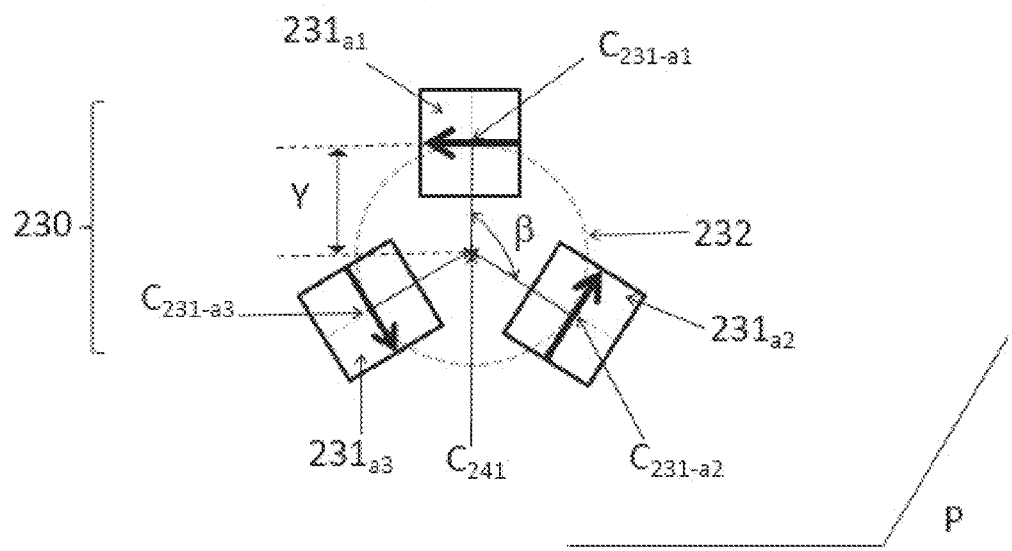
Fig. 2B
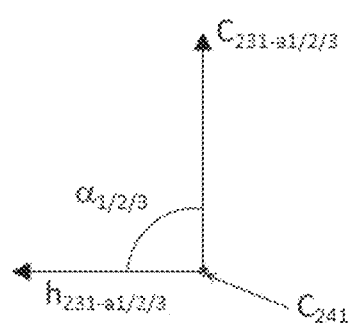

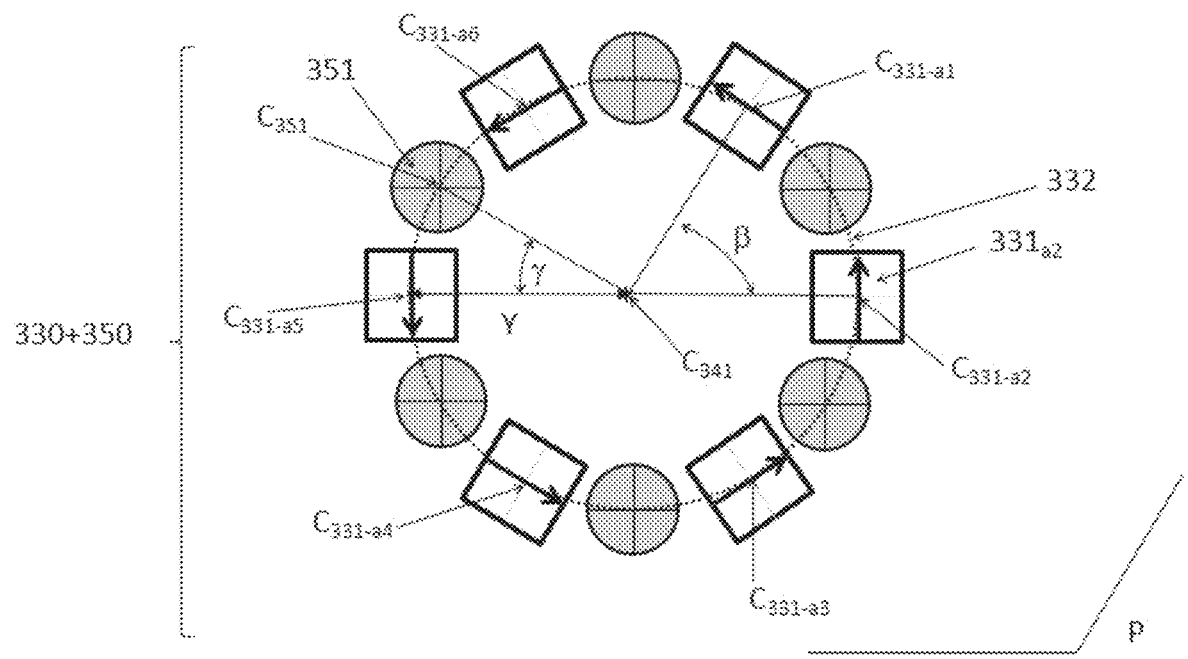
Fig. 3B
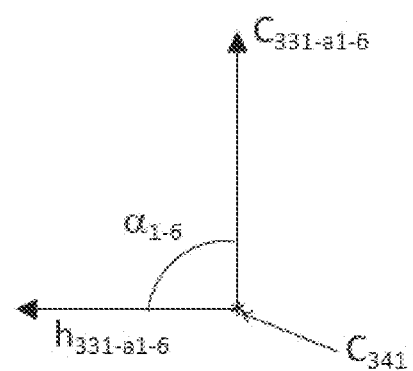

−20°  　　0°  　　20°

−20°   0°   20°

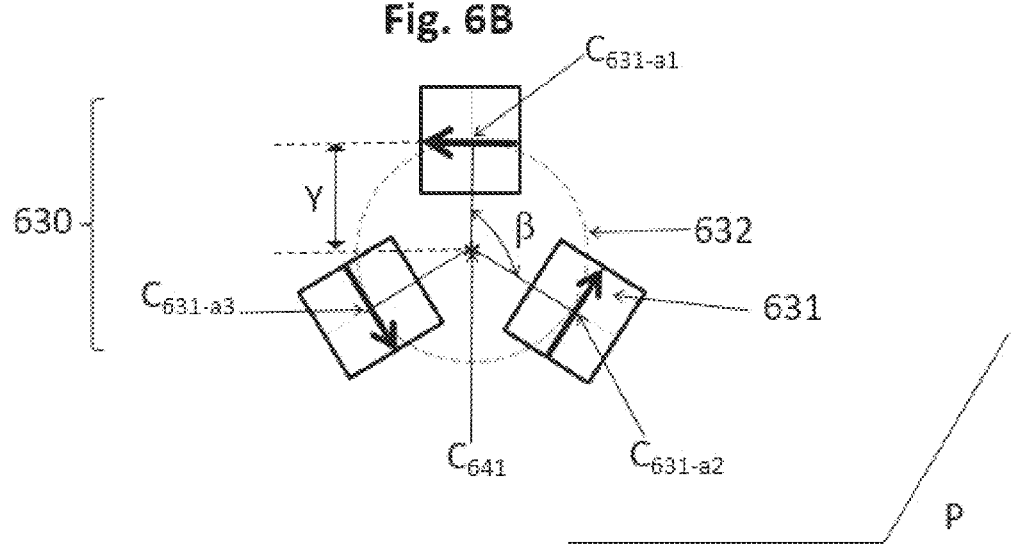
Fig. 6B
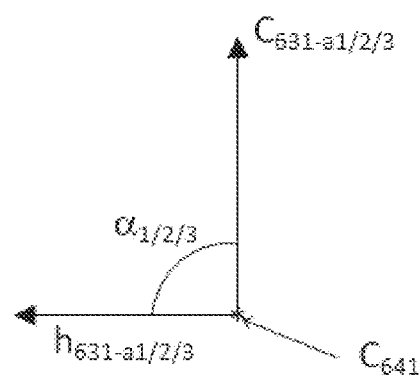

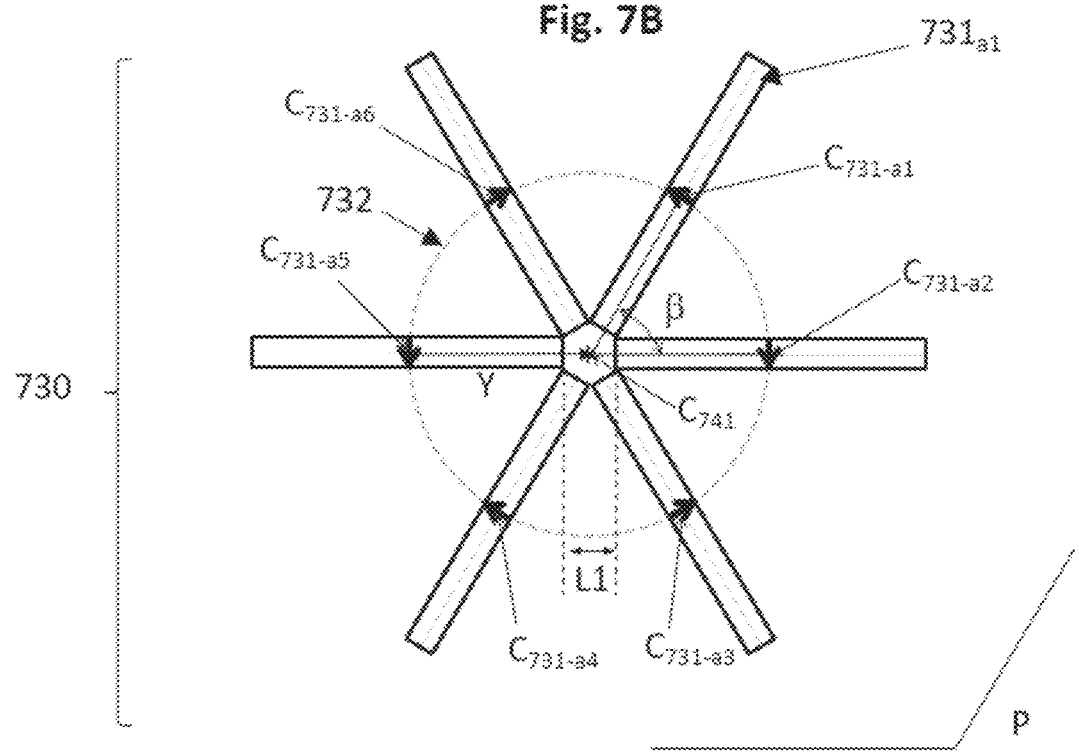
Fig. 7B
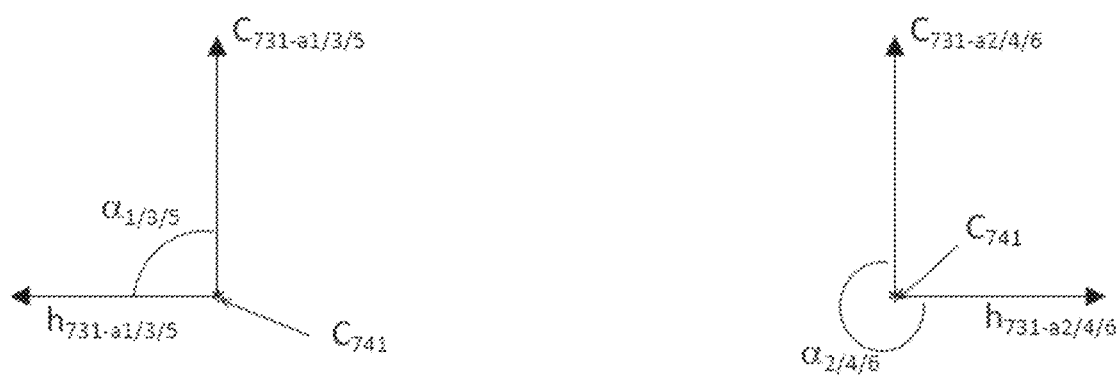

-20°    0°    20°

MAGNETIC ASSEMBLIES AND PROCESSES FOR PRODUCING OPTICAL EFFECT LAYERS COMPRISING ORIENTED NON-SPHERICAL MAGNETIC OR MAGNETIZABLE PIGMENT PARTICLES

FIELD OF THE INVENTION

The present invention relates to the field of the protection of value documents and value or branded commercial goods against counterfeit and illegal reproduction. In particular, the present invention relates to processes for producing optical effect layers (OELs) showing a viewing-angle dynamic appearance and optical effect layers obtained thereof, as well as to uses of said OELs as anti-counterfeit means on documents and articles.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features for security documents and articles can be classified into "covert" and "overt" security features. The protection provided by covert security features relies on the concept that such features are hidden to the human senses, typically requiring specialized equipment and knowledge for their detection, whereas "overt" security features are easily detectable with the unaided human senses. Such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local orientation of the magnetic or magnetizable pigment particles in the unhardened coating, followed by hardening the latter to fix the particles in their positions and orientations. This results in specific optical effects, i.e. fixed magnetically induced images, designs or patterns which are highly resistant to counterfeiting. The security elements based on oriented magnetic or magnetizable pigment particles can only be produced by having access to both, the magnetic or magnetizable pigment particles or a corresponding ink or coating composition comprising said particles, and the particular technology employed for applying said ink or coating composition and for orienting said pigment particles in the applied ink or coating composition, followed by hardening said ink or composition.

A particularly striking optical effect can be achieved if a security feature changes its appearance upon a change in viewing conditions, such as the viewing angle. One example is the so-called "rolling bar" effect, as disclosed in US 2005/0106367. A "rolling bar" effect is based on pigment particles orientation imitating a curved surface across the coating. The observer sees a specular reflection zone which moves away or towards the observer as the image is tilted. This effect is nowadays utilized for a number of security elements on banknotes, such as on the "5" and the "10" of the 5 respectively 10 Euro banknote.

A need remains for magnetic assemblies and processes for producing optical effect layers (OELs) based on magnetically oriented magnetic or magnetizable pigment particles in inks or coating compositions, wherein said magnetic assemblies and processes are reliable, easy to implement and able to work at a high production speed while allowing the production of OELs exhibiting a dynamic effect and being difficult to produce on a mass-scale with the equipment available to a counterfeiter.

SUMMARY OF THE INVENTION

Accordingly, it is an object of the present invention to provide magnetic assemblies (x00) for producing an optical effect layer (OEL) on a substrate (x20), said magnetic assembly (x00) being configured for receiving the substrate (x20) in an orientation substantially parallel to a first plane (P) and above the first plane (P), and further comprising:

a) a first magnetic-field generating device (x30) comprising three or more first dipole magnets $x31_{ai}$ ($x31_{a1}$, $x31_{a2}$, ... ), each of said first dipole magnets having its center $C_{x31\text{-}ai}$ ($C_{x31\text{-}a1}$, $C_{x31\text{-}a2}$, ...) disposed on a loop (x32) in the first plane (P), wherein said first dipole magnets $x31_{ai}$ ($x31_{a1}$, $x31_{a2}$, ... ) have their magnetic axes oriented to be substantially parallel to the first plane (P), wherein said first dipole magnets $x31_{ai}$ ($x31_{a1}$, $x31_{a2}$, ...) are at least partially embedded in a supporting matrix (x33); and b) a second magnetic-field generating device (x40) comprising a second dipole magnet x41 having its magnetic axis oriented to be substantially perpendicular to the first plane (P) and being arranged to have a projection of its center on the first plane (P) be located at a projection point $C_{x41}$ within the loop (x32), wherein the second magnetic-field generating device (x40) is disposed above the first magnetic-field generating device (x30), wherein angles $\alpha_i$ are formed between each of the vectors $\overrightarrow{C_{x41}C_{x31\text{-}ai}}$ (such as $\overrightarrow{C_{x41}C_{x31\text{-}a1}}$, $\overrightarrow{C_{x41}C_{x31\text{-}a2}}$, ..., i=1, 2, etc.) and the vector $\overrightarrow{h_{x31\text{-}ai}}$ (such as $\overrightarrow{h_{31\text{-}a1}}$, $\overrightarrow{h_{31\text{-}a2}}$, ..., i=1, 2, etc.) of the magnetic axis of the respective first dipole magnet $x31_{ai}$ ($x31_{a1}$, $x31_{a2}$, ... i=1, 2, etc.), wherein all of the angles $\alpha_i$, when measured in a counterclockwise direction, are in the range from about 20° to about 160° or in the range from about 200° to about 340°, wherein each of the first dipole magnets $x31_{ai}$ ($x31_{a1}$, $x31_{a2}$, ...) is disposed at a first distance ($Y_i$), said first distance ($Y_i$)) being on the first plane (P) between the projection point $C_{x41}$ and the center $C_{x31\text{-}ai}$ ($C_{x31\text{-}a1}$, $C_{x31\text{-}a2}$, ...) of the first dipole magnet $x31_{ai}$ ($x31_{a1}$, $x31_{a2}$, ...). Also described herein are printing apparatuses comprising a rotating magnetic cylinder comprising one or more of the magnetic assemblies (x00) described herein or a flatbed printing unit comprising one or more of the magnetic assemblies (x00) described herein, or a belt comprising one or more of the magnetic assemblies (x00) described herein, wherein said printing apparatuses are suitable for producing the optical effect layer (OEL) described herein on a substrate such as those described herein. Also described herein are uses of the printing apparatuses described herein for producing the optical effect layer (OEL) described herein on a substrate such as those described herein.

Also described herein are processes for producing the optical effect layer (OEL) described herein on a substrate (x20), said processes comprise the steps of:

i) applying on a substrate (x20) a radiation curable coating composition comprising non-spherical magnetic or magnetizable pigment particles, said radiation curable coating composition being in a first state so as to form a coating layer (x10);

ii) exposing the radiation curable coating composition to a magnetic field of a static magnetic assembly (x00) described herein so as to orient at least a part of the non-spherical magnetic or magnetizable pigment particles;

iii) at least partially curing the radiation curable coating composition of step ii) to a second state so as to fix the non-spherical magnetic or magnetizable pigment particles in their adopted positions and orientations.

Also described herein are methods of manufacturing a security document or a decorative element or object, comprising a) providing a security document or a decorative element or object, and b) providing an optical effect layer (OEL) such as those described herein, in particular such as those obtained by the process described herein, so that it is comprised by the security document or decorative element or object.

BRIEF DESCRIPTION OF DRAWINGS

FIG. 2B schematically illustrates a top view of the first magnetic-field generating device (230) of the magnetic assembly (200) of FIG. 2A, wherein each of the three first dipole magnets ($231_{a1}$, $231_{a2}$, $231_{a3}$) of said first magnetic-field generating device (230) has its center ($C_{231-a1}$, $C_{231-a2}$ and $C_{231-a3}$) disposed on a ring (232). The three first dipole magnets ($231_{a1}$, $231_{a2}$, $231_{a3}$) have their magnetic axes substantially tangential to the ring (232) (i.e. the three angles $\alpha_{1/2/3}$ ($\alpha_1$, $\alpha_2$ and $\alpha_3$) are equal to each other, said angles $\alpha_{1/2/3}$ being 90° at the position of their respective center ($C_{231-a1}$, $C_{231-a2}$ and $C_{231-a3}$).

FIG. 3B schematically illustrates a top view of the first magnetic-field generating device (330) and third magnetic-field generating device (350) of the magnetic assembly (300) of FIG. 3A, wherein each of the six first dipole magnets ($331_{a1}$, ..., $331_{a6}$) of the first magnetic-field generating device (330) has its center disposed on a ring (332) and wherein each of the six third dipole magnets (351) of the third magnetic-field generating device (350) has its center ($C_{351}$) disposed on the ring (332). The first dipole magnets ($331_{a1}$, ..., $331_{a6}$) of the first magnetic-field generating device (330) and the dipole magnet (351) of the third magnetic-field generating device (350) are disposed in an alternating manner on the ring (332). The six first dipole magnets ($331_{a1}$, ..., $331_{a6}$) have their magnetic axes substantially tangential to the ring (332) (i.e. the six angles $\alpha_{1-6}$ ($\alpha_1$, ..., $\alpha_6$) are equal to each other, said angles $\alpha_{1-6}$ being 90° at the position of their respective center ($C_{331-a1}$, ..., $C_{331-a6}$).

FIG. 6B schematically illustrates a top view of the first magnetic-field generating device (630) of the magnetic assembly (600) of FIG. 6A, wherein each of the three first dipole magnets ($631_{a1}, 631_{a2}, 631_{a3}$) of the first magnetic-field generating device (630) has its center $C_{631-a1}, C_{631-a2}$ and $C_{61-a3}$) disposed on a ring (632) and has its magnetic axis substantially tangential to the ring (632) (i.e. the three angles $\alpha_{1/2/3}$ ($\alpha_1, \alpha_2$ and $\alpha_3$) are equal to each other, said angles $\alpha_{1/2/3}$ being 90° at the position of the respective center ($C_{631-a1}, C_{631-a2}$ and $C_{61-a3}$).

FIG. 7B schematically illustrates a top view of the first magnetic-field generating device (730) of the magnetic assembly (700) of FIG. 7A, wherein each of the six first dipole magnets ($731_{a1}, \ldots, 731_{a6}$) of the first magnetic-field generating device (730) has its center ($C_{731-a1}, \ldots, C_{731-a6}$) disposed on a ring (732) and has its magnetic axis substantially tangential to the ring (732) (i.e. three angles $\alpha_{1/3/5}$ ($\alpha_1, \alpha_3$ and $\alpha_5$) are equal to each other, said angles $\alpha_{1/3/5}$ being 90° and three $\alpha_{2/4/6}$ ($\alpha_2, \alpha_4$ and $\alpha_4$) are equal to each other, said angles $\alpha_{2/4/6}$ being 270° at the position of the respective center ($C_{731-a1}, \ldots, C_{731-a6}$).

DETAILED DESCRIPTION

Definitions

Figure 1A:
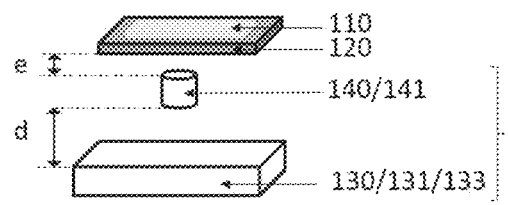
FIG. 1A-E schematically illustrate magnetic assemblies (100) for producing an optical effect layer (OEL) on a substrate (120) according to the present invention, wherein said magnetic assemblies (100) comprise a first magnetic-field generating device (130), a second magnetic-field generating device (140), optionally a third magnetic-field generating device (150) (not shown in FIG. 1), optionally one or more pole pieces (160), optionally a fourth magnetic-field generating device (170) and optionally a magnetized plate (180).

The following definitions apply to the meaning of the terms employed in the description and recited in the claims.

As used herein, the indefinite article "a" indicates one as well as more than one, and does not necessarily limit its referent noun to the singular.

As used herein, the term "about" means that the amount or value in question may be the specific value designated or some other value in its neighborhood. Generally, the term "about" denoting a certain value is intended to denote a range within ±5% of that value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The term "substantially parallel" refers to deviating not more than 10° from parallel alignment and the term "substantially perpendicular" refers to deviating not more than 10° from perpendicular alignment.

As used herein, the term "and/or" means that either both or only one of the elements linked by the term is present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance solution composition comprising a compound A may include other compounds besides A. However, the term "comprising" also covers, as a particular embodiment thereof, the more restrictive meanings of "consisting essentially of" and "consisting of", so that for instance "a composition comprising A, B and optionally C" may also (essentially) consist of A and B, or (essentially) consist of A, B and C.

The term "coating composition" refers to any composition which is capable of forming a coating, in particular an optical effect layer (OEL) described herein, on a solid substrate, and which can be applied, preferably but not exclusively, by a printing method. The coating composition described herein comprises at least a plurality of non-spherical magnetic or magnetizable pigment particles and a binder.

The term "optical effect layer (OEL)" as used herein denotes a layer that comprises at least a plurality of magnetically oriented non-spherical magnetic or magnetizable pigment particles and a binder, wherein the non-spherical magnetic or magnetizable pigment particles are fixed or frozen (fixed/frozen) in position and orientation within said binder.

A "pigment particle", in the context of the present disclosure, designates a particulate material, which is insoluble in the ink or coating composition, and which provides the latter with specific spectral properties (e.g. opacity, color or colorshift).

For each first dipole magnet $x31_{ai}$ ($x31_{a1}, x31_{a2}, \ldots$, i=1, 2, etc.), the vector $\overrightarrow{C_{x41}C_{x31\text{-}ai}}$ ($\overrightarrow{C_{x41}C_{x31\text{-}a1}}, \overrightarrow{C_{x41}C_{x31\text{-}a2}}, \ldots$, i=1, 2, etc.) refers to the vector between the projection point $C_{x41}$ of the second dipole magnet x41 and the center $C_{x31\text{-}ai}$ ($C_{x31\text{-}a1}, C_{x31\text{-}a2}, \ldots$) of said first dipole magnet $x31_{ai}$ ($x31_{a1}, x31_{a2}, \ldots$, i=1, 2, etc.), wherein $\overrightarrow{C_{x41}C_{x31\text{-}a1}}$ corresponds to said vector for a first first dipole magnet $x31_{a1}$ (i=1), $\overrightarrow{C_{x41}C_{x31\text{-}a2}}$ corresponds to said vector for a second first dipole magnet $x31_{a2}$ (i=2), and $\overrightarrow{C_{x41}C_{x31\text{-}a3}}$ corresponds to said vector for a third first dipole magnet $x31_{a3}$ (i=3).

The term "magnetic axis" denotes a theoretical line connecting the magnetic centers of the North- and South-pole faces of a magnet and extending through said pole faces. This term does not include any specific magnetic field direction.

The term "magnetic direction" denotes the direction of the magnetic field vector along a magnetic field line pointing, at the exterior of a magnet, from its North pole to its South pole (see Handbook of Physics, Springer 2002, pages 463-464).

In the context of the present invention, the term "vector of the magnetic axis" denotes a unit vector, $\overrightarrow{h_{x31\text{-}ai}}$, connecting the magnetic centers of the North pole and South pole faces of a magnet and going from the South pole to the North pole.

The vectors of the magnetic axis $\overrightarrow{h_{x31\text{-}ai}}$, of the first dipole magnet $x31_{a1}$ ($x31_{a1}, x31_{a2}, \ldots$) are illustrated by arrows in FIG. 2B-9B, with the end of the arrow corresponding to the North pole, wherein $\overrightarrow{h_{x31\text{-}a1}}$ corresponds to said vector for a first first dipole magnet $x31_{a1}$ (i=1), $\overrightarrow{h_{x31\text{-}a2}}$ corresponds to said vector for a second first dipole magnet $x31_{a2}$ (i=2), and $\overrightarrow{h_{x31\text{-}a3}}$ corresponds to said vector fora third first dipole magnet $x31_{a3}$ (i=3).

As used herein, the term "at least" defines a determined quantity or more than said quantity, for example "at least one" means one, two or three, etc.

The term "security document" refers to a document which is protected against counterfeit or fraud by at least one security feature. Examples of security documents include, without limitation, currency, value documents, identity documents, etc.

The term "security feature" denotes an overt or a covert image, pattern, or graphic element that can be used for the authentication of the document or article carrying it.

Where the present description refers to "preferred" embodiments/features, combinations of these "preferred" embodiments/features shall also be deemed to be disclosed as preferred, as long as this combination of "preferred" embodiments/features is technically meaningful.

The present invention provides magnetic assemblies (x00) and processes using said magnetic assemblies (x00) for producing optical effect layers (OELs), said OELs comprising a plurality of non-randomly oriented non-spherical magnetic or magnetizable pigment particles, said pigment particles being dispersed within a hardened/cured material and optical effects layers (OELs) obtained thereof. Thanks to the orientation pattern of said magnetic or magnetizable pigment particles, the OEL described herein provides the optical impression of one loop-shaped body surrounded by one or more loop-shaped bodies, wherein said one or more one or more loop-shaped bodies have their shape and/or their brightness varying upon tilting the optical effect layer (OEL).

The magnetic assemblies (x00) described herein are configured for receiving the substrate (x20) described herein in an orientation substantially parallel to a first plane (P).

The present invention provides processes and methods for producing the optical effect layer (OEL) described herein on the substrate described herein, and the optical effect layers (OELs) obtained therewith. wherein said methods comprise a step i) of applying on the substrate surface the radiation curable coating composition comprising non-spherical magnetic or magnetizable pigment particles described herein, said radiation curable coating composition being in a first state, i.e. a liquid or pasty state, wherein the radiation curable coating composition is wet or soft enough, so that the non-spherical magnetic or magnetizable pigment particles dispersed in the radiation curable coating composition are freely movable, rotatable and/or orientable upon exposure to the magnetic field.

The step i) described herein may be carried by a coating process such as for example roller and spray coating processes or by a printing process. Preferably, the step i) described herein is carried out by a printing process preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Subsequently to, partially simultaneously with or simultaneously with the application of the radiation curable coating composition described herein on the substrate surface described herein (step i)), at least a part of the non-spherical magnetic or magnetizable pigment particles are oriented (step ii)) by exposing the radiation curable coating composition to the magnetic field of the magnetic assembly (x00) described herein, so as to align at least a part of the non-spherical magnetic or magnetizable pigment particles along the magnetic field lines generated by the assembly (x00).

Subsequently to or partially simultaneously with the step of orienting/aligning at least a part of the non-spherical magnetic or magnetizable pigment particles by applying the magnetic field described herein, the orientation of the non-spherical magnetic or magnetizable pigment particles is fixed or frozen. The radiation curable coating composition must thus noteworthy have a first state, i.e. a liquid or pasty state, wherein the radiation curable coating composition is wet or soft enough, so that the non-spherical magnetic or magnetizable pigment particles dispersed in the radiation curable coating composition are freely movable, rotatable and/or orientable upon exposure to the magnetic field, and a second cured (e.g. solid) state, wherein the non-spherical magnetic or magnetizable pigment particles are fixed or frozen in their respective positions and orientations.

Accordingly, the processes for producing an optical effect layer (OEL) on the substrate (x20) described herein comprises a step iii) of at least partially curing the radiation curable coating composition of step ii) to a second state so as to fix the non-spherical magnetic or magnetizable pigment particles in their adopted positions and orientations. The step iii) of at least partially curing the radiation curable coating composition may be carried out subsequently to or partially simultaneously with the step of orienting/aligning at least a part of the non-spherical magnetic or magnetizable pigment particles by applying the magnetic field described herein (step ii)). Preferably, the step iii) of at least partially curing the radiation curable coating composition is carried out partially simultaneously with the step of orienting/aligning at least a part of the non-spherical magnetic or magnetizable pigment particles by applying the magnetic field described herein (step ii)). By "partially simultaneously", it is meant that both steps are partly performed simultaneously, i.e. the times of performing each of the steps partially overlap. In the context described herein, when curing is performed partially simultaneously with the orientation step ii), it must be understood that curing becomes effective after the orientation so that the pigment particles orient before the complete or partial curing or hardening of the OEL.

The first and second states of the radiation curable coating composition are provided by using a certain type of radiation curable coating composition. For example, the components of the radiation curable coating composition other than the non-spherical magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical magnetic or magnetizable pigment particles are fixed in their current positions and orientations and can no longer move nor rotate within the binder material. As known to those skilled in the art, ingredients comprised in a radiation curable coating composition to be applied onto a surface such as a substrate and the physical properties of said radiation curable coating composition must fulfil the requirements of the process used to transfer the radiation curable coating composition to the substrate surface. Consequently, the binder material comprised in the radiation curable coating composition described herein is typically chosen among those known in the art and depends on the coating or printing process used to apply the radiation curable coating composition and the chosen radiation curing process.

In the optical effect layers (OELs) described herein, the non-spherical magnetic or magnetizable pigment particles described herein are dispersed in the cured/hardened radiation curable coating composition comprising a cured binder material that fixes/freezes the orientation of the magnetic or magnetizable pigment particles. The cured binder material is at least partially transparent to electromagnetic radiation of a range of wavelengths comprised between 200 nm and 2500 nm. The binder material is thus, at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum, such that the particles comprised in the binder material in its cured or solid state and their orientation-dependent reflectivity can be perceived through the binder material. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 µm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. The infrared, visible and UV portions of the electromagnetic spectrum approximately correspond to the wavelength ranges between 700-2500 nm, 400-700 nm, and 200-400 nm respectively.

As mentioned hereabove, the radiation curable coating composition described herein depends on the coating or printing process used to apply said radiation curable coating composition and the chosen curing process. Preferably, curing of the radiation curable coating composition involves a chemical reaction which is not reversed by a simple temperature increase (e.g. up to 80° C.) that may occur during a typical use of an article comprising the OEL described herein. The term "curing" or "curable" refers to processes including the chemical reaction, crosslinking or polymerization of at least one component in the applied radiation curable coating composition in such a manner that it turns into a polymeric material having a greater molecular weight than the starting substances. Radiation curing advantageously leads to an instantaneous increase in viscosity of the radiation curable coating composition after exposure to the curing irradiation, thus preventing any further movement of the pigment particles and in consequence any loss of information after the magnetic orientation step. Preferably, the curing step (step iii)) is carried out by radiation curing including UV-visible light radiation curing or by E-beam radiation curing, more preferably by UV-Vis light radiation curing.

Therefore, suitable radiation curable coating compositions for the present invention include radiation curable compositions that may be cured by UV-visible light radiation (hereafter referred as UV-Vis light radiation) or by E-beam radiation (hereafter referred as EB radiation). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited. According to one particularly preferred embodiment of the present invention, the radiation curable coating composition described herein is a UV-Vis radiation curable coating composition. Therefore, a radiation curable coating composition comprising non-spherical magnetic or magnetizable pigment particles described herein is preferably at least partially cured by UV-Vis light radiation, preferably by narrow-bandwidth LED light in the UV-A (315-400 nm) or blue (400-500 nm) spectral region, most preferable by a high-power LED source emitting in the 350 nm to 450 nm spectral region, with a typical emission bandwidth in the 20 nm to 50 nm range. UV radiation from mercury vapor lamps or doped mercury lamps can also be used to increase the curing rate of the radiation curable coating composition.

Preferably, the UV-Vis radiation curable coating composition comprises one or more compounds selected from the group consisting of radically curable compounds and cationically curable compounds. The UV-Vis radiation curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the radiation curable coating composition. Radically curable compounds are cured by free radical mechanisms typically including the activation by radiation of one or more photoinitiators, thereby generating radicals which in turn initiate the polymerization so as to cure the radiation curable coating composition. Depending on the monomers, oligomers or prepolymers used to prepare the binder comprised in the UV-Vis radiation curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diary) iodoinium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis radiation curable coating compositions are preferably present in a total amount from about 0.1 wt-% to about 20 wt-%, more preferably about 1 wt-% to about 15 wt-%, the weight percents being based on the total weight of the UV-Vis radiation curable coating compositions.

The radiation curable coating composition described herein may further comprise one or more marker substances or taggants and/or one or more machine readable materials selected from the group consisting of magnetic materials (different from the platelet-shaped magnetic or magnetizable pigment particles described herein), luminescent materials, electrically conductive materials and infrared-absorbing materials. As used herein, the term "machine readable material" refers to a material x32 which can be comprised in a layer so as to confer a way to authenticate said layer or article comprising said layer by the use of a particular equipment for its authentication.

The radiation curable coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the shelf life (polymerization inhibitors), the gloss etc. Additives described herein may be present in the radiation curable coating composition in amounts and in forms known in the art, including so-called nano-materials where at least one of the dimensions of the additive is in the range of 1 to 1000 nm.

The radiation curable coating composition described herein comprises the non-spherical magnetic or magnetizable pigment particles described herein. Preferably, the non-spherical magnetic or magnetizable pigment particles are present in an amount from about 2 wt-% to about 40 wt-%, more preferably about 4 wt-% to about 30 wt-%, the weight percents being based on the total weight of the radiation curable coating composition comprising the binder material, the non-spherical magnetic or magnetizable pigment particles and other optional components of the radiation curable coating composition.

The non-spherical magnetic or magnetizable pigment particles are preferably prolate or oblate ellipsoid-shaped, platelet-shaped or needle-shaped particles or a mixture of two or more thereof and more preferably platelet-shaped particles.

Non-spherical magnetic or magnetizable pigment particles described herein are defined as having, due to their non-spherical shape, non-isotropic reflectivity with respect to an incident electromagnetic radiation for which the cured or hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation. The non-spherical magnetic or magnetizable pigment particles described herein are preferably platelet-shaped magnetic or magnetizable pigment particles.

The process for producing the optical effect layer (OEL) described herein may further comprise, for embodiments with platelet-shaped magnetic or magnetizable pigment particles, prior to or at least partially simultaneously with step ii) a step (step ii2)) of exposing the coating layer (x10) to a dynamic magnetic field of a device so as to bi-axially orient at least a part of the platelet-shaped magnetic or magnetizable pigment particles, said step being carried out prior to or partially simultaneously with step ii) and before step iii). Processes comprising such a step of exposing a coating composition to a dynamic magnetic field of a device so as to bi-axially orient at least a part of the platelet-shaped magnetic or magnetizable pigment particles are disclosed in WO 2015/086257 A1. Subsequently to the exposure of the coating layer (x10) to the magnetic field of the magnetic assembly (x30) described herein and while the coating layer (x10) is still wet or soft enough so that the platelet-shaped I magnetic or magnetizable pigment particles therein can be further moved and rotated, the platelet-shaped magnetic or magnetizable pigment particles are further re-oriented by the use of the device described herein. Carrying out a bi-axial orientation means that platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the dynamic magnetic field. Effectively, this results in neighboring the magnetic or magnetizable particles magnetic or magnetizable pigment particles that are close to each other in space to be essentially parallel to each other. In order to perform a bi-axial orientation, the magnetic or magnetizable particles magnetic or magnetizable pigment particles must be subjected to a strongly time-dependent external magnetic field.

Particularly preferred devices for bi-axially orienting the magnetic or magnetizable particles magnetic or magnetizable pigment particles are disclosed in EP 2 157 141 A1. The device disclosed in EP 2 157 141 A1 provides a dynamic magnetic field that changes its direction forcing the magnetic or magnetizable particles magnetic or magnetizable pigment particles to rapidly oscillate until both main axes, X-axis and Y-axis, become substantially parallel to the substrate surface, i.e. the magnetic or magnetizable particles magnetic or magnetizable pigment particles rotate until they come to the stable sheet-like formation with their X and Y axes substantially parallel to the substrate surface and are planarized in said two dimensions. Other particularly preferred devices for bi-axially orienting the magnetic or magnetizable particles magnetic or magnetizable pigment particles comprise linear permanent magnet Halbach arrays, i.e. assemblies comprising a plurality of magnets with different magnetization directions. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side while being weakened almost to zero on the other side. WO 2016/083259 A1 discloses suitable devices for bi-axially orienting magnetic or magnetizable particles magnetic or magnetizable pigment particles, wherein said devices comprise a Halbach cylinder assembly. Other particularly preferred for bi-axially orienting the magnetic or magnetizable particles magnetic or magnetizable pigment particles are spinning magnets, said magnets comprising disc-shaped spinning magnets or magnetic assemblies that are essentially magnetized along their diameter. Suitable spinning magnets or magnetic assemblies are described in US 2007/0172261 A1, said spinning magnets or magnetic assemblies generate radially symmetrical time-variable magnetic fields, allowing the bi-orientation of magnetic or magnetizable particles magnetic or magnetizable pigment particles of a not yet cured or hardened coating composition. These magnets or magnetic assemblies are driven by a shaft (or spindle) connected to an external motor. CN 102529326 B discloses examples of devices comprising spinning magnets that might be suitable for bi-axially orienting magnetic or magnetizable particles magnetic or magnetizable pigment particles. In a preferred embodiment, suitable devices for bi-axially orienting magnetic or magnetizable particles magnetic or magnetizable pigment particles are shaft-free disc-shaped spinning magnets or magnetic assemblies constrained in a housing made of non-magnetic, preferably non-conducting, materials and are driven by one or more magnet-wire coils wound around the housing. Examples of such shaft-free disc-shaped spinning magnets or magnetic assemblies are disclosed in WO 2015/082344 A1, WO 2016/026896 A1 and in the co-pending European application 17153905.9.

Suitable examples of non-spherical magnetic or magnetizable pigment particles described herein include without limitation pigment particles comprising a magnetic metal selected from the group consisting of cobalt (Co), iron (Fe), gadolinium (Gd) and nickel (Ni); magnetic alloys of iron, chromium, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{16}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetizable pigment particles described herein include without limitation pigment particles comprising a magnetic layer M made from one or more of a magnetic metal such as cobalt (Co), iron (Fe), gadolinium (Gd) or nickel (Ni); and/or a magnetic alloy of iron, chromium, cobalt or nickel, wherein said magnetic or magnetizable pigment particles may be multilayered structures comprising one or more additional layers.

Preferably, the one or more additional layers are layers A independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), preferably the metal fluoride is magnesium fluoride ($MgF_2$); oxides such as silicon oxide (SiO), silicon dioxide ($SiO_2$), titanium oxides ($TiO_2$), zinc sulphide (ZnS) and aluminum oxide ($Al_2O_3$), preferably silicon dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, still more preferably selected from the group consisting of aluminum (Al), chromium (Cr), nickel (Ni) and alloys thereof, and even more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

According to one embodiment, at least a part of the non-spherical magnetic or magnetizable pigment particles described herein are dielectric/reflector/magnetic/reflector/dielectric multilayer structures, wherein the reflector layers described herein are independently and preferably made from one or more selected from the group consisting of metals and metal alloys, preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof and more preferably aluminum (Al), wherein the dielectric layers are independently and preferably made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), preferably the metal fluoride is magnesium fluoride ($MgF_2$); oxides such as silicon oxide (SiO), silicon dioxide ($SiO_2$), titanium oxides ($TiO_2$), zinc sulphide (ZnS) and aluminum oxide ($Al_2O_3$), preferably silicon dioxide ($SiO_2$); and wherein the magnetic layer is preferably made from one or more of a magnetic metal such as cobalt (Co), iron (Fe), gadolinium (Gd) or nickel (Ni); and/or a magnetic alloy of iron, chromium, cobalt or nickel. Alternatively, the dielectric/reflector/magnetic/reflector/dielectric/multilayer structures described herein may be multilayer pigment particles being considered as safe for human health and the environment, wherein said magnetic layer comprises a magnetic alloy having a substantially nickel-free composition including about 40 wt-% to about 90 wt-% iron, about 10 wt-% to about 50 wt-% chromium and about 0 wt-% to about 30 wt-% aluminum.

At least part of the non-spherical magnetic or magnetizable pigment particles described herein may be constituted by non-spherical colorshifting magnetic or magnetizable pigment particles and/or non-spherical magnetic or magnetizable pigment particles having no colorshifting properties. Preferably, at least a part of the non-spherical magnetic or magnetizable pigment particles described herein is constituted by non-spherical colorshifting magnetic or magnetizable pigment particles. In addition to the overt security provided by the colorshifting property of non-spherical colorshifting magnetic or magnetizable pigment particles, which allows easily detecting, recognizing and/or discriminating an article or security document carrying an ink, radiation curable coating composition, coating or layer comprising the non-spherical colorshifting magnetic or magnetizable pigment particles described herein from their possible counterfeits using the unaided human senses, the optical properties of the non-spherical colorshifting magnetic or magnetizable pigment particles may also be used as a machine readable tool for the recognition of the optical effect layer (OEL). Thus, the optical properties of the non-spherical colorshifting magnetic or magnetizable pigment particles may simultaneously be used as a covert or semi-covert security feature in an authentication process wherein the optical (e.g. spectral) properties of the pigment particles are analyzed. The use of non-spherical colorshifting magnetic or magnetizable pigment particles in radiation curable coating compositions for producing an OEL enhances the significance of the OEL as a security feature in security document applications, because such materials (i.e. non-spherical colorshifting magnetic or magnetizable pigment particles) are reserved to the security document printing industry and are not commercially available to the public.

Moreover, and due to their magnetic characteristics, the non-spherical magnetic or magnetizable pigment particles described herein are machine readable, and therefore radiation curable coating compositions comprising those pigment particles may be detected for example with specific magnetic detectors. Radiation curable coating compositions comprising the non-spherical magnetic or magnetizable pigment particles described herein may therefore be used as a covert or semi-covert security element (authentication tool) for security documents.

As mentioned above, preferably at least a part of the non-spherical magnetic or magnetizable pigment particles is constituted by non-spherical colorshifting magnetic or magnetizable pigment particles. These can more preferably be selected from the group consisting of non-spherical magnetic thin-film interference pigment particles, non-spherical magnetic cholesteric liquid crystal pigment particles, non-spherical interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/di-electric/reflector/magnetic/dielectric/absorber multilayer structures.

Preferred seven-layer Fabry Perot multilayer structures consist of absorber/dielectric/re-flector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($S_{1O2}$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (N), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), iron (Fe), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/M/Al/MgF_2/Cr$ multilayer structure, wherein M a magnetic layer comprising nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by an established deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting colorshifting characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

The substrate (x20) described herein is preferably selected from the group consisting of papers or other fibrous materials, such as cellulose, paper-comprising materials, glasses, metals, ceramics, plastics and polymers, metalized plastics or polymers, composite materials and mixtures or combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), iron (Fe), nickel (Ni), silver (Ag), combinations thereof or alloys of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as sizing agents, whiteners, processing aids, reinforcing or wet strengthening agents, etc. The substrate described herein may be provided under the form of a web (e.g. a continuous sheet of the materials described hereabove) or under the form of sheets. Should the optical effect layer (OEL) produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

FIG. 1A-E schematically illustrate suitable magnet assemblies (x00) to be used during the process described herein for producing the optical effect layers (OELs) described herein. The magnetic assemblies (x00) described herein allow the production of OELs on the substrate (x20) described herein, wherein said magnetic assemblies (x00) are used for orienting the non-spherical magnetic or magnetizable pigment particles so as to produce the OEL described herein. The magnetic assemblies (x00) described herein are based on the interaction of at least a) the first magnetic-field generating device (x30) described herein and b) the second magnetic-field generating device (x40) described herein, as well as the optional third and fourth magnetic-field generating devices (x50, x70), the optional magnetized plate (x80) and the optional one or more pole pieces (x60).

Figure 1C:
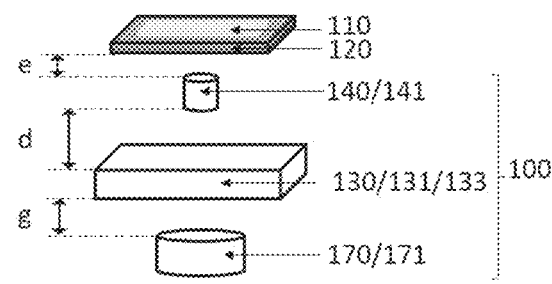
Figure 1B:
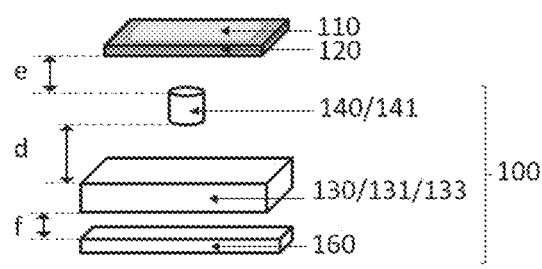
Figure 1D:
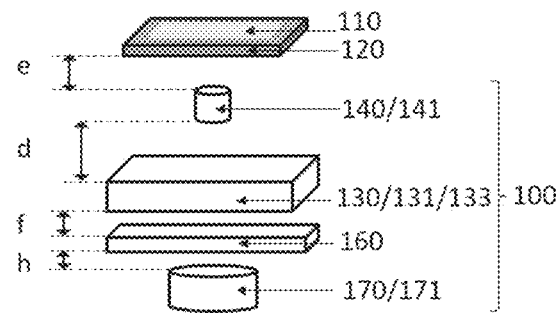

The magnetic assemblies (x00) described herein are configured for receiving the substrate (x20) in an orientation substantially parallel to a first plane (P) and above the first plane (P). As shown in FIG. 1F, the loop (x32) on which all the centers ($C_{x31-a1}$, $C_{3x1-a2}$, ... ) of the three or more first dipole magnets ($x31_{a1}$, $x31_{a2}$, ... ) of the first magnetic-field generating device (x30) are arranged in the first plane (P) and the projection of the center of the second dipole magnet (x41) of the second magnetic-field generating device (x40) on said first plane (P) is located at a projection point ($C_{x41}$) within the loop (x32) described herein.

The first magnetic-field generating device (x30) described herein comprises the three or more first dipole magnets ($x31_{a1}$, $x31_{a2}$, ... ) described herein, wherein each of said first dipole magnets ($x31_{a1}$, $x31_{a2}$, ... ) having its center ($C_{x3-a1}$, $C_{3x1-a2}$, ... ) disposed on the loop (x32) in the first plane (P) and wherein said first dipole magnets ($x31_{a1}$, $x31_{a2}$, ... ) have their magnetic axes oriented to be substantially parallel to the first plane (P) (and substantially parallel to the substrate (x20)). As shown for example in FIGS. 1F and 2A-9A, the three or more first dipole magnets ($x31_{a1}$, $x31_{a2}$, ... ) described herein are depicted $x31_{ai}$, wherein the first dipole magnet $x31_{a1}$ refers to a first first dipole magnet $x31_{a1}$ (i=1), the first dipole magnet $x31_{a2}$ refers to a second first dipole magnet $x31_{a2}$ (i=2), the first dipole magnet $x31_{a3}$ refers to a third first dipole magnet $x31_{a3}$ (i=3).

The first dipole magnets ($x31_{a1}$, $x31_{a2}$, ... ) of the first magnetic-field generating device (x30) and the second dipole magnet (x41) of the second magnetic-field generating device (x40) are arranged in such a way that the angles $\alpha_i$, i.e. the angles formed between each of the vectors $\overrightarrow{C_{x41}C_{31-ai}}$ (such as $\overrightarrow{C_{x41}C_{x31-a1}}$, $\overrightarrow{C_{x41}C_{x31-a2}}$, ... , i=1, 2, etc.) (i.e. the vectors between the projection point ($C_{x41}$) of the second dipole magnet (x41) and the respective center ($C_{x31-a1}$, $C_{x31-a2}$, ... ) of each of the first dipole magnets ($x31_{a1}$, $x31_{a2}$, ... )) and the vector $\overrightarrow{h_{x31-ai}}$, ($\overrightarrow{h_{x31-a1}}$, $\overrightarrow{h_{x31-a2}}$, ... ) of the magnetic axis of the respective first dipole magnet ($x31_{a1}$, $x31_{a2}$, ... ), wherein all of the angles $\alpha_i$ when measured in a counterclockwise direction, are in the range from about 20° to about 160° or in the range from about 200° to about 340°. As it can be seen in FIG. 2B-9B, the angles $\alpha_i$ consist of the angles formed when going from the vector $\overrightarrow{C_{x41}C_{x31-a1}}$ (such as $\overrightarrow{C_{x41}C_{x31-a1}}$, $\overrightarrow{C_{x41}C_{x31-a2}}$, ... ) (i.e. the vector between the projection $C_{x41}$ of the second dipole magnet (x41) and the center of each of the first dipole magnets ($x31_{a1}$, $x31_{a2}$, ... )) to the vector $\overrightarrow{h_{x31-ai}}$ (i.e. the vector of the magnetic axis of each of the dipole magnet ($x31_{a1}$, $x31_{a2}$, ... )) in a counterclockwise direction.

According to one embodiment, at least one of the angles $\alpha_i$ described herein has a value of 90° or 270°. According to a preferred embodiment, the angles $\alpha_i$ described herein are equal to each other and more preferably all the first dipole magnets ($x31_{a1}$, $x31_{a2}$, ... ) have their magnetic axes substantially tangential to the loop (x32) at the position of their center ($C_{x31-a1}$, $C_{x31-a2}$, ... ), i.e. all the angles $\alpha_i$ described herein a value of 90° or 270° (i.e. all the angles $\alpha_1$ have a value of 90°, or all the all the angles $\alpha_i$ have a value of 270°, or some of the all the angles $\alpha_i$ have a value of 90° and the remaining one(s) has/have a value of 270°.

According to one embodiment, the first magnetic-field generating device (x30) and the second magnetic-field generating device (x40) are arranged in such a way that at least two, preferably all, angles $\beta_i$ are equal to each other, wherein said angles $\beta_i$ are respectively formed between the vectors $\overrightarrow{C_{x41}C_{x31-ax}}$ and $\overrightarrow{C_{x41}C_{x31-ax+1}}$, i.e. the angles formed between the straight lines from the projection point ($C_{x41}$) to the respective center ($C_{x31-a1}$, $C_{x31-a2}$, ... ) of adjacent (but not necessarily in direct contact) first dipole magnet ($x31_{a1}$, $x31_{a2}$, ... ).

Each of the first dipole magnets ($x31_{a1}$, $x31_{a2}$, ... ) of the first magnetic-field generating device (x30) is disposed at the first distance (Y) described herein, said first distance (Y)) being on the first plane (P) between the projection point ($C_{x41}$) and the center ($C_{x31-a1}$, $C_{x31-a2}$, ... ) of the first dipole magnet ($x31_{a1}$, $x31_{a2}$, ... ). The first distances (Y) described herein may be different for the first dipole magnets ($x31_{a1}$, $x31_{a2}$, ... ) or may be equal to each other; preferably the first distances (Y) described herein are equal to each other. Preferably, the first dipole magnets ($x31_{a1}$, $x31_{a2}$, ... ) of the first magnetic-field generating device (x30) are arranged with respect to the second dipole magnets (x41) in such a way as to fulfill the following:

$$0.5 \leq \frac{Y}{X} \leq 10$$

more preferably, $$0.7 \leq \frac{Y}{X} \leq 5$$

$$1 \leq \frac{Y}{X} \leq 3$$

wherein dimension (X) corresponds to the smallest dimension (X) of the uppermost surface of the second cylindrical dipole magnet (x41). For embodiments wherein the second dipole magnet (x41) is a cylindrical dipole magnet (see for example FIG. 1-9), the smallest dimension (X) of the uppermost surface of said second cylindrical dipole magnet (x41) corresponds to the diameter of said second dipole magnet (x41).

The three or more first dipole magnets ($x31_{a1}$, $x31_{a2}$, ... ) described herein have their magnetic axes oriented to be substantially parallel to the first plane (P) (substantially parallel to the substrate (x20)). The three or more first dipole magnets ($x31_{a1}$, $x31_{a2}$, ...) described herein may have a same magnetic direction (as shown for example in FIGS. 2-6B and 8B) or may have a different magnetic direction (as shown for example in FIGS. 7B and 9B).

The three or more first dipole magnets ($x31_{a1}$, $x31_{a2}$, ...) described herein may have the same size, the same shape, the same dimensions, and/or may be made of the same material, preferably the three or more first dipole magnets ($x31_{a1}$, $x31_{a2}$, ...) described herein have the same size, the same shape, the same dimensions, and are made of the same material.

The term "loop" (x32) denotes that the center ($C_{x31-a1}$, $C_{x31-a2}$, ...) of all of the three or more first dipole magnets ($x31_{a1}$, $x31_{a2}$, ...) of said first magnetic-field generating device (x30) are provided and disposed on an arrangement having the shape of a closed body or a closed path recombining with itself, forming a closed loop-shaped arrangement surrounding one central area. The loop (x32) can be a round, oval, ellipsoid, square, triangular, rectangular or any (regular or irregular) polygonal shape. Examples of loops (x32) include a ring or circle, a rectangle or square, a triangle, a (regular or irregular) pentagon, a (regular or irregular) hexagon, a (regular or irregular) heptagon, a (regular or irregular) octagon, etc.

Preferably, each of the three or more first dipole magnets ($x31_{a1}$, $x31_{a2}$, ...) described herein has its center ($C_{x31-a1}$, $C_{3x1-a2}$, ...) disposed on a symmetric loop (x32), wherein said symmetric loop (x32) is preferably a ring. According to one embodiment, the three or more first dipole magnets ($x31_{a1}$, $x31_{a2}$, ...) of the magnetic-field generating device (x30) described herein are provided and disposed on the loop (x32) in such a way that the distance between them is equal. Preferably, the loop (x32) is a ring and the three or more first dipole magnets ($x31_{a1}$, $x31_{a2}$, ...) are disposed on said ring and form a regular polygon such as for example an equilateral triangle, a square, a regular pentagon, a regular hexagon, etc.

The first dipole magnets ($x31_{a1}$, $x31_{a2}$, ...) of the first magnetic-field generating device (x30) are at least partially or fully embedded in the supporting matrix (x33) described herein. The supporting matrix (x33) described herein is used for holding the three or more first dipole magnets ($x31_{a1}$, $x31_{a2}$, ...) of the first magnetic-field generating device (x30) described herein together. When present, the one or more third dipole magnets (x51) of the third magnetic-field generating device (x50) described herein are at least partially embedded in the supporting matrix (x33) described herein and said supporting matrix (x33) is used for holding the three of more first dipole magnets ($x31_{a1}$, $x31_{a2}$, ...) of the first magnetic-field generating device (x30) described herein and the one or more third dipole magnets (x51) of the third magnetic-field generating device (x50) together.

The one or more supporting matrixes) described herein are independently made of one or more non-magnetic materials. The non-magnetic materials are preferably selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The magnetic assembly (x00) comprises the second magnetic-field generating device (x40) described herein, wherein said second magnetic-field generating device (x40) comprises the second dipole magnet (x41) having its magnetic axis substantially perpendicular to the first plane (P) (and substantially perpendicular to the substrate (x20) described herein). The projection of the center of said second dipole magnet (x41) on the first plane (P) is located at a projection point ($C_{x41}$) within the loop (x32). For embodiments wherein the loop (x32) is a symmetric loop (x32), preferably a ring and as shown for example in FIG. 2-9, the second dipole magnet (x41) of the second magnetic-field generating device (x40) described herein is preferably arranged in such a way that the projection point ($C_{x41}$) is symmetrically disposed within the symmetric loop (x32), i.e. the projection point ($C_{x41}$) also corresponds to the center of the symmetric loop (x32).

The second magnetic-field generating device (x40) described herein is disposed above the first magnetic-field generating device (x30) described herein; in other words, during the process to produce the optical effect layer (OEL) described herein, the substrate (x20) carrying the coating layer (x10) comprising the non-spherical magnetic or magnetizable pigment particles is disposed above the second magnetic-field generating device (x40) and said second magnetic-field generating device (x40) is disposed above the first magnetic-field generating device (x30). Preferably, the first magnetic-field generating device (x30) and the second magnetic-field generating device (x40) are substantially centered with respect to one another.

The second distance (d) described herein and shown for example FIG. 1A-1E, i.e. the distance from an uppermost surface of the first magnetic-field generating device (x30) and a lowermost surface of the second dipole magnet (x41) described herein, is preferably equal to or smaller than the thickness (Z) of the second dipole magnet (x41). In particular, the second distance (d) described herein is preferably between about 0 mm and about 5 mm, more preferably between about 0 mm and about 1 mm and still more preferably about 0 mm.

The third distance (e) described herein and shown for example FIG. 1A-1E, i.e. the distance from an uppermost surface of the second magnetic-field generating device (x40) described herein and a lowermost surface of the substrate (x20) facing said second magnetic-field generating device (x40) is preferably between about 0 mm and about 10 mm, more preferably between about 0 mm and about 5 mm and still more preferably between about 0 mm and about 1 mm.

The magnet assembly (x00) described herein may further comprise the third magnetic-field generating device (x50) comprising the one or more third dipole magnets (x51) described herein, wherein said one or more third dipole magnets (x51) have their magnetic axes substantially perpendicular to the first plane (P) and substantially perpendicular to the substrate (x20)) and are at least partially embedded in the supporting matrix (x33) described herein.

Each of said one or more third dipole magnets (x51) described herein preferably have its center ($C_{x51}$) in the first plane (P) described herein and is preferably disposed on the loop (x32) described herein.

Preferably and as shown for example in FIG. 3-5, the one or more third dipole magnets (x51) of the third magnetic-field generating device (x50) described herein are disposed in an alternating manner on the loop (x32) and are disposed between one or more of the first dipole magnets ($x31_{a1}$, $x31_{a2}$, . . . ) of the first magnetic-field generating device (x30).

The first magnetic-field generating device (x30) and the one or more third dipole magnets (x51) are arranged in such a way that angles γ are respectively formed between the vectors $\overrightarrow{C_{x41}C_{31\text{-}ax}}$ and $\overrightarrow{C_{41}C_{51}}$, i.e. the angles formed between the straight line from the projection point ($C_{x41}$) to the center ($C_{x31\text{-}a1}$, $C_{x31\text{-}a2}$, . . . ) of the first dipole magnet ($x31_{a1}$, $x31_{a2}$, . . . ) and the straight line from the projection point ($C_{x41}$) to the center ($C_{x51}$) of the adjacent (but not necessarily in direct contact) third dipole magnet (x51). Preferably, the angles γ are equal to each other. The distances between the projection point ($C_{x41}$) of the center of the second dipole magnet (x41) and the center ($C_{x51}$) of the one or more third dipole magnets (x51) of the third magnetic-field generating device (x50) are preferably equal to each other and are more preferably equal to the distances ($Y_i$) described hereabove.

The magnet assembly (x00) described herein may further comprise the one or more pole pieces (x60) described herein. The one or more pole pieces (x60) may be in direct contact with the first magnetic-field generating devices (x30) or may be separated from the first magnetic-field generating device (x30). The distance (f) described herein and shown for example FIGS. 1B and 1D, i.e. the distance from a lowermost surface of the first magnetic-field generating device (x30) described herein and the uppermost surface of the one or more pole pieces (x60) described herein is preferably between about 0 mm and about 1 mm, more preferably about 0 mm.

A pole piece denotes a structure comprising one or more soft magnetic materials, i.e. materials having a low coercivity and a high permeability μ. Their coercivity is lower than 1000 Am$^{-1}$ as measured according to IEC 60404-1:2000, to allow for a fast magnetization and demagnetization. Suitable soft magnetic materials have a maximum relative permeability $\mu R_{max}$ of at least 5, where the relative permeability μR is the permeability of the material μ relative to the permeability of the free space $\mu_0$ ($\mu R = \mu/\mu_0$) (Magnetic Materials, Fundamentals and Applications, 2$^{nd}$ Ed., Nicola A. Spaldin, p. 16-17, Cambridge University Press, 2011). Soft magnetic materials are described, for example, in the following handbooks: (1) Handbook of Condensed Matter and Materials Data, Chap. 4.3.2, Soft Magnetic Materials, p. 758-793, and Chap. 4.3.4, Magnetic Oxides, p. 811-813, Springer 2005; (2) Ferromagnetic Materials, Vol. 1, Iron, Cobalt and Nickel, p. 1-70, Elsevier 1999; (3) Ferromagnetic Materials, Vol. 2, Chap. 2, Soft Magnetic Metallic Materials, p. 55-188, and Chap. 3, Ferrites for non-microwave Applications, p. 189-241, Elsevier 1999; (4) Electric and Magnetic Properties of Metals, C. Moosbrugger, Chap. 8, Magnetically Soft Materials, p. 196-209, ASM International, 2000; (5) Handbook of modern Ferromagnetic Materials, Chap. 9, High-permeability High-frequency Metal Strip, p. 155-182, Kluwer Academic Publishers, 2002; and (6) Smithells Metals Reference Book, Chap. 20.3, Magnetically Soft Materials, p. 20-9-20-16, Butterworth-Heinemann Ltd, 1992.

According to one embodiment, the one or more pole pieces (x60) described herein are independently made from one or more materials selected from the group consisting of iron, cobalt, nickel, nickel-molybdenum alloys, nickel-iron alloys (permalloy or supermalloy-type materials), cobalt-iron alloys, cobalt-nickels alloys iron-nickel-cobalt alloys (Fernico-type materials), Heusler-type alloys (such as $Cu_2MnSn$ or $Ni_2MnAl$), low silicon steels, low carbon steels, silicon irons (electrical steels), iron-aluminum alloys, iron-aluminum-silicon alloys, amorphous metal alloys (e.g. alloys like Metglas®, iron-boron alloys), nanocrystalline soft magnetic materials (e.g. Vitroperm®) and combinations thereof, more preferably selected from the group consisting of iron, cobalt, nickel, low carbon steels, silicon iron, nickel-iron alloys and cobalt-iron alloys and combinations thereof. Preferably, the one or more pole pieces (x60) described herein are made from iron or from a plastic material in which magnetizable particles are dispersed. Preferably the one or more pole piece (x60) described herein are made of iron. Preferably, the one or more pole pieces (x60) described herein are independently disc-shaped, square-shaped or rectangle-shaped pole pieces (x60).

As shown in FIG. 1B, 1D and 5A-9A, the one or more pole pieces (x60) described herein is disposed below the first magnetic-field generating device (x30) described herein; in other words, during the process to produce the optical effect layer (OEL) described herein, the substrate (x20) carrying the coating layer (x10) comprising the non-spherical magnetic or magnetizable pigment particles is disposed above the second magnetic-field generating device (x40), said second magnetic-field generating device (x40) is disposed above the first magnetic-field generating device (x30) and said first magnetic-field generating device (x30) is disposed above the one or more pole pieces (x60). Preferably, the first magnetic-field generating device (x30), the second magnetic-field generating device (x40) and the one or more pole pieces (x60) are substantially centered with respect to one another.

The magnet assembly (x00) described herein may further comprise the fourth magnetic-field generating device (x70) comprising the fourth dipole magnet (x71) described herein, wherein said fourth dipole magnet (x71) has its magnetic axis substantially perpendicular to the first plane (P) (and substantially perpendicular to the substrate (x20)) and is disposed below the first magnetic-field generating device (x30).

According to one embodiment shown for example in FIG. 6A-9A, the fourth dipole magnet (x71) of the fourth magnetic-field generating device (x70) described herein has the same magnetic direction as the magnetic direction of the second dipole magnet (x41) of the second magnetic-field generating device (x40). According to another embodiment shown for example in FIG. 5A, the fourth dipole magnet (x71) of the fourth magnetic-field generating device (x70) described herein has an opposite magnetic direction than the magnetic direction of the second dipole magnet (x41) of the second magnetic-field generating device (x40).

As shown for example in FIG. 1C, the fourth dipole magnet (x71) of the fourth magnetic-field generating device (x70) described herein is below the first magnetic-field generating device (x30) described herein. For embodiments wherein the magnet assembly (x00) described herein comprises the one or more pole pieces (x60) described herein, and as shown in FIG. 10, 5A-9A, the fourth dipole magnet (x71) described herein of the fourth magnetic-field generating device (x70) described herein is disposed below the first magnetic-field generating device (x30) described herein and below the one or more pole pieces (x60). Preferably, the first magnetic-field generating device (x30), the second magnetic-field generating device (x40), the one or more pole pieces (x60) when present and the fourth magnetic-field generating device (x70) when present are substantially centered with respect to one another.

The distance (g) described herein and shown for example in FIG. 10, i.e. the distance from a lowermost surface of the first magnetic-field generating device (x30) described herein and the uppermost surface of the fourth magnetic-field generating device (x70) described herein is preferably between about 0 mm and about 10 mm, more preferably between about 0 mm and about 5 mm.

For embodiments wherein the magnet assembly (x00) comprises one or more pole pieces (x60), the distance (h) described herein and shown for example in FIG. 10, i.e. the distance from a lowermost surface of one or more pole pieces (x60) and the uppermost surface of the fourth magnetic-field generating device (x70) described herein is preferably between about 0 mm and about 10 mm, more preferably between about 0 mm and about 5 mm.

The first dipole magnets ($x31_{a1}$, $x31_{a2}$, . . . ) of the first magnetic-field generating device (x30), the second dipole magnet (x41) of the second magnetic-field generating device (x40), the optional one or more third dipole magnets (x51) of the third magnetic-field generating device (x50), and the optional one or more fourth dipole magnet (x71) of the fourth magnetic-field generating device (x70) are preferably independently made of high-coercivity materials (also referred as strong magnetic materials). Suitable high-coercivity materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula $MFe_{12}O_{19}$, (e.g. strontium hexaferrite ($SrO*6Fe_2O_3$) or barium hexaferrites ($BaO*6Fe_2O_3$)), hard ferrites of the formula $MFe_2O_4$ (e.g. as cobalt ferrite ($CoFe_2O_4$) or magnetite ($Fe_3O_4$)), wherein M is a bivalent metal ion), ceramic 8 (SI-1-5); rare earth magnetic materials selected from the group comprising RECos (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the magnet bars are selected from the groups consisting of rare earth magnetic materials, and more preferably from the group consisting of $Nd_2Fe_{14}B$ and $SmCo_5$. Particularly preferred are easily workable permanent-magnetic composite materials that comprise a permanent-magnetic filler, such as strontium-hexaferrite ($SrFe_{12}O_{19}$) or neodymium-iron-boron ($Nd_2Fe_{14}B$) powder, in a plastic- or rubber-type matrix.

Figure 1E:
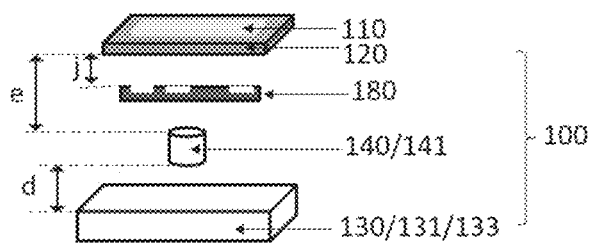
Figure 1F:
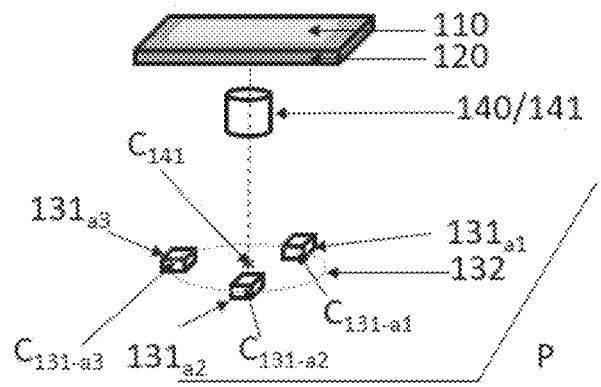
FIG. 1F schematically illustrates a magnetic assembly (100) configured for receiving a substrate (120) in an orientation substantially parallel to a first plane (P) and above the first plane (P). The magnetic assembly (100) comprises a first magnetic-field generating device comprising (130) three first dipole magnets ($131_{a1}$, $131_{a2}$, $131_{a3}$) and a second magnetic-field generating device (140) comprising one second dipole magnet (141), wherein the center ($C_{131-a1}$, $C_{131-a2}$ and $C_{131-a3}$) of each of said three first dipole magnets ($131_{a1}$, $131_{a2}$, $131_{a3}$) are disposed on a loop, in particular a ring, (132) in the first plane (P) and the projection of the center of the second dipole magnet (141) on said first plane (P) is located at the projection point ($C_{141}$).

The magnet assembly (x00) described herein may further comprise a magnetized plate (x80) comprising one or more surface reliefs, engravings and/or cut-outs representing one or more indicia, wherein said magnetized plate (x80) is disposed between the substrate (x20) and the second magnetic-field generating device (x40) (see FIG. 1E). As used herein, the term "indicia" shall mean designs and patterns, including without limitation symbols, alphanumeric symbols, motifs, letters, words, numbers, logos and drawings. The one or more surface reliefs, engravings and/or cut-outs of the magnetized plate (x80) bear the indicia that are transferred to the OEL in its non-hardened/non-cured state by locally modifying the magnetic field generated by the magnetic assembly (x00) described herein. Suitable examples of magnetized plates (x80) comprising the one or more surface reliefs, engravings and/or cut-outs described herein for the present invention can be found in in WO 2005/002866 A1, WO 2008/046702 A1, WO 2008/139373 A1, WO 2018/019594 A1 and WO 2018/033512 A1.

Preferably, the first magnetic-field generating device (x30), the second magnetic-field generating device (x40), the third magnetic-field generating device (x50) when present, the one or more pole pieces (x60) when present, the fourth magnetic-field generating device (x70) when present and the magnetized plate (x80) when present are substantially centered with respect to one another.

The magnetized plate (x80) comprising one or more engravings and/or cut-outs described herein may be made from any mechanically workable soft-magnetic or hard-magnetic materials. Soft materials include without limitation those described hereabove for the optional one or more pole pieces (x60). Hard-magnetic materials include without limitation those described hereabove for the first dipole magnets ($x31_{a1}$, $x31_{a2}$, . . . ) of the first magnetic-field generating device (x30), the second dipole magnet (x41) of the second magnetic-field generating device (x40), the optional one or more third dipole magnets (x51) of the third magnetic-field generating device (x50), and the optional one or more fourth dipole magnet (x71) of the fourth magnetic-field generating device (x70).

Preferably, the magnetized plate (x80) described herein is a polymer-bonded plate of a soft-magnetic or hard-magnetic material, i.e. a magnetized plate (x80) made of a composite material comprising a polymer. The polymer (e.g. rubber- or plastic-like polymer) acts as a structural binder and the permanent magnetic powder material acts as an extender or filler. Magnetized plates made of a composite material comprising a polymer and a permanent magnetic powder material advantageously combine the desirable magnetic properties (high coercivity) of the otherwise brittle and not well workable ferrite, Alnico, rare-earth or still other magnets with the desirable mechanical properties (flexibility, machine-ability, shock-resistance) of a malleable metal or a plastic material. Preferred polymers include rubber-type flexible materials such as nitrile rubbers, EPDM hydrocarbon rubbers, poly-isoprenes, polyamides (PA), poly-phenylene sulfides (PPS), and chlorosulfonated polyethylenes.

Plates made of a composite material comprising a polymer and a permanent magnetic powder are obtainable from many different sources, such as from Group ARNOLD (Plastiform®) or from Materiali Magnetici, Albairate, Milano, IT (Plastoferrite).

The magnetized plate (x80) described herein, in particular the magnetized plate (x80) made of the composite material comprising the polymer and the soft-magnetic material or hard-magnetic material described herein, can be obtained in any desired size and form, e.g. as a thin, flexible plates which can be bent and mechanically worked, e.g. cut to size or shape, using commonly available mechanical ablation tools and machines, as well as air or liquid jet ablation, or laser ablation tools.

The one or more surface engravings and/or cut-outs of the magnetized plate (x80) described herein, in particular the magnetized plate (x80) made of the composite material comprising the polymer and the soft-magnetic material or hard-magnetic material described herein, may be produced by any cutting, engraving or forming methods known in the art including without limitation casting, molding, hand-engraving or ablation tools selected from the group consisting of mechanical ablation tools (including computer-controlled engraving tools), gaseous or liquid jet ablation tools, by chemical etching, electro-chemical etching and laser ablation tools (e.g. $CO^{2-}$, Nd-YAG or excimer lasers). As is understood by the skilled man and described herein, the magnetized plate (x80) described herein, in particular the magnetized plate (x80) made of the composite material comprising the polymer and the soft-magnetic material or hard-magnetic material described herein, can also be cut or molded to a particular size and shape, rather than engraved. Holes may be cut out of it, or cut-out pieces may be assembled on a support.

The one or more engravings and cut-outs of the magnetized plate (x80), in particular the magnetized plate (x80) made of the composite material comprising the polymer and the soft-magnetic material or hard-magnetic material described herein, may be filled up with a polymer, which may contain fillers. For embodiments wherein the magnetized plate (x80) is made of a hard-magnetic material, said filler may be a soft magnetic material, for modifying the magnetic flux at the locations of the one or more engravings/cut-outs, or it may be any other type of magnetic or non-magnetic material, in order to modify the magnetic field properties, or to simply produce a smooth surface. The magnetized plate (x80), in particular the magnetized plate (x80) made of the composite material comprising the polymer and the soft-magnetic material or hard-magnetic material described herein, may additionally be surface-treated for facilitating the contact with the substrate, reducing friction and/or wear and/or electrostatic charging in a high-speed printing application.

The distance (j) described herein and shown for example in FIG. 1E, i.e. the distance from the uppermost surface of the magnetized plate (x80) and the lowermost surface of the substrate (x20) described herein is preferably between about 0 mm and about 5, preferably between about 0 mm and about 1 mm and still more preferably about 0 mm.

The materials of the first dipole magnets ($x31_{a1}$, $x31_{a2}$, ...) of the first magnetic-field generating device (x30), of the second dipole magnets (x41) of the second magnetic-field generating device (x40), of the optional one or more third dipole magnets (x51) of the third magnetic-field generating device (x50), of the optional one or more pole pieces (x60), of the optional fourth dipole magnet (x71) of the fourth magnetic-field generating device (x70), and of the optional magnetized plate (x80), as well as the distances (d), (e), (f), (g), (h) and (j) are selected such that the magnetic field resulting from the interaction of the magnetic field produced by the first and second magnetic-field generating devices (x30 and x40), the third magnetic-field generating device (x50) when present, the one or more pole pieces (x60) when present, the fourth dipole magnet (x71) of the fourth magnetic-field generating device (x70) when present, and the magnetized plate (x80) when present, of the magnetic assembly (x00) is suitable for producing the optical effects layers (OELs) described herein. The magnetic field produced by the first and second magnetic-field generating devices (x30 and x40) of the magnetic assembly (x00) interacts so that the resulting magnetic field of said magnetic assembly (x00) is able to orient the non-spherical magnetic or magnetizable pigment particles in an as yet uncured radiation curable coating composition on the substrate (x20), which are disposed in the magnetic field of the magnetic assembly (x00) to produce the optical impression of one loop-shaped body surrounded by one or more loop-shaped bodies, wherein said one or more one or more loop-shaped bodies have their shape and/or their brightness varying upon tilting the optical effect layer (OEL)).

Figure 2A:
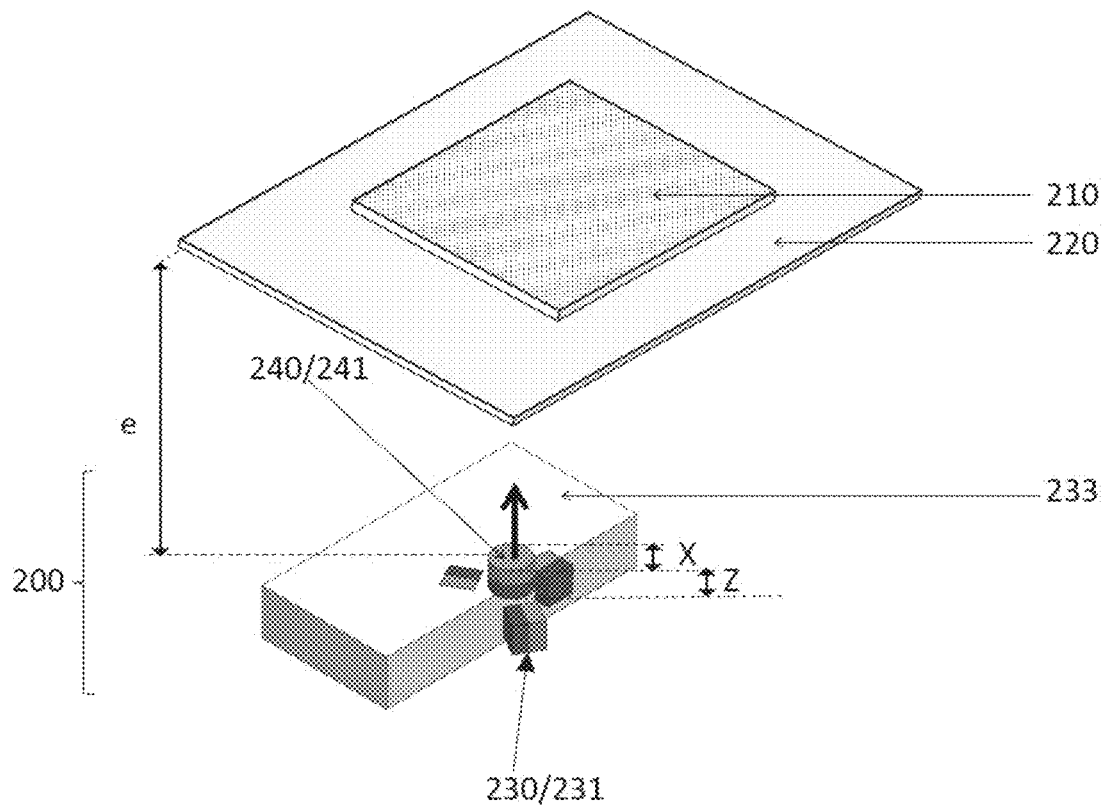
FIG. 2A schematically illustrates a magnetic assembly (200) for producing an optical effect layer (OEL) on a substrate (220). The magnetic assembly (200) comprises a first magnetic-field generating device (230) comprising three first dipole magnets ($231_{a1}$, $231_{a2}$, $231_{a3}$) having their magnetic axes substantially parallel to the substrate (220) and being embedded in a supporting matrix (233) and a second magnetic-field generating device (240) comprising a second dipole magnet (241) having its magnetic axis substantially perpendicular to the substrate (220) with its North pole pointing towards the substrate (220).
Figure 2C:
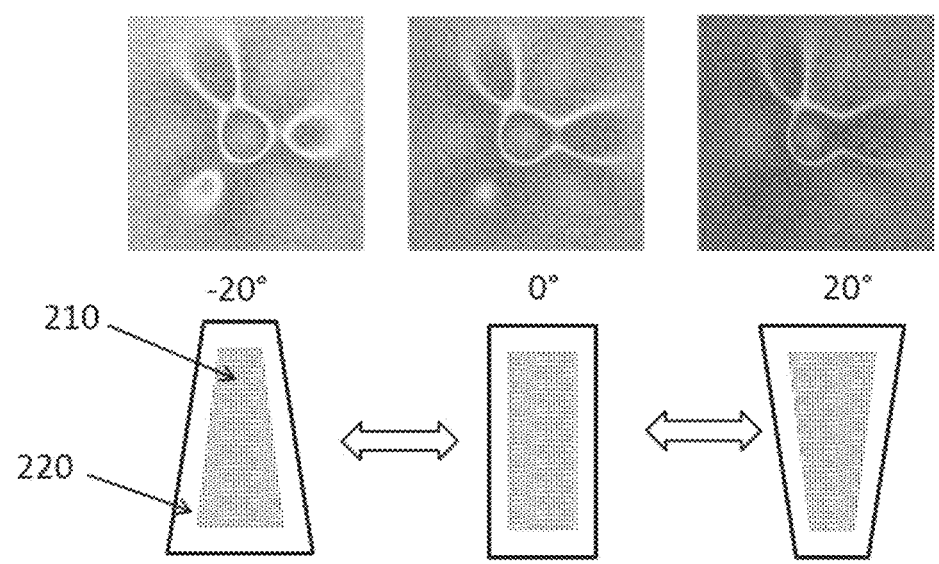
FIG. 2C shows pictures of an OEL obtained by using the apparatus illustrated in FIG. 2A-B, as viewed under different viewing angles.

FIG. 2A-C illustrate an example of a magnetic assembly (200) suitable for producing optical effect layers (OELs) comprising non-spherical magnetic or magnetizable pigment particles on a substrate (220) according to the present invention.

The magnetic assembly (200) comprises a first magnetic-field generating device (230) comprising three or more, in particular three, first dipole magnets ($231_{a1}$, $231_{a2}$, $231_{a3}$) embedded in a square-shaped supporting matrix (233) and a second magnetic-field generating device (240) comprising a second dipole magnet (241), wherein the second magnetic-field generating device (240) is disposed above the first magnetic-field generating device (230).

As shown in FIG. 2B, the three first dipole magnets ($231_{a1}$, $231_{a2}$, $231_{a3}$) are arranged in such a way that each of their centers ($C_{231-a1}$, $C_{231-a2}$ and $C_{231-a3}$) is disposed on a loop, in particular a ring, (232) in the plane (P) being substantially parallel to the substrate (220). The projection of the center of the second dipole magnet (241) on the plane (P) is located at the projection point ($C_{241}$) and is symmetrically disposed within the ring (232), i.e. the projection point ($C_{241}$) also corresponds to the center of the ring (232). The three first dipole magnets ($231_{a1}$, $231_{a2}$, $231_{a3}$) are evenly distributed around the projection point ($C_{241}$) of the center of the second dipole magnet (241).

The three first dipole magnets ($231_{a1}$, $231_{a2}$, $231_{a3}$) of the first magnetic-field generating device (230) have their magnetic axes substantially parallel to the plane (P), substantially parallel to the substrate (220) and substantially perpendicular to the magnetic axis of the second dipole magnet (241) of the second magnetic-field generating device (240).

The three angles $\alpha_{1/2/3}$ respectively formed by i) the vectors $\overrightarrow{C_{241}C_{231-ai}}$, ($\overrightarrow{C_{241}C_{231-a1}}$, $\overrightarrow{C_{241}C_{231-a2}}$, $\overrightarrow{C_{241}C_{231-a2}}$) (i.e. the vectors between the projection point ($C_{241}$) and the center ($C_{231-a1}$, $C_{231-a2}$ and $C_{231-a3}$) of each respective first dipole magnet of the first magnetic-field generating device (230)) and ii) the vectors $\overrightarrow{h_{231-ai}}$ ($\overrightarrow{h_{231-a1}}$, $\overrightarrow{h_{231-a2}}$, $\overrightarrow{h_{231-a3}}$), when measured in a counterclockwise direction, are equal to each other, said angles $\alpha_{1/2/3}$ being 90°, i.e. the three first dipole magnets ($231_{a1}$, $231_{a2}$, $231_{a3}$) have their magnetic axes substantially tangential to the ring (232) at the position of their respective center ($C_{231-a1}$, $C_{231-a2}$ and $C_{231-a3}$).

The three angles β respectively formed by the vectors $\overrightarrow{C_{241}C_{231-a1}}$ (corresponding to the straight line from the projection point ($C_{241}$) to the center $\overrightarrow{C_{231-a1}}$ of the cubic first dipole magnet ($231_{a1}$)) and $\overrightarrow{C_{241}C_{231-a2}}$; the vectors $\overrightarrow{C_{241}C_{231-a2}}$ and $\overrightarrow{C_{241}C_{231-a3}}$; and the vectors $\overrightarrow{C_{241}C_{231-a3}}$ and $\overrightarrow{C_{241}C_{231-a1}}$ are equal to each other, in particular 120°.

The center of the first magnetic-field generating device (230), i.e. the center of the square-shaped supporting matrix (233), and the center of the second magnetic-field generating device (240), i.e. the center of the second dipole magnet (241), are substantially centered with respect to one another and are substantially centered with respect to the projection point ($C_{241}$) of the center of the cylindrical dipole magnet (241).

The distances Y between the projection point ($C_{241}$) of the center of the second dipole magnet (241) and the center ($C_{231-a1}$, $C_{231-a2}$ and $C_{231-a3}$) of each of said three first dipole magnets ($231_{a1}$, $231_{a2}$, $231_{a3}$) are equal to each other.

The second dipole magnet (241) has its magnetic axis substantially perpendicular to the plane (P) and substantially perpendicular to the substrate (220) with its North pole pointing towards (i.e. facing) the substrate (220). The second dipole magnet (241) is disposed in direct contact and above the supporting matrix (233).

The distance (d) from the uppermost surface of the first magnetic-field generating device (230), i.e. the uppermost surface of the three first dipole magnets ($231_{a1}$, $231_{a2}$, $231_{a3}$), and the lowermost surface of the second dipole magnet (241) is equal to or smaller than the thickness (Z) of the second dipole magnet (241). In particular, the second distance (d) is preferably between about 0 mm and about 5 mm, more preferably between about 0 mm and about 1 mm and still more preferably about 0 mm.

The distance (e) from the uppermost surface of the second magnetic-field generating device (240) described herein, i.e. the uppermost surface of the second dipole magnet (241), and the lowermost surface of the substrate (220) facing said second magnetic-field generating device (240) is preferably between about 0 mm and about 10 mm, more preferably between about 0 mm and about 5 mm and still more preferably between about 0 mm and 1 mm.

The resulting OEL produced with the magnetic assembly (200) illustrated in FIG. 2A-B is shown in FIG. 2C at different viewing angles by tilting the substrate (220) between −20° and +20°. The so-obtained OEL provides the optical impression of a ring surrounded by three loop-shaped bodies having their shape and their brightness varying upon tilting the optical effect layer (OEL).

Figure 3A:
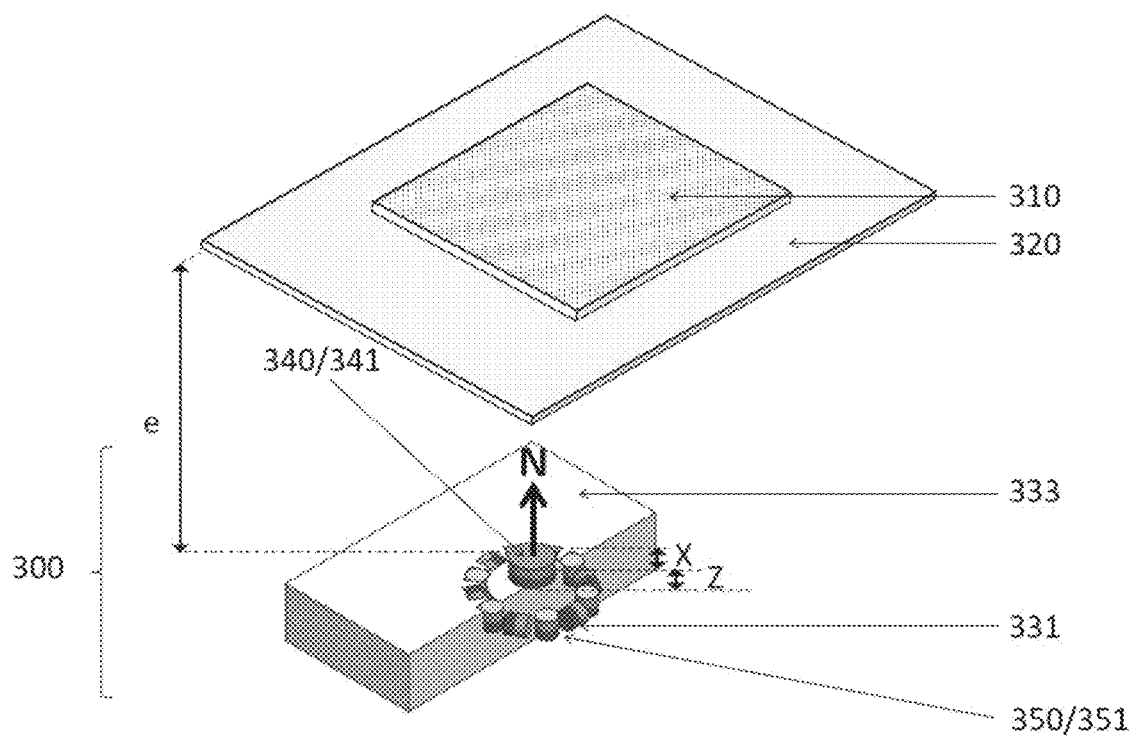
FIG. 3A schematically illustrates a magnetic assembly (300) for producing an optical effect layer (OEL) on a substrate (320). The magnetic assembly (300) comprises a first magnetic-field generating device (330) comprising six first dipole magnets ($331_{a1}$, ..., $331_{a6}$) being embedded in a supporting matrix (333); a second magnetic-field generating device (340) comprising a second dipole magnet (341) having its magnetic axis substantially perpendicular to the substrate (320) with its North pole pointing towards the substrate (320); and a third magnetic-field generating device (350) comprising six third dipole magnets (351) having their magnetic axes substantially perpendicular to the substrate (320) with their North poles pointing towards the substrate (320) and being embedded in the supporting matrix (333).
Figure 3C:
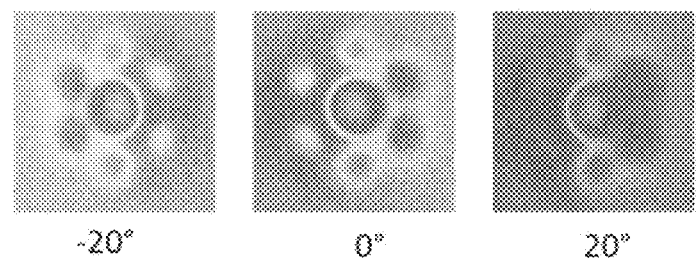
FIG. 3C shows pictures of an OEL obtained by using the apparatus illustrated in FIG. 3A-B, as viewed under different viewing angles.

FIG. 3A-C illustrate an example of a magnetic assembly (300) suitable for producing optical effect layers (OELs) comprising non-spherical magnetic or magnetizable pigment particles on a substrate (320) according to the present invention.

The magnetic assembly (300) comprises a first magnetic-field generating device (330) comprising three or more, in particular six, first dipole magnets ($331_{a1}$, . . . , $331_{a6}$) embedded in a square-shaped supporting matrix (333), a second magnetic-field generating device (340) comprising a second dipole magnet (341) and a third magnetic-field generating device (350) comprising one or more, in particular six, third dipole magnets (351) embedded in the square-shaped supporting matrix (333), wherein the second magnetic-field generating device (340) is disposed above the first magnetic-field generating device (330).

As shown in FIG. 3B, the six first dipole magnets ($331_{a1}$, . . . , $331_{a6}$) are arranged in such a way that each of their centers ($C_{331\text{-}a1}$, . . . , $C_{331\text{-}a6}$) is disposed on a loop (332), in particular a ring, in the plane (P) being substantially parallel to the substrate (320). The projection of the center of the second dipole magnet (341) on the plane (P) is located at the projection point ($C_{341}$) and is symmetrically disposed within the ring (332), i.e. the projection point ($C_{341}$) also corresponds to the center of the ring (332). The six first dipole magnets ($331_{a1}$, . . . , $331_{a6}$) are evenly distributed around the projection point ($C_{341}$) of the center of the second dipole magnet (341).

The six first dipole magnets ($331_{a1}$, . . . , $331_{a6}$) of the first magnetic-field generating device (330) have their magnetic axes substantially parallel to the plane (P), substantially parallel to the substrate (320) and substantially perpendicular to the magnetic axis of the second dipole magnet (341) of the second magnetic-field generating device (340).

The six angles $\alpha_{1\text{-}6}$ respectively formed by i) the vectors $\overrightarrow{C_{341}C_{331\text{-}ai}}$ ($\overrightarrow{C_{341}C_{331\text{-}a1}}$, . . . , $\overrightarrow{C_{341}C_{331\text{-}a6}}$) (i.e. the vectors between the projection point ($C_{341}$) and the center ($C_{331\text{-}a1}$, . . . , $C_{331\text{-}a6}$) of each respective dipole magnet of the first magnetic-field generating device (330)) and ii) the vectors $\overrightarrow{h_{331\text{-}ai}}$ ($\overrightarrow{h_{331\text{-}a1}}$, . . . , $\overrightarrow{h_{331\text{-}a6}}$); when measured in a counterclockwise direction, are equal to each other, said angles $\alpha_{1\text{-}6}$ being 90°, i.e. the six first dipole magnets ($331_{a1}$, . . . , $331_{a6}$) have their magnetic axes substantially tangential to the ring (332) at the position of their respective center ($C_{331\text{-}a1}$, . . . , $C_{331\text{-}a6}$).

The six angles β respectively formed by the vectors $\overrightarrow{C_{341}C_{331\text{-}a1}}$ (corresponding to the straight line from the projection point ($C_{341}$) to the center $C_{331\text{-}a1}$ of the cylindrical first dipole magnet ($331_{a1}$)) and $\overrightarrow{C_{341}C_{331\text{-}a2}}$ the vectors $\overrightarrow{C_{341}C_{331\text{-}a2}}$ and $\overrightarrow{C_{341}C_{331\text{-}a3}}$; the vectors $\overrightarrow{C_{341}C_{331\text{-}a3}}$ and $\overrightarrow{C_{341}C_{331\text{-}a4}}$; the vectors $\overrightarrow{C_{341}C_{331\text{-}a4}}$ and $\overrightarrow{C_{341}C_{331\text{-}a5}}$; the vectors $\overrightarrow{C_{341}C_{331\text{-}a5}}$ and $\overrightarrow{C_{341}C_{331\text{-}a6}}$; and the vectors $\overrightarrow{C_{341}C_{331\text{-}a6}}$ and $\overrightarrow{C_{341}C_{331\text{-}a1}}$ are equal to each other, in particular 60°.

The distances Y between the projection point ($C_{341}$) of the center of the second dipole magnet (341) and the center ($C_{331\text{-}a1}$, . . . , $C_{331\text{-}a6}$) of each of said six first dipole magnets ($331_{a1}$, . . . , $331_{a6}$) are equal to each other.

The second dipole magnet (341) has its magnetic axis substantially perpendicular to the plane (P) and substantially perpendicular to the substrate (320) with its North pole pointing towards (i.e. facing) the substrate (320). The second dipole magnet (341) is disposed in direct contact and above the supporting matrix (333).

The distance (d) from the uppermost surface of the first magnetic-field generating device (330), i.e. the uppermost surface of the six first dipole magnets ($331_{a1}$, . . . , $331_{a6}$), and the lowermost surface of the second dipole magnet (341) described herein, i.e. the lowermost surface second dipole magnet (341) is equal to or smaller than the thickness (Z) of the second dipole magnet (341). In particular, the second distance (d) is preferably between about 0 mm and about 5 mm, more preferably between about 0 mm and about 1 mm and still more preferably about 0 mm.

As shown in FIG. 3B, the six third dipole magnets (351) of the third magnetic-field generating device (350) are arranged in such a way that each of their centers is disposed on the loop, in particular the ring, (332) in the plane (P) being substantially parallel to the substrate (320). The six third dipole magnets (351) of the third magnetic-field generating device (350) have their magnetic axes substantially perpendicular to the plane (P), substantially perpendicular to the substrate (320), substantially perpendicular to the magnetic axis of the six first dipole magnets ($331_{a1}$, . . . , $331_{a6}$) of the first magnetic-field generating device (330) and substantially parallel with the magnetic axis of the second dipole magnet (341) of the second magnetic-field generating device (340) with the North pole pointing towards (i.e. facing) the substrate (320). The angles γ respectively formed by the vectors $\overrightarrow{C_{341}C_{331\text{-}ax}}$ (x=1-6) (corresponding to the straight lines from the projection point ($C_{341}$) to the center $C_{331\text{-}ax}$ of a first dipole magnet ($331_{ax}$)) and $\overrightarrow{C_{341}C_{351}}$ (corresponding to the straight lines from the projection point ($C_{341}$) to the center of an adjacent cylindrical third dipole magnet (351)) are equal to each other, said value being 30°.

The distances between the projection point ($C_{341}$) of the center of the second dipole magnet (341) and the center ($C_{351}$) of the six third dipole magnets (351) of the third magnetic-field generating device (350) are equal to each other and are equal to the distances Y described hereabove.

The distance (e) from the uppermost surface of the second magnetic-field generating device (340) described herein, i.e. the uppermost surface of the second dipole magnet (341), and the lowermost surface of the substrate (320) facing said second magnetic-field generating device (340) is preferably between about 0 mm and about 10 mm, more preferably between about 0 mm and about 5 mm and still more preferably between about 0 mm and about 1 mm.

The resulting OEL produced with the magnetic assembly (300) illustrated in FIG. 3A-B is shown in FIG. 3C at different viewing angles by tilting the substrate (320) between −20° and +20°. The so-obtained OEL provides the optical impression of a ring surrounded by six loop-shaped bodies having their shape and their brightness varying upon tilting the optical effect layer (OEL).

Figure 4A:
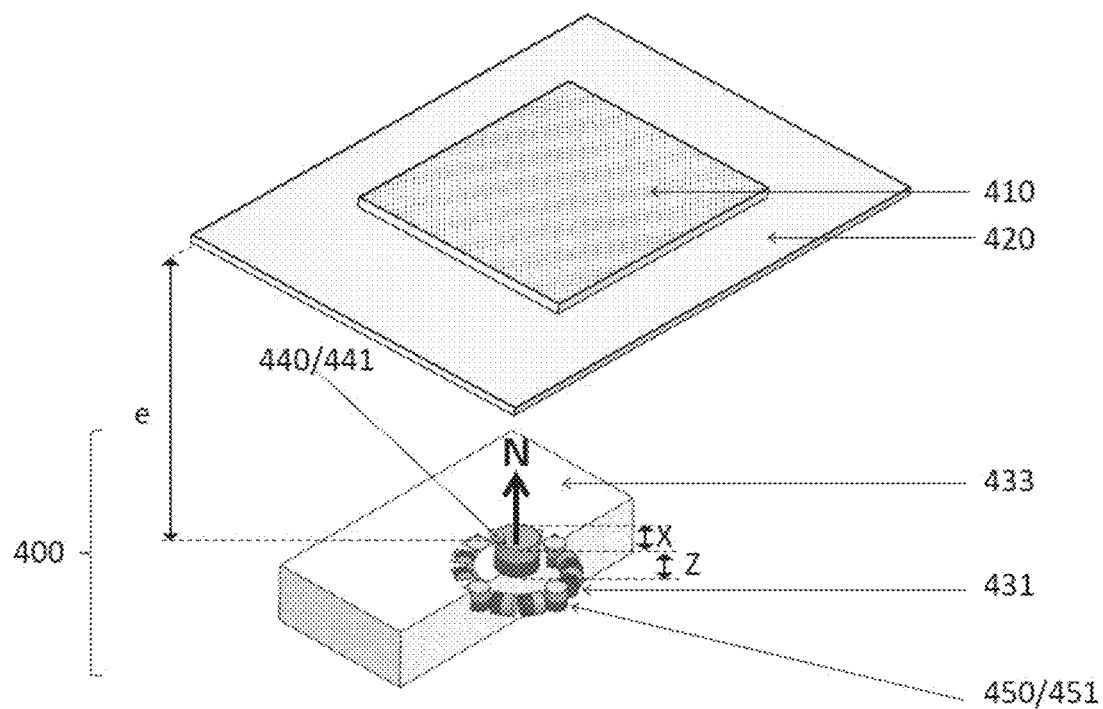
FIG. 4A schematically illustrates a magnetic assembly (400) for producing an optical effect layer (OEL) on a substrate (420). The magnetic assembly (400) comprises a first magnetic-field generating device (430) comprising eight first dipole magnets ($431_{a1}$, ..., $431_{a8}$) being embedded in a supporting matrix (433), a second magnetic-field generating device (440) comprising a second dipole magnet (441) having its magnetic axis substantially perpendicular to the substrate (420) with its North pole pointing towards the substrate (420) and a third magnetic-field generating device (450) comprising four third dipole magnets (451) having their magnetic axes substantially perpendicular to the substrate (420) and being embedded in the supporting matrix (433).
Figure 4B:
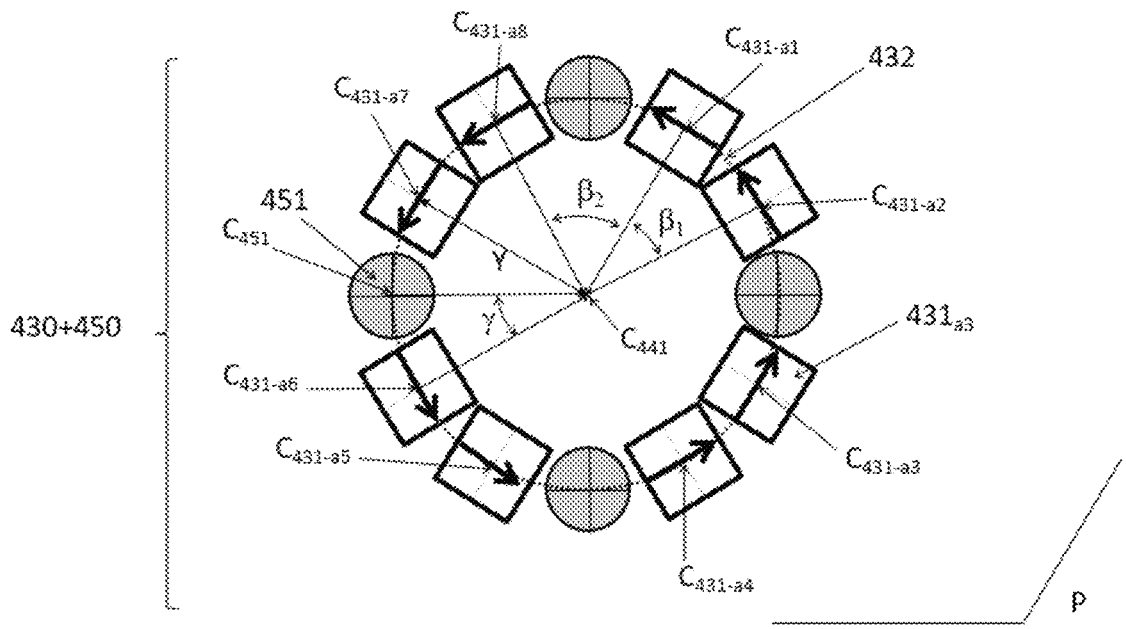
FIG. 4B schematically illustrates a top view of the first magnetic-field generating device (430) and third magnetic-field generating device (450) of the magnetic assembly (400) of FIG. 4A, wherein each of the eight first dipole magnets ($431_{a1}$, ..., $431_{a8}$) of the first magnetic-field generating device (430) has its center ($C_{431-a1}$, ..., $C_{431-a8}$) disposed on a ring (432) and wherein each of the four third dipole magnets (451) of the third magnetic-field generating device (450) has its center ($C_{451}$) disposed on the ring (432). Four sets of two first dipole magnets ($431_{a1}, \ldots, 431_{a8}$) of the first magnetic-field generating device (430) and one third dipole magnet (451) of the third magnetic-field generating device (450) are disposed in an alternating manner on the ring (432). The eight first dipole magnets ($431_{a1}, \ldots, 431_{a8}$) have their magnetic axes substantially tangential (i.e. the eight angles $\alpha_{1-8}$ ($\alpha_1, \ldots, \alpha_8$) are equal to each other, said angles $\alpha_{1-8}$ being 90° to the ring (432) at the position of their respective center $C_{431-a1}, \ldots, C_{431-a8}$).
Figure 4B:
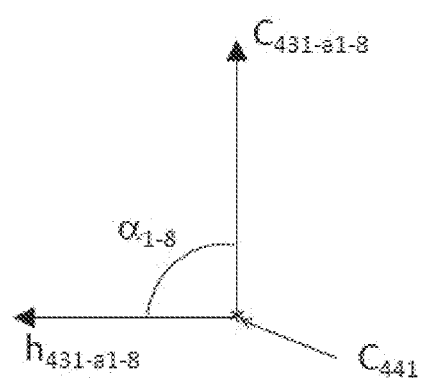
Figure 4C:
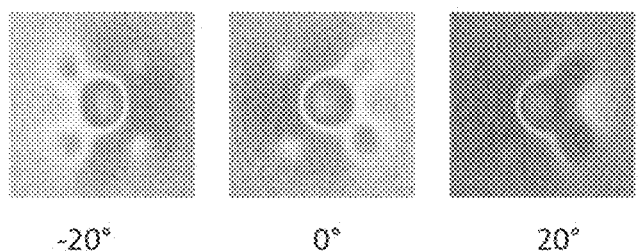
FIG. 4C shows pictures of an OEL obtained by using the apparatus illustrated in FIG. 4A-B, as viewed under different viewing angles.

FIG. 4A-C illustrate an example of a magnetic assembly (400) suitable for producing optical effect layers (OELs) comprising non-spherical magnetic or magnetizable pigment particles on a substrate (420) according to the present invention.

The magnetic assembly (400) comprises a first magnetic-field generating device (430) comprising three or more, in particular eight, first dipole magnets ($431_{a1}$, ..., $431_{a8}$) embedded in a square-shaped supporting matrix (433), a second magnetic-field generating device (440) comprising a second dipole magnet (441) and a third magnetic-field generating device (450) comprising one or more, in particular four, third dipole magnets (451) embedded in the square-shaped supporting matrix (433), wherein the second magnetic-field generating device (440) is disposed above the first magnetic-field generating device (430).

As shown in FIG. 4B, the eight first dipole magnets ($431_{a1}$, ..., $431_{a8}$) are arranged in such a way that each of their centers ($C_{431-a1}$, ..., $C_{431-a8}$) is disposed on a loop, in particular a ring, (432) in the plane (P) being substantially parallel to the substrate (420). The projection of the center of the second dipole magnet (441) on the plane (P) is located at the projection point ($C_{441}$) and is symmetrically disposed within the ring (432), i.e. the projection point ($C_{441}$) also corresponds to the center of the ring (432). The eight first dipole magnets ($431_{a1}$, ..., $431_{a8}$) are distributed around the projection point ($C_{441}$) of the center of the second dipole magnet (441).

The eight first dipole magnets ($431_{a1}$, ..., $431_{a8}$) of the first magnetic-field generating device (430) have their magnetic axes substantially parallel to the plane (P), substantially parallel to the substrate (420) and substantially perpendicular to the magnetic axis of the second dipole magnet (441) of the second magnetic-field generating device (440).

Four sets of two first dipole magnets ($431_{a1/a2}$; $431_{a3/a4}$; $431_{a5/a6}$; $431_{a7/a8}$) of the first magnetic-field generating device (430) and one third dipole magnet (451) of the third magnetic-field generating device (450) are disposed in an alternating manner on the ring-shaped body (432).

The eight angles $\alpha_{1-8}$ respectively formed by i) the vectors $\overrightarrow{C_{441}C_{431-ai}}$ ($\overrightarrow{C_{441}C_{431-a1}}$, ..., $\overrightarrow{C_{441}C_{431-a8}}$) (i.e. the vectors between the projection point ($C_{441}$) and the center ($C_{431-a1}$, ..., $C_{431-a8}$) of each respective dipole magnet of the first magnetic-field generating device (430)) and ii) the vectors $\overrightarrow{h_{431-ai}}$, ($\overrightarrow{h_{431-a1}}$, ..., $\overrightarrow{h_{431-a8}}$), when measured in a counterclockwise direction, are equal to each other, said angles $\alpha_{1-8}$ being 90°, i.e. the eight first dipole magnets ($431_{a1}$, ..., $431_{a8}$) have their magnetic axes substantially tangential to the ring (432) at the position of their respective center ($C_{431-a1}$, ..., $C_{431-a8}$).

The eight first dipole magnets ($431_{a1}$, ..., $431_{a8}$) are distributed around the projection point ($C_{441}$) of the center of the second dipole magnet (441).

The four angles $\beta_1$ respectively formed by the vectors $\overrightarrow{C_{441}C_{431-a1}}$ (corresponding to the straight line from the projection point ($C_{441}$) to the center $C_{431-a1}$ of the cylindrical first dipole magnet ($431_{a1}$)) and $\overrightarrow{C_{441}C_{431-a2}}$; the vectors $\overrightarrow{C_{441}C_{431-a3}}$ and $\overrightarrow{C_{341}C_{331-a4}}$; the vectors $\overrightarrow{C_{441}C_{431-a5}}$ and $\overrightarrow{C_{441}C_{431-a6}}$; and the vectors $\overrightarrow{C_{441}C_{431-a7}}$ and $\overrightarrow{C_{441}C_{431-a8}}$ are equal to each other, in particular 30°. The four angles $\beta_2$ respectively formed by the vectors $\overrightarrow{C_{441}C_{431-a2}}$ (corresponding to the straight line from the projection point ($C_{441}$) to the center $C_{431-a2}$ of the cylindrical first dipole magnet ($431_{a2}$)) and $\overrightarrow{C_{441}C_{431-a3}}$; the vectors $\overrightarrow{C_{441}C_{431-a4}}$ and $\overrightarrow{C_{441}C_{431-a5}}$; the vectors $\overrightarrow{C_{441}C_{431-a6}}$ and $\overrightarrow{C_{441}C_{431-a7}}$; and the vectors $\overrightarrow{C_{441}C_{431-a8}}$ and $\overrightarrow{C_{441}C_{431-a1}}$ are equal to each other, in particular 60°.

The center of the first magnetic-field generating device (430), i.e. the center of the square-shaped supporting matrix (433), and the center of the second magnetic-field generating device (440), i.e. the center of the second dipole magnet (441), are substantially centered with respect to one another and are substantially centered with respect to the projection point ($C_{441}$) of the center of the cylindrical dipole magnet (441).

The distances Y between the projection point ($C_{441}$) of the center of the second dipole magnet (441) and the center ($C_{431-a1}$, ..., $C_{431-a8}$) of each of said eight first dipole magnets ($431_{a1}$, ..., $431_{a8}$) are equal to each other.

The second dipole magnet (441) has its magnetic axis substantially perpendicular to the plane (P) and substantially perpendicular to the substrate (420) with its North pole pointing towards (i.e. facing) the substrate (420). The second dipole magnet (441) is disposed in direct contact and above the supporting matrix (433).

The distance (d) from the uppermost surface of the first magnetic-field generating device (430), i.e. the uppermost surface of the eight first dipole magnets ($431_{a1}$, ..., $431_{a8}$), and the lowermost surface of the second magnetic-field generating device (440), i.e. the lowermost surface of the second dipole magnet (441) is equal to or smaller than the thickness (Z) of the second dipole magnet (441). In particular, the second distance (d) is preferably between about 0 mm and about 5 mm, more preferably between about 0 mm and about 1 mm and still more preferably about 0 mm.

As shown in FIG. 4B, the four third dipole magnets (451) of the third magnetic-field generating device (450) are arranged in such a way that each of their centers are disposed on the loop (432), in particular the ring, in the plane (P) being substantially parallel to the substrate (420). The four third dipole magnets (451) of the third magnetic-field generating device (450) have their magnetic axes substantially perpendicular to the plane (P), substantially perpendicular to the substrate (420), substantially perpendicular to the magnetic axis of the eight first dipole magnets ($431_{a1}$, ..., $431_{a8}$) of the first magnetic-field generating device (430) and substantially parallel to the magnetic axis of the second dipole magnet (441) of the second magnetic-field generating device (440) with the North pole pointing towards (i.e.

facing) the substrate (420). The angles γ respectively formed by the vectors $\overrightarrow{C_{441}C_{431-ax}}$ (corresponding to the straight line from the projection point ($C_{441}$) to the center $C_{431-ax}$ of a first dipole magnet ($431_{ax}$)) and $\overrightarrow{C_{441}C_{451}}$ (corresponding to the straight line from the projection point ($C_{441}$) to the center of an adjacent cylindrical third dipole magnet (451)) are equal to each other, said value being 30°.

The distances between the projection point ($C_{441}$) of the center of the second dipole magnet (441) and the center ($C_{451}$) of the four third dipole magnets (451) of the third magnetic-field generating device (450) are equal to each other and are equal to the distances Y described hereabove.

The distance (e) from the uppermost surface of the second magnetic-field generating device (440) described herein, i.e. the uppermost surface of the second dipole magnet (441), and the lowermost surface of the substrate (420) facing said second magnetic-field generating device (440) is preferably between about 0 mm and about 10 mm, more preferably between about 0 mm and about 5 mm and still more preferably between about 0 mm and about 1 mm.

The resulting OEL produced with the magnetic assembly (400) illustrated in FIG. 4A-B is shown in FIG. 4C at different viewing angles by tilting the substrate (420) between −20° and +20°. The so-obtained OEL provides the optical impression of a ring surrounded by four loop-shaped bodies having their shape and their brightness varying upon tilting the optical effect layer (OEL).

Figure 5A:
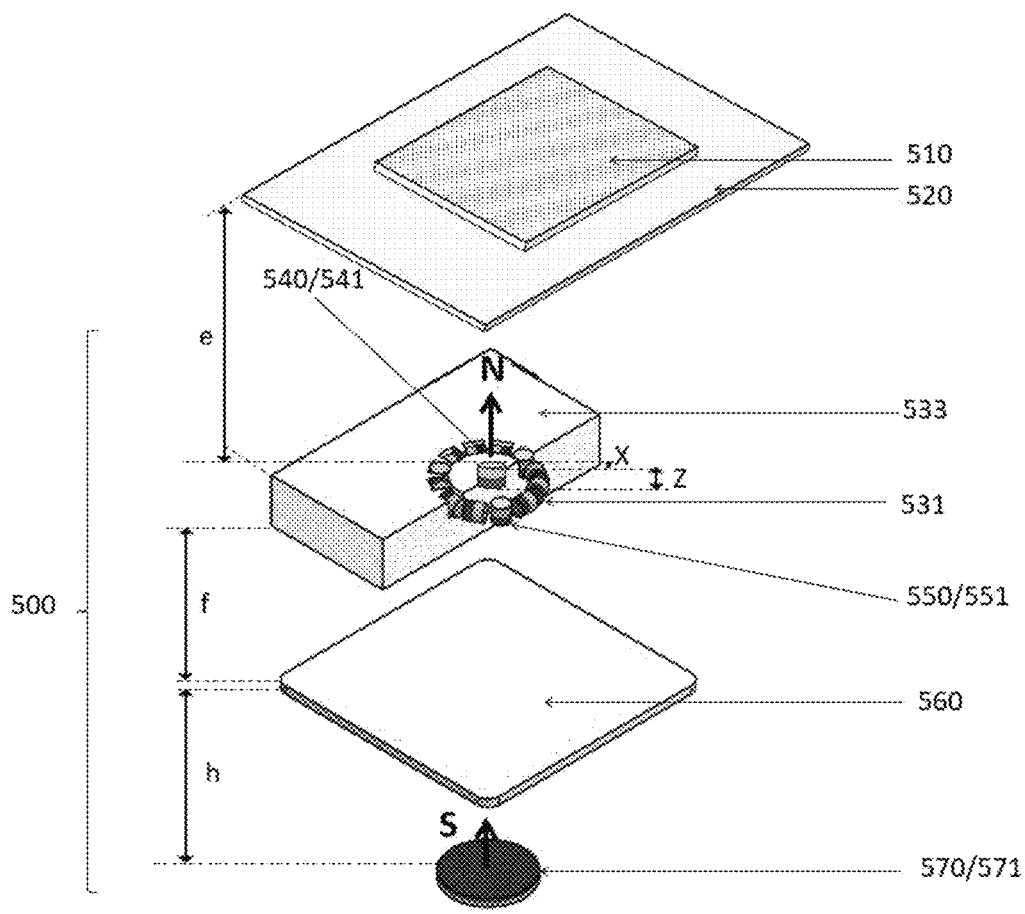
FIG. 5A schematically illustrates a magnetic assembly (500) for producing an optical effect layer (OEL) on a substrate (520). The magnetic assembly (500) comprises a first magnetic-field generating device (530) comprising nine first dipole magnets ($531_{a1}, 531_{a9}$) being embedded in a supporting matrix (533); a second magnetic-field generating device (540) comprising a second dipole magnet (541) having its magnetic axis substantially perpendicular to the substrate (520) with its North pole pointing towards the substrate (520); a third magnetic-field generating device (550) comprising three third dipole magnets (551) having their magnetic axes substantially perpendicular to the substrate (520) with their North poles pointing towards the substrate (520) and being embedded in the supporting matrix (533); a fourth magnetic-field generating device (570) comprising a fourth dipole magnet (571) having its magnetic axis substantially perpendicular to the substrate (520) with its South pole pointing towards the substrate (520); and a pole piece (560).
Figure 5B:
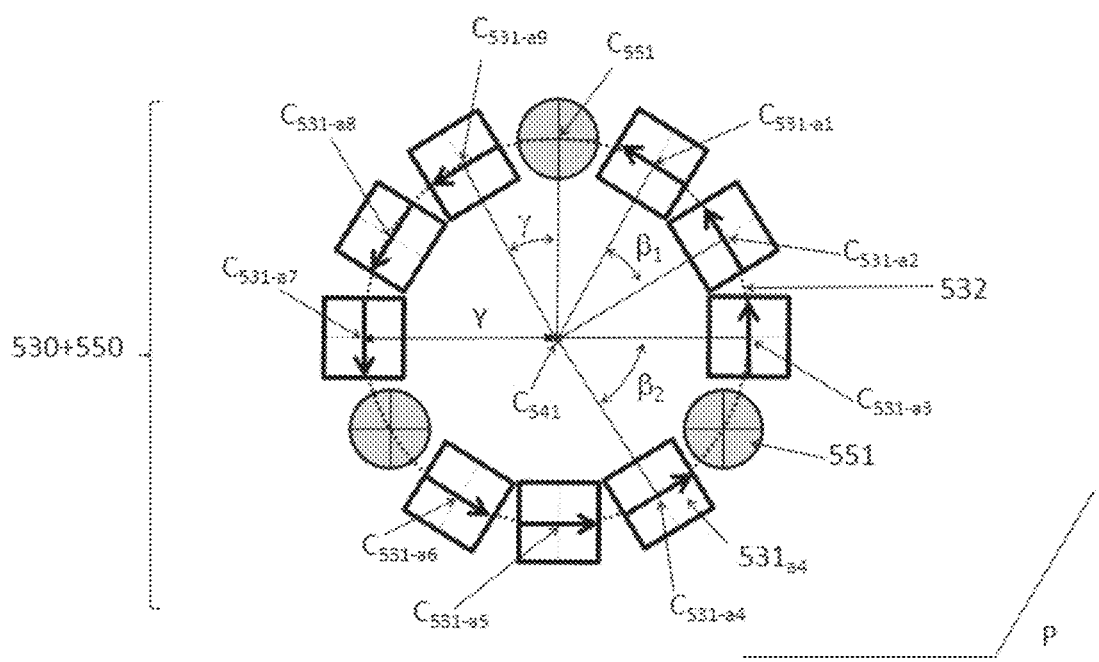
FIG. 5B schematically illustrates a top view of the first magnetic-field generating device (530) and third magnetic-field generating device (550) of the magnetic assembly (500) of FIG. 5A, wherein each of the nine first dipole magnets ($531_{a1}, \ldots, 531_{a9}$) of the first magnetic-field generating device (530) has its center disposed on a ring (532) and wherein each of the three third dipole magnets (551) of the third magnetic-field generating device (550) has its center ($C_{551}$) disposed on the ring (532). Three sets of three first dipole magnets ($531_{a1}, \ldots, 531_{a9}$) of the first magnetic-field generating device (530) and one third dipole magnet (551) of the third magnetic-field generating device (550) are disposed in an alternating manner on the ring (532). The nine first dipole magnets ($531_{a1}, \ldots, 531_{a9}$) have their magnetic axes substantially tangential to the ring (532) (i.e. the nine angles $\alpha_{1-9}$, ($\alpha_1, \ldots, \alpha_9$) are equal to each other, said angles $\alpha_{1-9}$ being 90° at the position of their respective center ($C_{531-a1}, \ldots, C_{531-a9}$).
Figure 5B:
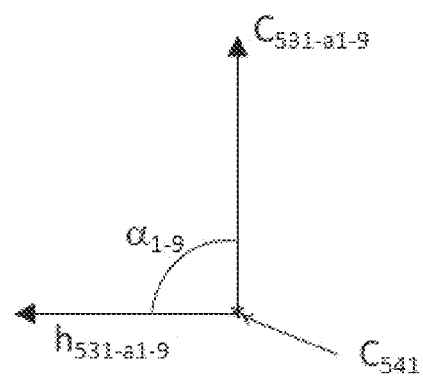
Figure 5C:
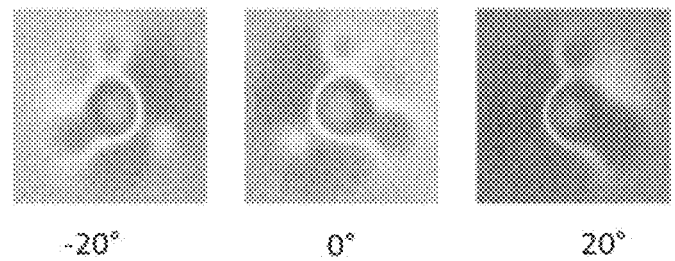
FIG. 5C shows pictures of an OEL obtained by using the apparatus illustrated in FIG. 5A-B, as viewed under different viewing angles.

FIG. 5A-C illustrate an example of a magnetic assembly (500) suitable for producing optical effect layers (OELs) comprising non-spherical magnetic or magnetizable pigment particles on a substrate (520) according to the present invention.

The magnetic assembly (500) comprises a first magnetic-field generating device (530) comprising three or more, in particular nine, first dipole magnets ($531_{a1}$, . . . , $531_{a9}$) embedded in a square-shaped supporting matrix (533), a second magnetic-field generating device (540) comprising a second dipole magnet (541) and a third magnetic-field generating device (550) comprising one or more, in particular three, third dipole magnets (551) embedded in the square-shaped supporting matrix (533), wherein the second magnetic-field generating device (540) is disposed above the first magnetic-field generating device (530). The magnetic assembly (500) further comprises a square-shaped pole piece (560) and a fourth magnetic-field generating device (570) comprising a disc-shaped fourth dipole magnet (571), wherein the first magnetic-field generating device (530) is disposed above the square-shaped pole piece (560) and the square-shaped pole piece (560) is disposed above the fourth magnetic-field generating device (570).

As shown in FIG. 5B, the nine first dipole magnets ($531_{a1}$, . . . , $531_{a9}$) are arranged in such a way that each of their centers ($C_{531-a1}$, . . . , $C_{531-a9}$) is disposed on a loop (532), in particular a ring, in the plane (P) being substantially parallel to the substrate (520). The projection of the center of the second dipole magnet (541) on the plane (P) is located at the projection point ($C_{541}$) and is symmetrically disposed within the ring (532), i.e. the projection point ($C_{541}$) also corresponds to the center of the ring (532).

The nine first dipole magnets ($531_{a1}$, . . . , $531_{a9}$) of the first magnetic-field generating device (530) have their magnetic axes substantially parallel to the plane (P), substantially parallel to the substrate (520) and substantially perpendicular to the magnetic axis of the second dipole magnet (541) of the second magnetic-field generating device (540).

Three sets of three first dipole magnets ($531_{a1/a2/a3}$, $531_{a4/a5/a6}$, $531_{a7/a8/a9}$) of the first magnetic-field generating device (530) and one third dipole magnet (551) of the third magnetic-field generating device (550) are disposed in an alternating manner on the ring (532).

The nine first dipole magnets ($531_{a1}$, . . . , $531_{a9}$) are distributed around the projection point ($C_{541}$) of the center of the second dipole magnet (541). The nine angles $\alpha_{1-9}$ respectively formed by i) the vectors $\overrightarrow{C_{541}C_{531-ai}}$ ($\overrightarrow{C541C531-a1}$, . . . , $\overrightarrow{C_{541}C_{531-a9}}$) (i.e. the vectors between the projection point ($C_{541}$) and the center ($C_{531-a1}$, . . . , $C_{531-a9}$) of each respective dipole magnet of the first magnetic-field generating device (530)) and ii) the vectors $\overrightarrow{h_{531-ai}}$ ($\overrightarrow{h_{531-a1}}$, . . . , $\overrightarrow{h_{531-a8}}$); when measured in a counterclockwise direction, are equal to each other, said angles $\alpha_{1-9}$ being 90°, i.e. the nine first dipole magnets ($531_{a1}$, . . . , $531_{a9}$) have their magnetic axes substantially tangential to the ring (532) at the position of their respective center ($C_{531-a1}$, . . . , $C_{531-a9}$).

The six angles $\beta_1$ respectively formed by the vectors $\overrightarrow{C_{541}C_{531-a1}}$ (corresponding to the straight line from the projection point ($C_{541}$) to the center $C_{531-a1}$ of the cylindrical first dipole magnet ($531_{a1}$)) and $\overrightarrow{C_{541}C_{531-a2}}$; the vectors $\overrightarrow{C_{541}C_{531-a2}}$ and $\overrightarrow{C_{541}C_{531-a3}}$; the vectors $\overrightarrow{C_{541}C_{531-a4}}$ and $\overrightarrow{C_{541}C_{531-a5}}$; the vectors $\overrightarrow{C_{541}C_{531-a5}}$ and $\overrightarrow{C_{541}C_{551-a6}}$; the vectors $\overrightarrow{C_{541}C_{531-a7}}$ and $\overrightarrow{C_{541}C_{551-a8}}$; and the vectors $\overrightarrow{C_{541}C_{531-a8}}$ and $\overrightarrow{C_{541}C_{551-a9}}$ are equal to each other, in particular 30°. The three angles β respectively formed by the vectors $\overrightarrow{C_{541}C_{531-a3}}$ (corresponding to the straight line from the projection point ($C_{441}$) to the center $C_{431-a3}$ of the cylindrical first dipole magnet ($531_{a1}$)) and $\overrightarrow{C_{541}C_{531-a4}}$; the vectors $\overrightarrow{C_{541}C_{531-a6}}$ and $\overrightarrow{C_{541}C_{531-a7}}$; and the vectors $\overrightarrow{C_{541}C_{531-a9}}$ and $\overrightarrow{C_{541}C_{531-a1}}$ are equal to each other, in particular 60°.

The distances Y between the projection point ($C_{541}$) of the center of the second dipole magnet (541) and the center ($C_{531-a1}$, . . . , $C_{531-a9}$) of each of said nine first dipole magnets ($531_{a1}$, . . . , $531_{a9}$) are equal to each other.

The second dipole magnet (541) has its magnetic axis substantially perpendicular to the plane (P) and substantially perpendicular to the substrate (520) with its North pole pointing towards (i.e. facing) the substrate (520). The second dipole magnet (541) is disposed in direct contact and above the supporting matrix (533).

The distance (d) from the uppermost surface of the first magnetic-field generating device (530), i.e. the uppermost surface of the nine first dipole magnets ($531_{a1}$, . . . , $531_{a9}$), and the lowermost surface of the second dipole magnet (541) described herein, i.e. the lowermost surface second dipole magnet (541) is equal to or smaller than the thickness (Z) of the second dipole magnet (541). In particular, the second distance (d) is preferably between about 0 mm and about 5 mm, more preferably between about 0 mm and about 1 mm and still more preferably about 0 mm.

As shown in FIG. 5B, the three third dipole magnets (551) of the third magnetic-field generating device (550) are arranged in such a way that each of their centers are disposed on the loop, in particular the ring, (532) in the plane (P) being substantially parallel to the substrate (520). The three third dipole magnets (551) of the third magnetic-field generating device (550) have their magnetic axes substantially perpendicular to the plane (P), substantially perpendicular to the substrate (520), substantially perpendicular to the magnetic axis of the nine first dipole magnets ($531_{a1}, \ldots, 531_{a9}$) of the first magnetic-field generating device (530) and substantially parallel to the magnetic axis of the second dipole magnet (541) of the second magnetic-field generating device (540) with the North pole pointing towards (i.e. facing) the substrate (520). The angles γ respectively formed by the vectors $\overrightarrow{C_{541}C_{531-ax}}$ (corresponding to the straight lines from the projection point ($C_{541}$) to the center $C_{531-ax}$ of a first dipole magnet ($531_{ax}$) and $\overrightarrow{C_{541}C_{551}}$ (corresponding to the straight lines from the projection point ($C_{541}$) to the center of an adjacent cylindrical third dipole magnet (551)) are equal to each other, said value being 30°.

The distances between the projection point ($C_{541}$) of the center of the second dipole magnet (541) and the center ($C_{551}$) of the three third dipole magnets (551) of the third magnetic-field generating device (550) are equal to each other and are equal to the distances Y described hereabove.

The square-shaped pole piece (560) is disposed below the square-shaped supporting matrix (533) of the first magnetic-field generating device (530). The distance (f) from the lowermost surface of the first magnetic-field generating device (530), i.e. the lowermost surface of the square-shaped supporting matrix (533), and the uppermost surface of the square-shaped pole piece (560) is preferably between about 0 mm and about 1 mm, more preferably about 0 mm.

The disc-shaped fourth dipole magnet (571) of the fourth magnetic-field generating device (570) is disposed below the square-shaped pole piece (560). The disc-shaped fourth dipole magnet (571) has its magnetic axis substantially perpendicular to the plane (P), substantially perpendicular to the substrate (520) and substantially perpendicular to the magnetic axis of the nine first dipole magnets ($531_{a1}, \ldots, 531_{a9}$) of the first magnetic assembly (530) with its South pole pointing towards (i.e. facing) the substrate (520).

The center of the first magnetic-field generating device (530), i.e. the center of the square-shaped supporting matrix (533), and the center of the second magnetic-field generating device (240), i.e. the center of the second dipole magnet (541), are substantially centered with respect to one another and are substantially centered with respect to the projection point ($C_{541}$) of the center of the cylindrical dipole magnet (541). The center of the square-shaped pole piece (560) and the center of the disc-shaped fourth dipole magnet (571) are substantially centered with respect to one another and are substantially centered with respect to the projection point ($C_{541}$) of the center of the cylindrical dipole magnet (541).

The distance (e) from the uppermost surface of the second magnetic-field generating device (540) described herein, i.e. the uppermost surface of the second dipole magnet (541), and the lowermost surface of the substrate (520) facing said second magnetic-field generating device (540) is preferably between about 0 mm and about 10 mm, more preferably between about 0 mm and about 5 mm and still more preferably between about 0 mm and about 1 mm.

The distance (h) from the lowermost surface of the square-shaped pole piece (560) and the uppermost surface of the fourth magnetic-field generating device (570), i.e. the uppermost surface of the disc-shaped fourth dipole magnet (571), is preferably between about 0 mm and about 1 mm, more preferably about 0 mm.

The resulting OEL produced with the magnetic assembly (500) illustrated in FIG. 5A-B is shown in FIG. 5C at different viewing angles by tilting the substrate (520) between −20° and +20°. The so-obtained OEL provides the optical impression of a ring surrounded by three loop-shaped bodies having their shape and their brightness varying upon tilting the optical effect layer (OEL).

Figure 6A:
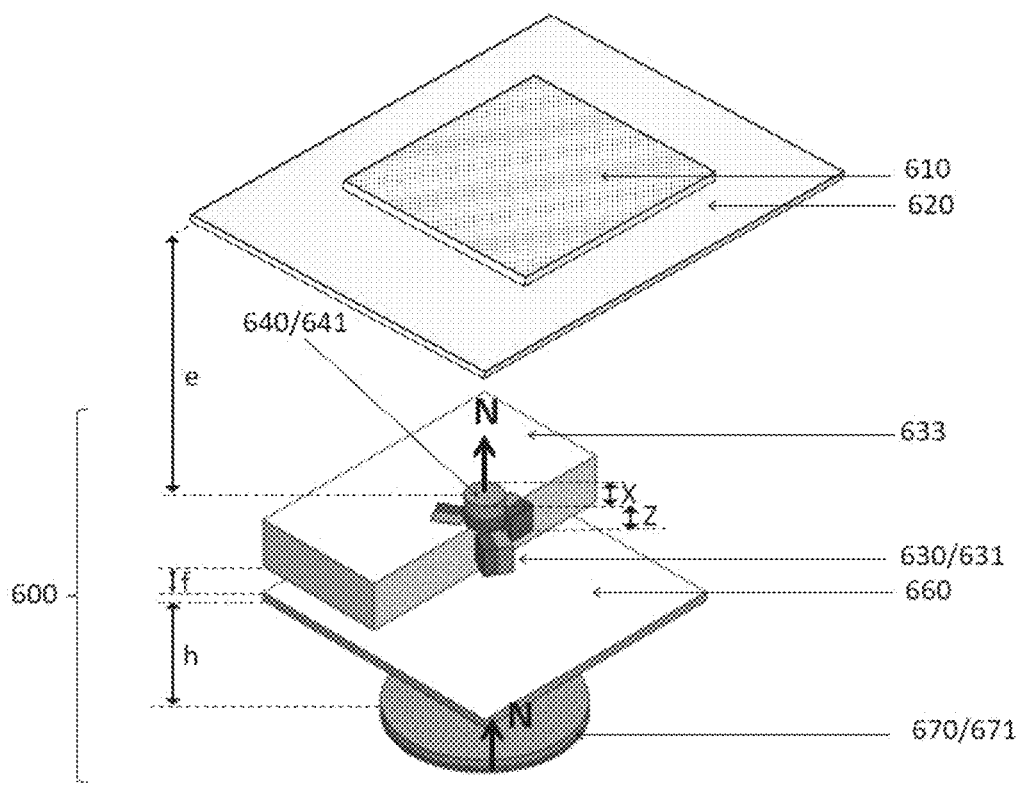
FIG. 6A schematically illustrates a magnetic assembly (600) for producing an optical effect layer (OEL) on a substrate (620). The magnetic assembly (600) comprises a first magnetic-field generating device (630) comprising three first dipole magnets ($631_{a1}, 631_{a2}, 631_{a3}$) having their magnetic axes substantially parallel to the substrate (620) and being embedded in a supporting matrix (633); a second magnetic-field generating device (640) comprising a second dipole magnet (641) having its magnetic axis substantially perpendicular to the substrate (620) with its North pole pointing towards the substrate (620); a fourth magnetic-field generating device (670) comprising a fourth dipole magnet (671) having its magnetic axis substantially perpendicular to the substrate (620) with its North pole pointing towards the substrate (620); and a pole piece (660).
Figure 6C:
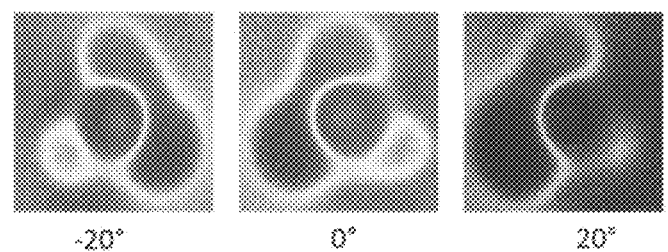
FIG. 6C shows pictures of an OEL obtained by using the apparatus illustrated in FIG. 6A-B, as viewed under different viewing angles.

FIG. 6A-C illustrate an example of a magnetic assembly (600) suitable for producing optical effect layers (OELs) comprising non-spherical magnetic or magnetizable pigment particles on a substrate (620) according to the present invention.

The magnetic assembly (600) comprises a first magnetic-field generating device (630) comprising three or more, in particular three, first dipole magnets ($631_{a1}$, $631_{a2}$, $631_{a3}$) embedded in a square-shaped supporting matrix (633) and a second magnetic-field generating device (640) comprising a second dipole magnet (641), wherein the second magnetic-field generating device (640) is disposed above the first magnetic-field generating device (630). The magnetic assembly (600) further comprises a square-shaped pole piece (660) and a fourth magnetic-field generating device (670) comprising a disc-shaped fourth dipole magnet (671), wherein the first magnetic-field generating device (630) is disposed above the square-shaped pole piece (660) and the square-shaped pole piece (660) is disposed above the fourth magnetic-field generating device (670).

As shown in FIG. 6B, the three first dipole magnets ($631_{a1}$, $631_{a2}$, $631_{a3}$) are arranged in such a way that each of their centers ($C_{631-a1}$, $C_{631-a2}$ and $C_{631-a3}$) is disposed on a loop (632), in particular a ring, in the plane (P) being substantially parallel to the substrate (620). The projection of the center of the second dipole magnet (641) on the plane (P) is located at the projection point ($C_{641}$) and is symmetrically disposed within the ring (632), i.e. the projection point ($C_{641}$) also corresponds to the center of the ring (632). The three first dipole magnets ($631_{a1}$, $631_{a2}$, $631_{a3}$) are evenly distributed around the projection point ($C_{641}$) of the center of the second dipole magnet (641).

The three first dipole magnets ($631_{a1}$, $631_{a2}$, $631_{a3}$) of the first magnetic-field generating device (630) have their magnetic axes substantially parallel to the plane (P), substantially parallel to the substrate (620) and substantially perpendicular to the magnetic axis of the second dipole magnet (641) of the second magnetic-field generating device (640). The three angles $\alpha_{1/2/3}$ respectively formed by i) the vectors $\overrightarrow{C_{641}C_{631-ai}}$ ($\overrightarrow{C_{641}C_{631-a1}}$, $\overrightarrow{C_{641}C_{631-a2}}$, $\overrightarrow{C_{641}C_{631-a2}}$) (i.e. the vectors between the projection point ($C_{641}$) and the center ($C_{631-a1}$, $C_{631-a2}$ and $C_{631-a3}$) of each respective first dipole magnet of the first magnetic-field generating device (630)) and ii) the vectors $\overrightarrow{h_{631-ai}}$ ($\overrightarrow{h_{631-a1}}$, $\overrightarrow{h_{631-a2}}$, $\overrightarrow{h_{631-a3}}$); when measured in a counterclockwise direction, are equal to each other, said angles $\alpha_{1/2/3}$ being 90°, i.e. the three first dipole magnets ($631_{a1}$, $631_{a2}$, $631_{a3}$) have their magnetic axes substantially tangential to the ring (632) at the position of their respective center ($C_{631-a1}$, $C_{631-a2}$ and $C_{631-a3}$).

The three angles β respectively formed by the vectors $\overrightarrow{C_{641}C_{631-a1}}$ (corresponding to the straight line from the projection point ($C_{641}$) to the center $C_{631-a1}$ of the cubic first dipole magnet ($631_{a1}$)) and $\overrightarrow{C_{641}C_{631-a2}}$; the vectors $\overrightarrow{C_{641}C_{631-a2}}$ and $\overrightarrow{C_{641}C_{631-a3}}$; and the vectors $\overrightarrow{C_{641}C_{631-a3}}$ and $\overrightarrow{C_{641}C_{631-a1}}$ are equal to each other, in particular 120°.

The distances Y between the projection point ($C_{241}$) of the center of the second dipole magnet (641) and the center ($C_{631-a1}$, $C_{631-a2}$ and $C_{631-a3}$) of each of said three first dipole magnets ($631_{a1}$, $631_{a2}$, $631_{a3}$) are equal to each other.

The second dipole magnet (641) has its magnetic axis substantially perpendicular to the plane (P) and substantially perpendicular to the substrate (620) with its North pole pointing towards (i.e. facing) the substrate (620). The second dipole magnet (641) is disposed in direct contact and above the supporting matrix (633).

The distance (d) from the uppermost surface of the first magnetic-field generating device (630), i.e. the uppermost surface of the three first dipole magnets ($631_{a1}$, $631_{a2}$, $631_{a3}$), and the lowermost surface of the second dipole magnet (641) is equal to or smaller than the thickness (Z) of the second dipole magnet (641). In particular, the second distance (d) is preferably between about 0 mm and about 5 mm, more preferably between about 0 mm and about 1 mm and still more preferably about 0 mm.

The square-shaped pole piece (660) is disposed below the square-shaped supporting matrix (633) of the first magnetic-field generating device (630). The distance (f) from the lowermost surface of the first magnetic-field generating device (630), i.e. the lowermost surface of the square-shaped supporting matrix (633), and the uppermost surface of the square-shaped pole piece (660) is preferably between about 0 mm and about 1 mm, more preferably about 0 mm.

The disc-shaped fourth dipole magnet (671) of the fourth magnetic-field generating device (670) is disposed below the square-shaped pole piece (660). The disc-shaped fourth dipole magnet (671) has its magnetic axis substantially perpendicular to the plane (P), substantially perpendicular to the substrate (620) and substantially perpendicular to the magnetic axis of the three first dipole magnets ($631_{a1}$, $631_{a2}$, $631_{a3}$) of the first magnetic assembly (630) with its North pole pointing towards (i.e. facing) the substrate (620).

The center of the first magnetic-field generating device (630), i.e. the center of the square-shaped supporting matrix (633), and the center of the second magnetic-field generating device (640), i.e. the center of the second dipole magnet (641), are substantially centered with respect to one another and are substantially centered with respect to the projection point ($C_{641}$) of the center of the cylindrical dipole magnet (641). The center of the square-shaped pole piece (660) and the center of the disc-shaped fourth dipole magnet (671) are substantially centered with respect to one another and are substantially centered with respect to the projection point ($C_{641}$) of the center of the cylindrical dipole magnet (641).

The distance (e) from the uppermost surface of the second magnetic-field generating device (640) described herein, i.e. the uppermost surface of the second dipole magnet (641), and the lowermost surface of the substrate (620) facing said second magnetic-field generating device (640) is preferably between about 0 mm and about 10 mm, more preferably between about 0 mm and about 5 mm and still more preferably between about 0 mm and about 1 mm.

The distance (h) from the lowermost surface of the square-shaped pole piece (660) and the uppermost surface of the fourth magnetic-field generating device (670), i.e. the uppermost surface of the disc-shaped fourth dipole magnet (671), is preferably between about 0 mm and about 1 mm, more preferably about 0 mm.

The resulting OEL produced with the magnetic assembly (600) illustrated in FIG. 6A-B is shown in FIG. 6C at different viewing angles by tilting the substrate (620) between −20° and +20°. The so-obtained OEL provides the optical impression of a ring surrounded by more than one loop-shaped bodies having their shape and their brightness varying upon tilting the optical effect layer (OEL).

Figure 7A:
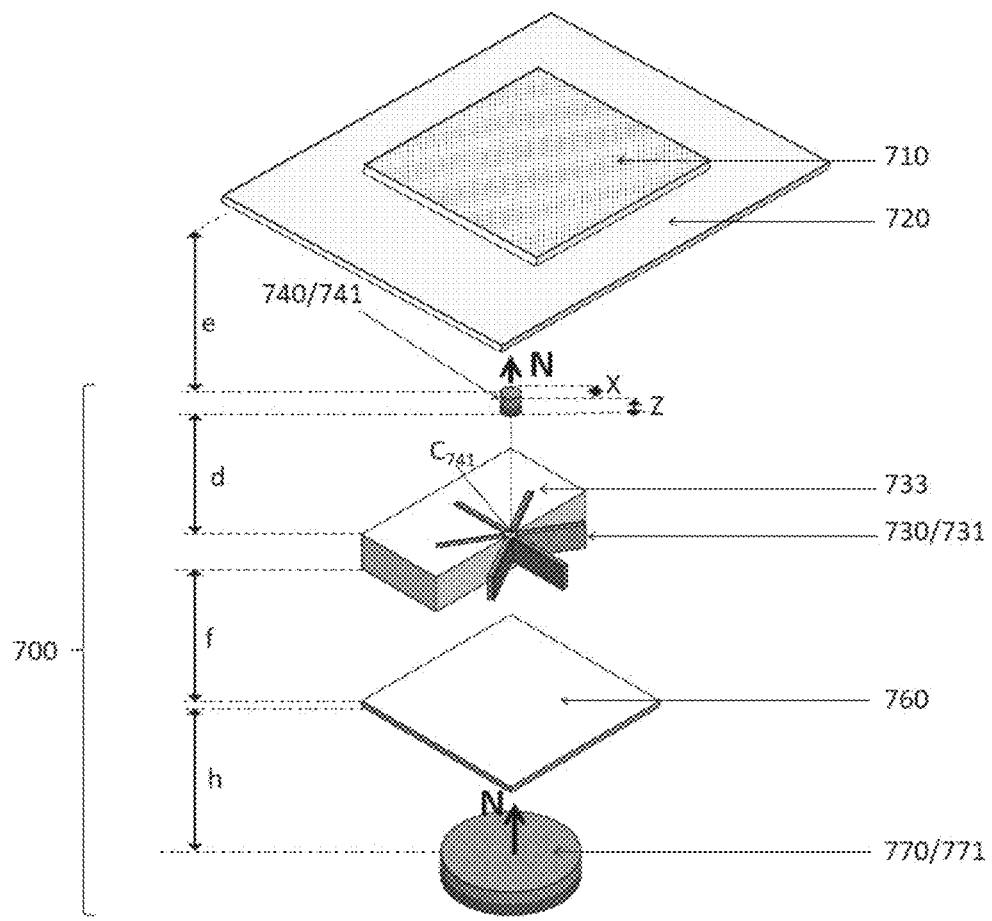
FIG. 7A schematically illustrates a magnetic assembly (700) for producing an optical effect layer (OEL) on a substrate (720). The magnetic assembly (700) comprises a first magnetic-field generating device (730) comprising six first dipole magnets ($731_{a1}, \ldots, 731_{a6}$) having their magnetic axes substantially parallel to the substrate (720) and being embedded in a supporting matrix (733); a second magnetic-field generating device (740) comprising a second dipole magnet (741) having its magnetic axis substantially perpendicular to the substrate (720) with its North pole pointing towards the substrate (720); a fourth magnetic-field generating device (770) comprising a fourth dipole magnet (771) having its magnetic axis substantially perpendicular to the substrate (720) with its North pole pointing towards the substrate (720); and a pole piece (760).
Figure 7C:
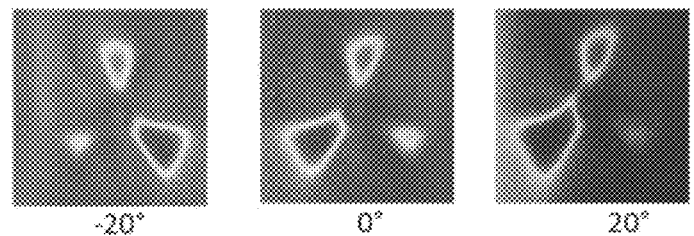
FIG. 7C shows pictures of an OEL obtained by using the apparatus illustrated in FIG. 7A-B, as viewed under different viewing angles.

FIG. 7A-C illustrate an example of a magnetic assembly (700) suitable for producing optical effect layers (OELs) comprising non-spherical magnetic or magnetizable pigment particles on a substrate (720) according to the present invention.

The magnetic assembly (700) comprises a first magnetic-field generating device (730) comprising three or more, in particular six, first dipole magnets ($731_{a1}$, . . . , $731_{a6}$) embedded in a square-shaped supporting matrix (733) and a second magnetic-field generating device (740) comprising a second dipole magnet (741), wherein the second magnetic-field generating device (740) is disposed above the first magnetic-field generating device (730). The magnetic assembly (700) further comprises a square-shaped pole piece (760) and a fourth magnetic-field generating device (770) comprising a disc-shaped fourth dipole magnet (771), wherein the first magnetic-field generating device (730) is disposed above the square-shaped pole piece (760) and the square-shaped pole piece (760) is disposed above the fourth magnetic-field generating device (770).

As shown in FIG. 7B, the six first dipole magnets ($731_{a1}$, . . . , $731_{a6}$) are arranged in such a way that each of their centers ($C_{731-a1}$, . . . , $C_{731-a6}$) is disposed on a loop (732), in particular a ring), in the plane (P) being substantially parallel to the substrate (720). The projection of the center of the second dipole magnet (741) on the plane (P) is located at the projection point ($C_{741}$) and is symmetrically disposed within the ring (732), i.e. the projection point ($C_{741}$) also corresponds to the center of the ring (732). The six first dipole magnets ($731_{a1}$, $731_{a6}$) are evenly distributed around the projection point ($C_{741}$) of the center of the second dipole magnet (741).

The six first dipole magnets ($731_{a1}$, . . . , $731_{a6}$) of the first magnetic-field generating device (730) have their magnetic axes substantially parallel to the plane (P), substantially parallel to the substrate (720) and substantially perpendicular to the magnetic axis of the second dipole magnet (741) of the second magnetic-field generating device (740).

The three angles $\alpha_{1/3/5}$ respectively formed by i) the vectors $\overrightarrow{C_{741}C_{731-ai}}$ ($\overrightarrow{C_{741}C_{731-a1}}$, $\overrightarrow{C_{741}C_{731-a3}}$, $\overrightarrow{C_{741}C_{731-a5}}$) (i.e. the vectors between the projection point ($C_{741}$) and the center ($C_{731-a1}$, $C_{731-a3}$ and $C_{731-a5}$) of each respective first dipole magnet of the first magnetic-field generating device (730)) and ii) the vectors $\overrightarrow{h_{731-ai}}$ ($\overrightarrow{h_{731-a1}}$, $\overrightarrow{h_{731-a3}}$, $\overrightarrow{h_{731-a5}}$), when measured in a counterclockwise direction, are equal to each other, in particular 90°, i.e. the three first dipole magnets ($731_{a1}$, $731_{a3}$, $731_{a5}$) have their magnetic axes substantially tangential to the ring (732) at the position of their respective center ($C_{731-a1}$, $C_{731-a3}$ and $C_{731-a5}$) The three angles $\alpha_{2/4/6}$ respectively formed by i) the vectors $\overrightarrow{C_{741}C_{731-ai}}$ ($\overrightarrow{C_{741}C_{731-a2}}$, $\overrightarrow{C_{741}C_{731-a4}}$, $\overrightarrow{C_{741}C_{731-a6}}$) (i.e. the vectors between the projection point ($C_{241}$) and the center ($C_{731-a2}$, $C_{731-a4}$ and $C_{731-a6}$) of each respective first dipole magnet of the first magnetic-field generating device (730)) and ii) the vectors $\overrightarrow{h_{731-ai}}$ ($\overrightarrow{h_{731-a2}}$, $\overrightarrow{h_{731-a4}}$, $\overrightarrow{h_{731-a6}}$); when measured in a counterclockwise direction, are equal to each other, in particular 270°, i.e. the three first dipole magnets ($731_{a2}$, $731_{a4}$, $731_{a6}$) have their magnetic axes substantially tangential to the ring (732) at the position of their respective center ($C_{731-a2}$, $C_{731-a4}$ and $C_{731-a6}$).

The six angles β respectively formed by the vectors $\overrightarrow{C_{741}C_{731-a1}}$ (corresponding to the straight line from the projection point ($C_{741}$) to the center $C_{731-a1}$ of the parallelepiped first dipole magnet ($731_{a1}$) and $\overrightarrow{C_{741}C_{731-a2}}$; the vectors $\overrightarrow{C_{741}C_{731-a2}}$ and $\overrightarrow{C_{741}C_{731-a3}}$; the vectors $\overrightarrow{C_{741}C_{731-a3}}$ and $\overrightarrow{C_{741}C_{731\text{-}a4}}$; the vectors $\overrightarrow{C_{741}C_{731\text{-}a4}}$ and $\overrightarrow{C_{741}C_{731\text{-}a5}}$; the vectors $\overrightarrow{C_{741}C_{731\text{-}a5}}$ and $\overrightarrow{C_{741}C_{731\text{-}a6}}$; and the vectors $\overrightarrow{C_{741}C_{731\text{-}a6}}$ and $\overrightarrow{C_{741}C_{731\text{-}a1}}$ are equal to each other, in particular 60°.

The distances Y between the projection point ($C_{741}$) of the center of the second dipole magnet (741) and the center ($C_{731\text{-}a1}, \ldots, C_{731\text{-}a6}$ of each of said six first dipole magnets ($731_{a1}, \ldots, 731_{a6}$) are equal to each other.

The second dipole magnet (741) has its magnetic axis substantially perpendicular to the plane (P) and substantially perpendicular to the substrate (720) with its North pole pointing towards (i.e. facing) the substrate (720). The second dipole magnet (741) is disposed in direct contact and above the supporting matrix (733).

The distance (d) from the uppermost surface of the first magnetic-field generating device (730), i.e. the uppermost surface of the six first dipole magnets ($731_{a1}, \ldots, 731_{a6}$), and the lowermost surface of the second dipole magnet (741) is equal to or smaller than the thickness (Z) of the second dipole magnet (741). In particular, the second distance (d) is preferably between about 0 mm and about 5 mm, more preferably between about 0 mm and about 1 mm and still more preferably about 0 mm.

The square-shaped pole piece (760) is disposed below the square-shaped supporting matrix (733) of the first magnetic-field generating device (730). The distance (f) from the lowermost surface of the first magnetic-field generating device (730), i.e. lowermost surface of the square-shaped supporting matrix (733), and the uppermost surface of the square-shaped pole piece (760) is preferably between about 0 mm and about 1 mm, more preferably about 0 mm.

The disc-shaped fourth dipole magnet (771) of the fourth magnetic-field generating device (770) is disposed below the square-shaped pole piece (760). The disc-shaped fourth dipole magnet (771) has its magnetic axis substantially perpendicular to the plane (P), substantially perpendicular to the substrate (720) and substantially perpendicular to the magnetic axis of the three first dipole magnets ($731_{a1}, \ldots, 731_{a6}$) of the first magnetic assembly (730) with its North pole pointing towards (i.e. facing) the substrate (720).

The center of the first magnetic-field generating device (730), i.e. the center of the square-shaped supporting matrix (733), and the center of the second magnetic-field generating device (740), i.e. the center of the second dipole magnet (741), are substantially centered with respect to one another and are substantially centered with respect to the projection point ($C_{741}$) of the center of the cylindrical dipole magnet (741). The center of the square-shaped pole piece (760) and the center of the disc-shaped fourth dipole magnet (771) are substantially centered with respect to one another and are substantially centered with respect to the projection point ($C_{741}$) of the center of the cylindrical dipole magnet (741).

The distance (h) from the lowermost surface of the square-shaped pole piece (760) and the uppermost surface of the fourth magnetic-field generating device (770), i.e. the uppermost surface of the disc-shaped fourth dipole magnet (771), is preferably between about 0 mm and about 1 mm, more preferably about 0 mm.

The distance (e) from the uppermost surface of the second magnetic-field generating device (740) described herein, i.e. the uppermost surface of the second dipole magnet (741), and the lowermost surface of the substrate (720) facing said second magnetic-field generating device (740) is preferably between about 0 mm and about 10 mm, more preferably between about 0 mm and about 5 mm and still more preferably between about 0 mm and about 1 mm.

The resulting OEL produced with the magnetic assembly (700) illustrated in FIG. 7A-B is shown in FIG. 7C at different viewing angles by tilting the substrate (720) between −20° and +20°. The so-obtained OEL provides the optical impression of a ring surrounded by three loop-shaped bodies having their shape and their brightness varying upon tilting the optical effect layer (OEL).

Figure 8A:
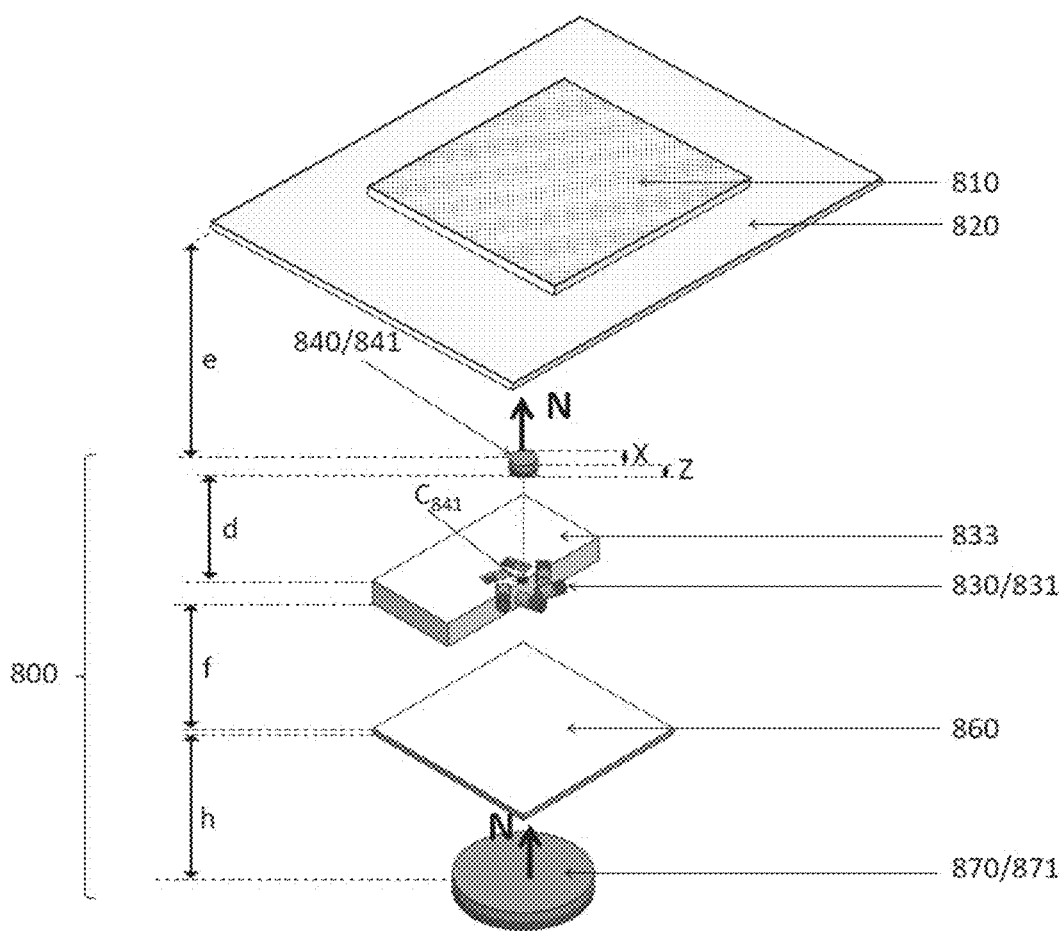
FIG. 8A schematically illustrates a magnetic assembly (800) for producing an optical effect layer (OEL) on a substrate (820). The magnetic assembly (800) comprises a first magnetic-field generating device (830) comprising six first dipole magnets ($831_{a1}, \ldots, 831_{a6}$) having their magnetic axes substantially parallel to the substrate (820) and being embedded in a supporting matrix (833); a second magnetic-field generating device (840) comprising a second dipole magnet (841) having its magnetic axis substantially perpendicular to the substrate (820) with its North pole pointing towards the substrate (820); a fourth magnetic-field generating device (870) comprising a fourth dipole magnet (871) having its magnetic axis substantially perpendicular to the substrate (820) with its North pole pointing towards the substrate (820); and a pole piece (860).
Figure 8B:
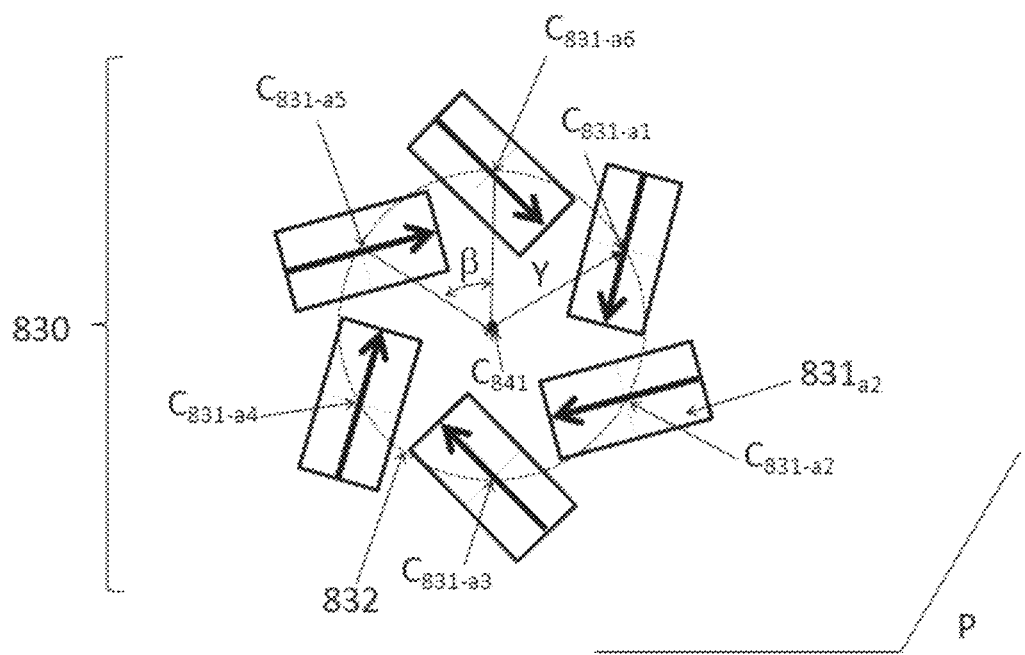
FIG. 8B schematically illustrates a top view of the first magnetic-field generating device (830) of the magnetic assembly (800) of FIG. 8A, wherein each of the six first dipole magnets ($831_{a1}, \ldots, 831_{a6}$) of the first magnetic-field generating device (830) has its center ($C_{831-a1}, \ldots, C_{831-a6}$) disposed on a ring (832). The six angles $\alpha_{1-6}$ ($\alpha_1, \ldots, \alpha_6$) are equal to each other, said angles $\alpha_{1-6}$ being 225°.
Figure 8B:
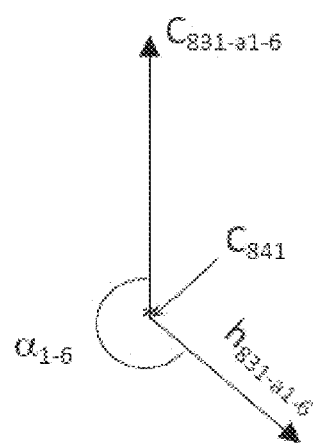
Figure 8C:
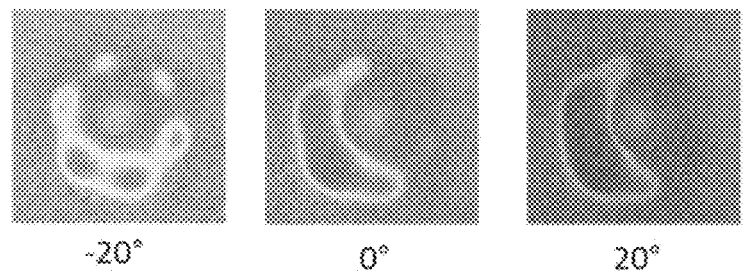
FIG. 8C shows pictures of an OEL obtained by using the apparatus illustrated in FIG. 8A-B, as viewed under different viewing angles.

FIG. 8A-C illustrate an example of a magnetic assembly (800) suitable for producing optical effect layers (OELs) comprising non-spherical magnetic or magnetizable pigment particles on a substrate (820) according to the present invention.

The magnetic assembly (800) comprises a first magnetic-field generating device (830) comprising three or more, in particular six, first dipole magnets ($831_{a1}, \ldots, 831_{a6}$) embedded in a square-shaped supporting matrix (833) and a second magnetic-field generating device (840) comprising a second dipole magnet (841), wherein the second magnetic-field generating device (840) is disposed above the first magnetic-field generating device (830). The magnetic assembly (800) further comprises a square-shaped pole piece (860) and a fourth magnetic-field generating device (870) comprising a disc-shaped fourth dipole magnet (871), wherein the first magnetic-field generating device (830) is disposed above the square-shaped pole piece (860) and the square-shaped pole piece (860) is disposed above the fourth magnetic-field generating device (870).

As shown in FIG. 8B, the six first dipole magnets ($831_{a1}, \ldots, 831_{a6}$) are arranged in such a way that each of their centers ($C_{831\text{-}a1}, \ldots, C_{831\text{-}a6}$) is disposed on a loop (832), in particular a ring, in the plane (P) being substantially parallel to the substrate (820). The projection of the center of the second dipole magnet (841) on the plane (P) is located at the projection point ($C_{741}$) and is symmetrically disposed within the ring (832), i.e. the projection point ($C_{41}$) also corresponds to the center of the ring (832). The six first dipole magnets ($831_{a1}, \ldots, 831_{a6}$) are evenly distributed around the projection point ($C_{841}$) of the center of the second dipole magnet (841).

The six first dipole magnets ($831_{a1}, \ldots, 831_{a6}$) of the first magnetic-field generating device (830) have their magnetic axes substantially parallel to the plane (P), substantially parallel to the substrate (820) and substantially perpendicular to the magnetic axis of the second dipole magnet (841) of the second magnetic-field generating device (840).

The six angles $\alpha_{1\text{-}6}$ respectively formed by i) the vectors $\overrightarrow{C_{841}C_{831\text{-}ai}}$ ($\overrightarrow{C_{841}C_{831\text{-}a1}}, \ldots, \overrightarrow{C_{841}C_{831\text{-}a6}}$) (i.e. the vectors between the projection point ($C_{841}$) and the center ($C_{831\text{-}a1}, \ldots, C_{831\text{-}a6}$) of each respective dipole magnet of the first magnetic-field generating device (830)) and ii) the vectors $\overrightarrow{h_{831\text{-}ai}}$ ($\overrightarrow{h_{831\text{-}a1}}, \ldots, \overrightarrow{h_{831\text{-}a8}}$), when measured in a counterclockwise direction, are equal to each other, said angles $\alpha_{1\text{-}6}$ being 225°.

The six angles β respectively formed by the vectors $\overrightarrow{C_{841}C_{831\text{-}a1}}$ (corresponding to the straight line from the projection point ($C_{841}$) to the center $C_{831\text{-}a1}$ of the cylindrical first dipole magnet ($831_{a1}$)) and $\overrightarrow{C_{841}C_{831\text{-}a2}}$; the vectors $\overrightarrow{C_{841}C_{831\text{-}a2}}$ and $\overrightarrow{C_{841}C_{831\text{-}a3}}$; the vectors $\overrightarrow{C_{841}C_{831\text{-}a3}}$ and $\overrightarrow{C_{841}C_{831\text{-}a4}}$; the vectors $\overrightarrow{C_{841}C_{831\text{-}a4}}$ and $\overrightarrow{C_{841}C_{831\text{-}a5}}$; the vectors $\overrightarrow{C_{841}C_{831\text{-}a5}}$ and $\overrightarrow{C_{841}C_{831\text{-}a6}}$, and the vectors $\overrightarrow{C_{841}C_{831\text{-}a6}}$ and $\overrightarrow{C_{841}C_{831\text{-}a1}}$ are equal to each other, in particular 60°.

The center of the first magnetic-field generating device (830), i.e. the center of the square-shaped supporting matrix (833), and the center of the second magnetic-field generating device (840), i.e. the center of the second dipole magnet (841), are substantially centered with respect to one another and are substantially centered with respect to the projection point ($C_{841}$) of the center of the cylindrical dipole magnet (841).

The distances Y between the projection point ($C_{841}$) of the center of the second dipole magnet (841) and the center ($C_{831\text{-}a1}, \ldots, C_{831\text{-}a6}$) of each of said six first dipole magnets ($831_{a1}, \ldots, 831_{a6}$) are equal to each other.

The second dipole magnet (841) has its magnetic axis substantially perpendicular to the plane (P) and substantially perpendicular to the substrate (820) with its North pole pointing towards (i.e. facing) the substrate (820). The second dipole magnet (841) is disposed in direct contact and above the supporting matrix (833).

The distance (d) from the uppermost surface of the first magnetic-field generating device (830), i.e. the uppermost surface of the six first dipole magnets ($831_{a1}, \ldots, 831_{a6}$), and the lowermost surface of the second magnetic-field generating device (840), i.e. the uppermost surface of the second dipole magnet (841), is equal to or smaller than the thickness (Z) of the second dipole magnet (841). In particular, the second distance (d) is preferably between about 0 mm and about 5 mm, more preferably between about 0 mm and about 1 mm and still more preferably about 0 mm.

The square-shaped pole piece (860) is disposed below the square-shaped supporting matrix (833) of the first magnetic-field generating device (830). The distance (f) from the lowermost surface of the first magnetic-field generating device (830), i.e. the lowermost surface of the square-shaped supporting matrix (833), and the uppermost surface of the square-shaped pole piece (860) is preferably between about 0 mm and about 1 mm, more preferably about 0 mm.

The disc-shaped fourth dipole magnet (871) of the fourth magnetic-field generating device (870) is disposed below the square-shaped pole piece (860). The disc-shaped fourth dipole magnet (871) has its magnetic axis substantially perpendicular to the plane (P), substantially perpendicular to the substrate (820) and substantially perpendicular to the magnetic axis of the six first dipole magnets ($831_{a1}, 831_{a6}$) of the first magnetic assembly (530) with its North pole pointing towards (i.e. facing) the substrate (820).

The distance (h) from the lowermost surface of the square-shaped pole piece (860) and the uppermost surface of the fourth magnetic-field generating device (870), i.e. the uppermost surface of the disc-shaped fourth dipole magnet (871), is preferably between about 0 mm and about 1 mm, more preferably about 0 mm.

The distance (e) from the uppermost surface of the second magnetic-field generating device (840) described herein, i.e. the uppermost surface of the second dipole magnet (841), and the lowermost surface of the substrate (820) facing said second magnetic-field generating device (840) is preferably between about 0 mm and about 10 mm, more preferably between about 0 mm and about 5 mm and still more preferably between about 0 mm and about 1 mm.

The resulting OEL produced with the magnetic assembly (800) illustrated in FIG. 8A-B is shown in FIG. 8C at different viewing angles by tilting the substrate (820) between −20° and +20°. The so-obtained OEL provides the optical impression of a ring surrounded by six loop-shaped bodies having their shape and their brightness varying upon tilting the optical effect layer (OEL).

Figure 9A:
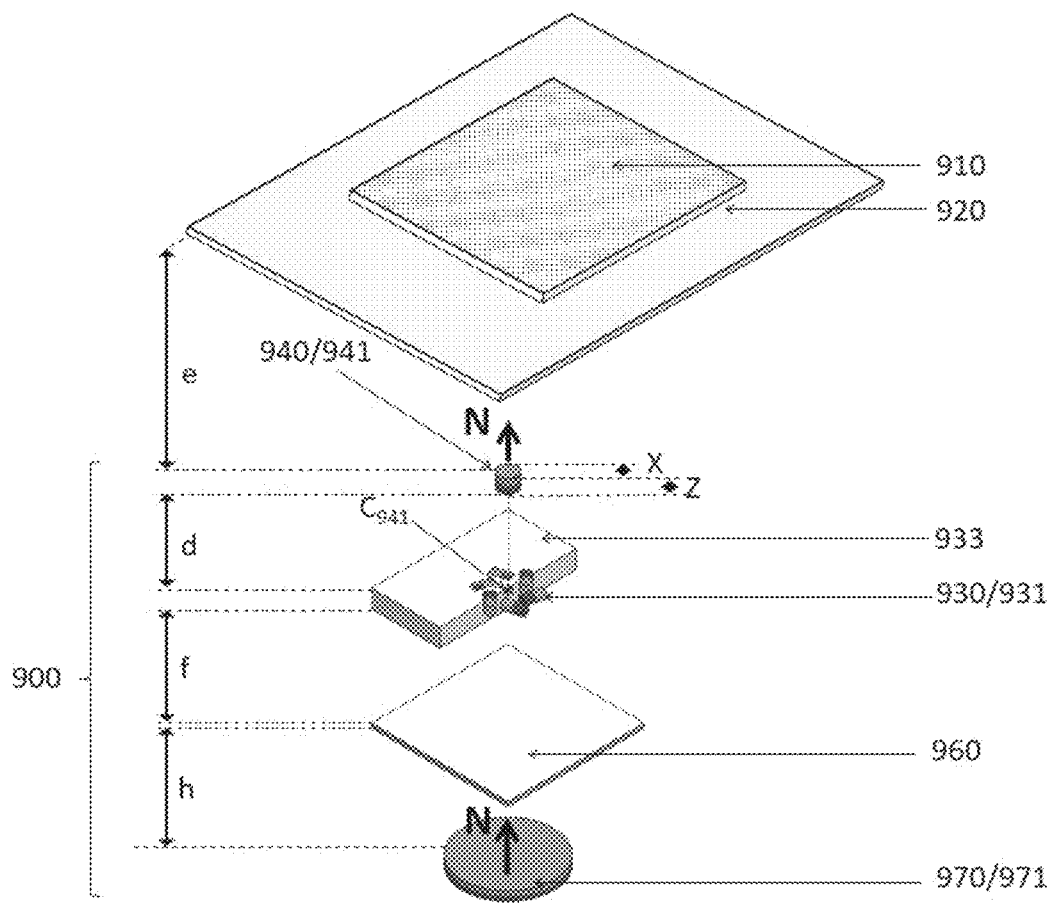
FIG. 9A schematically illustrates a magnetic assembly (900) for producing an optical effect layer (OEL) on a substrate (920). The magnetic assembly (900) comprises a first magnetic-field generating device (930) comprising six first dipole magnets ($931_{a1}, \ldots, 931_{a6}$) having their magnetic axes substantially parallel to the substrate (920) and being embedded in a supporting matrix (933); a second magnetic-field generating device (940) comprising a second dipole magnet (941) having its magnetic axis substantially perpendicular to the substrate (920) with its North pole pointing towards the substrate (920); a fourth magnetic-field generating device (970) comprising a fourth dipole magnet (971) having its magnetic axis substantially perpendicular to the substrate (920) with its North pole pointing towards the substrate (920); and a pole piece (960).
Figure 9B:
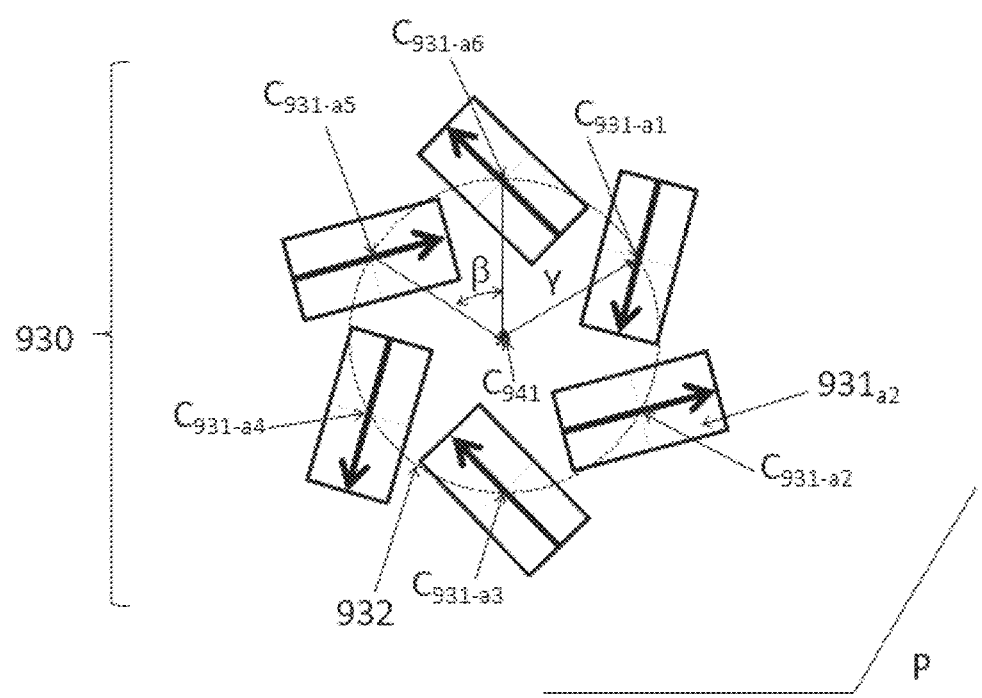
FIG. 9B schematically illustrates a top view of the first magnetic-field generating device (930) of the magnetic assembly (900) of FIG. 9A, wherein each of the six first dipole magnets ($931_{a1}, \ldots, 931_{a6}$) of the first magnetic-field generating device (930) has its center ($C_{931-a1}, \ldots C_{931-a6}$) disposed on a ring (932). Three $\alpha$ ($\alpha_1$, $\alpha_3$ and $\alpha_5$) are equal to each other, said angles $\alpha_{1/3/5}$ being 225° and three $\alpha$ ($\alpha_2$, $\alpha_4$ and $\alpha_6$) are equal to each other, said angles $\alpha_{2/4/6}$ being 45°.
Figure 9B:
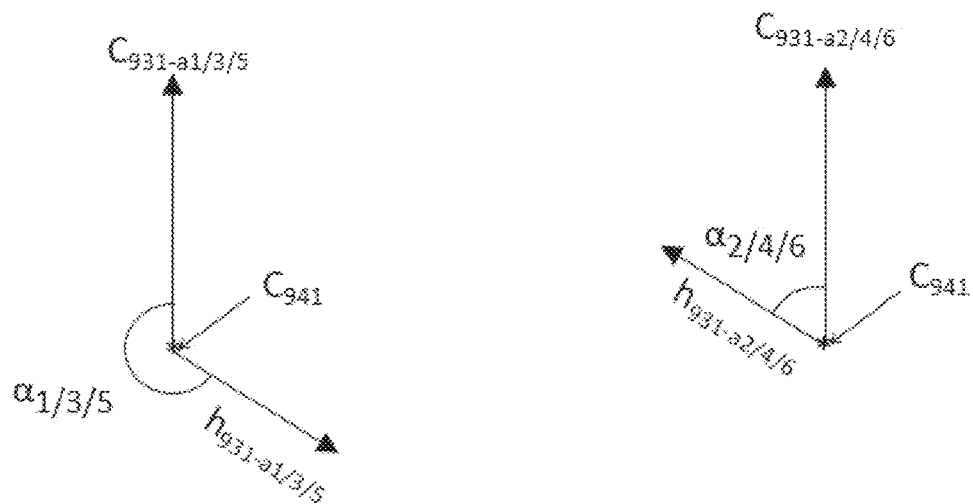
Figure 9C:
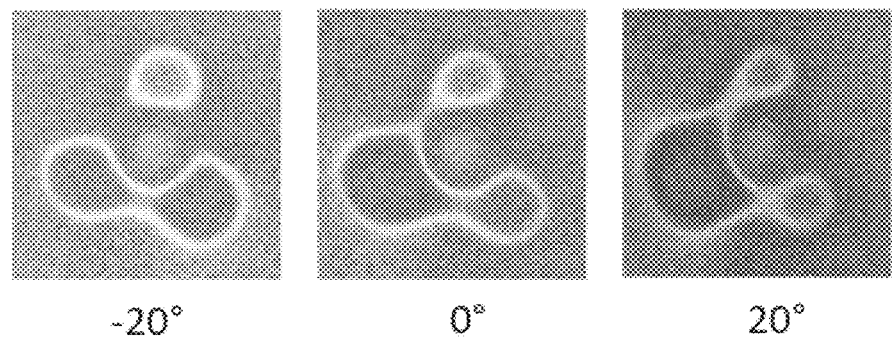
FIG. 9C shows pictures of an OEL obtained by using the apparatus illustrated in FIG. 9A-B, as viewed under different viewing angles.

FIG. 9A-C illustrate an example of a magnetic assembly (900) suitable for producing optical effect layers (OELs) comprising non-spherical magnetic or magnetizable pigment particles on a substrate (920) according to the present invention.

The magnetic assembly (900) comprises a first magnetic-field generating device (930) comprising three or more, in particular six, first dipole magnets ($931_{a1}, \ldots, 931_{a6}$) embedded in a square-shaped supporting matrix (933) and a second magnetic-field generating device (940) comprising a second dipole magnet (941), wherein the second magnetic-field generating device (940) is disposed above the first magnetic-field generating device (930). The magnetic assembly (900) further comprises a square-shaped pole piece (960) and a fourth magnetic-field generating device (970) comprising a disc-shaped fourth dipole magnet (971), wherein the first magnetic-field generating device (930) is disposed above the square-shaped pole piece (960) and the square-shaped pole piece (960) is disposed above the fourth magnetic-field generating device (970).

As shown in FIG. 9B, the six first dipole magnets ($931_{a1}, \ldots, 831_{a6}$) are arranged in such a way that each of their centers ($C_{931\text{-}a1}, \ldots, C_{931\text{-}a3}$) is disposed on a loop (932), in particular a ring, in the plane (P) being substantially parallel to the substrate (920). The projection of the center of the second dipole magnet (941) on the plane (P) is located at the projection point ($C_{941}$) and is symmetrically disposed within the ring (932), i.e. the projection point ($C_{941}$) also corresponds to the center of the ring (932). The six first dipole magnets ($931_{a1}, \ldots, 931_{a6}$) are evenly distributed around the projection point ($C_{941}$) of the center of the second dipole magnet (941).

The six first dipole magnets ($931_{a1}, \ldots, 931_{a6}$) of the first magnetic-field generating device (930) have their magnetic axes substantially parallel to the plane (P), substantially parallel to the substrate (920) and substantially perpendicular to the magnetic axis of the second dipole magnet (941) of the second magnetic-field generating device (940).

The three angles $\alpha_{1/3/5}$ respectively formed by i) the vectors $\overrightarrow{C_{941}C_{931\text{-}ai}}$ ($\overrightarrow{C_{941}C_{931\text{-}a1}}, \overrightarrow{C_{941}C_{931\text{-}a3}}, \overrightarrow{C_{741}C_{931\text{-}a5}}$) (i.e. the vectors between the projection point ($C_{941}$) and the center ($C_{931\text{-}a1}C_{931\text{-}a3}$ and $C_{931\text{-}a5}$) of each respective first dipole magnet of the first magnetic-field generating device (930)) and ii) the vectors $\overrightarrow{h_{931\text{-}ai}}$ ($\overrightarrow{h_{931\text{-}a1}}, \overrightarrow{h_{931\text{-}a3}}, \overrightarrow{h_{931\text{-}a5}}$), when measured in a counterclockwise direction, are equal to each other, in particular 225°. The three angles $\alpha_{2/4/6}$ respectively formed by i) the vectors ($\overrightarrow{C_{941}C_{931\text{-}a2}}, \overrightarrow{C_{941}C_{931\text{-}a4}}, \overrightarrow{C_{941}C_{931\text{-}a6}}$) (i.e. the vectors between the projection point ($C_{941}$) and the center ($C_{931\text{-}a2}, C_{931\text{-}a4}$ and $C_{931\text{-}a6}$) of each respective first dipole magnet of the first magnetic-field generating device (930)) and ii) the vectors ($\overrightarrow{h_{931\text{-}a2}}, \overrightarrow{h_{931\text{-}a4}}, \overrightarrow{h_{931\text{-}a6}}$); when measured in a counterclockwise direction, are equal to each other, in particular 45°.

The six angles β respectively formed by the vectors $\overrightarrow{C_{941}C_{931\text{-}a1}}$ (corresponding to the straight line from the projection point ($C_{941}$) to the center $C_{931\text{-}a1}$ of the cylindrical first dipole magnet ($931_{a1}$) and $\overrightarrow{C_{941}C_{931\text{-}a2}}$; the vectors $\overrightarrow{C_{941}C_{931\text{-}a2}}$ and $\overrightarrow{C_{941}C_{931\text{-}a3}}$; the vectors $\overrightarrow{C_{941}C_{931\text{-}a3}}$ and $\overrightarrow{C_{941}C_{931\text{-}a4}}$; the vectors $\overrightarrow{C_{941}C_{931\text{-}a4}}$ and $\overrightarrow{C_{941}C_{931\text{-}a5}}$; the vectors $\overrightarrow{C_{941}C_{931\text{-}a5}}$ and $\overrightarrow{C_{941}C_{931\text{-}a6}}$; and the vectors $\overrightarrow{C_{941}C_{931\text{-}a6}}$ and $\overrightarrow{C_{941}C_{931\text{-}a1}}$ are equal to each other, in particular 60°.

The center of the first magnetic-field generating device (930), i.e. the center of the square-shaped supporting matrix (933), and the center of the second magnetic-field generating device (940), i.e. the center of the second dipole magnet (941), are substantially centered with respect to one another and are substantially centered with respect to the projection point ($C_{941}$) of the center of the cylindrical dipole magnet (941).

The distances Y between the projection point ($C_{941}$) of the center of the second dipole magnet (941) and the center ($C_{931\text{-}a1}, \ldots, C_{931\text{-}a6}$) of each of said six first dipole magnets (931$_{a1}$, ..., 931$_{a6}$) are equal to each other.

The second dipole magnet (941) has its magnetic axis substantially perpendicular to the plane (P) and substantially perpendicular to the substrate (920) with its North pole pointing towards (i.e. facing) the substrate (920). The second dipole magnet (941) is disposed in direct contact and above the supporting matrix (933).

The distance (d) from the uppermost surface of the first magnetic-field generating device (930), i.e. the uppermost surface of the six first dipole magnets (931$_{a1}$, ..., 831$_{a6}$), and the lowermost surface of the second dipole magnet (941) is equal to or smaller than the thickness (Z) of the second dipole magnet (941). In particular, the second distance (d) is preferably between about 0 mm and about 5 mm, more preferably between about 0 mm and about 1 mm and still more preferably about 0 mm.

The square-shaped pole piece (960) is disposed below the square-shaped supporting matrix (933) of the first magnetic-field generating device (930). The distance (f) from the lowermost surface of the first magnetic-field generating device (930), i.e. lowermost surface of the square-shaped supporting matrix (933)), and the uppermost surface of the square-shaped pole piece (960) is preferably between about 0 mm and about 1 mm, more preferably about 0 mm.

The disc-shaped fourth dipole magnet (971) of the fourth magnetic-field generating device (970) is disposed below the square-shaped pole piece (960). The disc-shaped fourth dipole magnet (971) has its magnetic axis substantially perpendicular to the plane (P), substantially perpendicular to the substrate (920) and substantially perpendicular to the magnetic axis of the six first dipole magnets (931$_{a1}$, ..., 931$_{a6}$) of the first magnetic assembly (930) with its North pole pointing towards (i.e. facing) the substrate (920).

The distance (h) from the lowermost surface of the square-shaped pole piece (960) and the uppermost surface of the fourth magnetic-field generating device (970), i.e. the uppermost surface of the disc-shaped fourth dipole magnet (971), is preferably between about 0 mm and about 1 mm, more preferably about 0 mm.

The distance (e) from the uppermost surface of the second magnetic-field generating device (940) described herein, i.e. the uppermost surface of the second dipole magnet (941), and the lowermost surface of the substrate (920) facing said second magnetic-field generating device (940) is preferably between about 0 mm and about 10 mm, more preferably between about 0 mm and about 5 mm and still more preferably between about 0 mm and about 1 mm.

The resulting OEL produced with the magnetic assembly (900) illustrated in FIG. 9A-B is shown in FIG. 9C at different viewing angles by tilting the substrate (920) between −20° and +20°. The so-obtained OEL provides the optical impression of a ring surrounded by three loop-shaped bodies having their shape and their brightness varying upon tilting the optical effect layer (OEL).

The present invention further provides printing apparatuses comprising a rotating magnetic cylinder and the one or more magnetic assemblies (x00) described herein, wherein said one or more magnetic assemblies (x00) are mounted to circumferential or axial grooves of the rotating magnetic cylinder as well as printing assemblies comprising a flatbed printing unit and one or more of the magnetic assemblies described herein, wherein said one or more magnetic assemblies are mounted to recesses of the flatbed printing unit as well as printing apparatuses comprising a belt and the one or more magnetic assemblies (x00) described herein, wherein said one or more magnetic assemblies are mounted to said belt. The present further provides uses of said printing apparatuses for producing the optical effect layers (OELs) described herein on a substrate such as those described herein.

The rotating magnetic cylinder is meant to be used in, or in conjunction with, or being part of a printing or coating equipment, and bearing one or more magnetic assemblies described herein. In an embodiment, the rotating magnetic cylinder is part of a rotary, sheet-fed or web-fed industrial printing press that operates at high printing speed in a continuous way.

The flatbed printing unit is meant to be used in, or in conjunction with, or being part of a printing or coating equipment, and bearing one or more of the magnetic assemblies described herein. In an embodiment, the flatbed printing unit is part of a sheet-fed industrial printing press that operates in a discontinuous way.

The printing apparatuses comprising the rotating magnetic cylinder described herein or the flatbed printing unit described herein or the belt described herein may include a substrate feeder for feeding a substrate such as those described herein having thereon a layer of non-spherical magnetic or magnetizable pigment particles described herein, so that the magnetic assemblies generate a magnetic field that acts on the pigment particles to orient them to form the OEL described herein. In an embodiment of the printing apparatuses comprising a rotating magnetic cylinder described herein, the substrate is fed by the substrate feeder under the form of sheets or a web. In an embodiment of the printing apparatuses comprising a flatbed printing unit described herein, the substrate is fed under the form of sheets.

The printing apparatuses comprising the rotating magnetic cylinder described herein or the flatbed printing unit described herein r the belt described herein may include a coating or printing unit for applying the radiation curable coating composition comprising the non-spherical magnetic or magnetizable pigment particles described herein on the substrate described herein, the radiation curable coating composition comprising non-spherical magnetic or magnetizable pigment particles that are oriented by the magnetic-field generated by the magnetic assemblies described herein to form an optical effect layer (OEL). In an embodiment of the printing apparatuses comprising the rotating magnetic cylinder described herein or the belt described herein, the coating or printing unit works according to a rotary, continuous process. In an embodiment of the printing apparatuses comprising the flatbed printing unit described herein, the coating or printing unit works according to a linear, discontinuous process.

The printing apparatuses comprising the rotating magnetic cylinder described herein or the flatbed printing unit described herein or the belt described herein may include a curing unit for at least partially curing the radiation curable coating composition comprising non-spherical magnetic or magnetizable pigment particles that have been magnetically oriented by the magnetic assemblies described herein, thereby fixing the orientation and position of the non-spherical magnetic or magnetizable pigment particles to produce an optical effect layer (OEL).

The optical effect layers (OELs) described herein may have any shapes, wherein said shape may be continuous or discontinuous. According to one embodiment, the optical effect layers (OELs) described represent one or more indicia, dots and/or lines. The shape of the optical effect layers (OELs) described herein may consist of lines, dots and/or indicia being spaced apart from each other by a free area.

The optical effect layers (OELs) described herein may be provided directly on a substrate on which they shall remain permanently (such as for banknote applications). Alternatively, an OEL may also be provided on a temporary substrate for production purposes, from which the OEL is subsequently removed. This may for example facilitate the production of the OEL, particularly while the binder material is still in its fluid state. Thereafter, after at least partially curing the coating composition for the production of the OEL, the temporary substrate may be removed from the OEL.

Alternatively, an adhesive layer may be present on the OEL or may be present on the substrate comprising an OEL, said adhesive layer being on the side of the substrate opposite the side where the OEL is provided or on the same side as the OEL and above the OEL. Therefore an adhesive layer may be applied to the OEL or to the substrate. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OEL are produced as described herein. One or more adhesive layers may be applied over the so produced OEL.

Also described herein are substrates such as those described herein comprising more than one, i.e. two, three, four, etc. optical effect layers (OELs) obtained by the process described herein. Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned herein, the optical effect layer (OEL) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompasses by the present invention.

Further, all documents referred to throughout this specification are hereby incorporated by reference in their entirety as set forth in full herein.

EXAMPLES

Magnetic assemblies(x00) illustrated in FIG. 2A-B to FIG. 9A-B were used to orient non-spherical, in particular platelet shaped, colorshifting magnetic pigment particles in a coating layer (x10) of the UV-curable screen printing ink described in Table 1 so as to produce optical effect layers (OELs) shown in FIG. 2C-9C. The UV-curable screen printing ink was applied onto a black commercial paper (Gascogne Laminates M-cote 120) (x20), said application being carried out by hand screen printing using a T90 screen so as to form a coating layer (x10) having a thickness of about 20 μm and having a shape of a square with the following dimensions: 30 mm×30 mm. The substrate (x20) carrying the coating layer (x10) of the UV-curable screen printing ink was placed on the magnetic assembly (x00). The so-obtained magnetic orientation pattern of the platelet-shaped colorshifting magnetic pigment particles was then, partially simultaneously with the orientation step, (i.e. while the substrate (x20) carrying the coating layer (x10) of the UV-curable screen printing ink was still in the magnetic field of the magnetic assembly (x00)), fixed by exposing for about 0.5 second to UV-curing the layer comprising the pigment particles using a UV-LED-lamp from Phoseon (Type FireFlex 50×75 mm, 395 nm, 8 W/cm$^2$).

TABLE 1

| UV-curable screen printing ink (coating composition): | |
|---|---|
| Epoxyacrylate oligomer | 28% |
| Trimethylolpropane triacrylate monomer | 19.5% |
| Tripropyleneglycol diacrylate monomer | 20% |
| Genorad 16 (Rahn) | 1% |
| Aerosil 200 (Evonik) | 1% |
| Speedcure TPO-L (Lambson) | 2% |
| Irgacure ® 500 (BASF) | 6% |

TABLE 1-continued

UV-curable screen printing ink (coating composition):

| | |
|---|---|
| Genocure ® EPD (Rahn) | 2% |
| BYK ® 371 (BYK) | 2% |
| Tego Foamex N (Evonik) | 2% |
| 7-layer colorshifting magnetic pigment particles (*) | 16.5% |

(*) gold-to-green colorshifting magnetic pigment particles having a flake shape (platelet-shaped pigment particles) of diameter d50 about 9 μm and thickness about 1 μm, obtained from Viavi Solutions, Santa Rosa, CA.

Example 1 (FIG. 2A-C)

The magnetic assembly (200) used to prepare the optical effect layer (OEL) of Example 1 on the substrate (220) is illustrated in FIG. 2A-B. The magnetic assembly (200) was configured for receiving the substrate (220) in an orientation parallel to a first plane (P).

The magnetic assembly (200) comprised a first magnetic-field generating device (230) comprising three cubic first dipole magnets ($231_{a1}$, $231_{a2}$, $231_{a3}$) embedded in a square-shaped supporting matrix (233) and a second magnetic-field generating device (240) comprising a cylindrical second dipole magnet (241), wherein the second magnetic-field generating device (240) was disposed above the first magnetic-field generating device (230).

The three cubic first dipole magnets ($231_{a1}$, $231_{a2}$, $231_{a3}$) of the first magnetic-field generating device (230) had the following dimensions: 3 mm×3 mm×3 mm and were made of NdFeB N45. As shown in FIG. 2B, the three cubic first dipole magnets ($231_{a1}$, $231_{a2}$, $231_{a3}$) were arranged in such a way that each center ($C_{231-a1}$, $C_{231-a2}$ and $C_{231-a3}$) was disposed on a ring (232) in the plane (P) being substantially parallel to the substrate (220).

The cylindrical second dipole magnet (241) of the second magnetic-field generating device (240) had the following dimensions: 4 mm (X, diameter)×3 mm (Z, thickness) and was made of NdFeB N45. The projection of the center of the cylindrical second dipole magnet (241) on the plane (P) was located at the projection point ($C_{241}$) and was symmetrically disposed within the ring (232), i.e. the projection point ($C_{241}$) also corresponded to the center of the symmetric ring (232).

The three cubic first dipole magnets ($231_{a1}$, $231_{a2}$, $231_{a3}$) of the first magnetic-field generating device (230) had their magnetic axes substantially parallel to the plane (P), substantially parallel to the substrate (220) and substantially perpendicular to the magnetic axis of the cylindrical second dipole magnet (241) of the second magnetic-field generating device (240). As shown in FIG. 2B, the three cubic first dipole magnets ($231_{a1}$, $231_{a2}$, $231_{a3}$) had their North pole pointing all in the same circular direction (i.e. counterclockwise circular direction).

The three angles $\alpha_{1/2/3}$ respectively formed by i) the vectors ($\overrightarrow{C_{241}C_{231-a1}}$, $\overrightarrow{C_{41}C_{231-a2}}$, $\overrightarrow{C_{241}C_{231-a2}}$) (i.e. the vectors between the projection point ($C_{241}$) and the center ($C_{231-a1}$, $C_{231-a2}$ and $C_{231-a3}$) of each respective first dipole magnet of the first magnetic-field generating device (230)) and ii) the vectors ($\overrightarrow{h_{231-a1}}$, $\overrightarrow{h_{231-a2}}$, $\overrightarrow{h_{231-a3}}$), when measured in a counterclockwise direction, were equal to each other, in particular 90°, i.e. the three first dipole magnets ($231_{a1}$, $231_{a2}$, $231_{a3}$) had their magnetic axes substantially tangential to the ring (232) at the position of their respective center ($C_{231-a1}$, $C_{231-a2}$ and $C_{231-a3}$).

The three cubic first dipole magnets ($231_{a1}$, $231_{a2}$, $231_{a3}$) were evenly distributed around the projection point ($C_{241}$) of the center of the cylindrical second dipole magnet (241). The three angles β respectively formed by the vectors $\overrightarrow{C_{241}C_{231-a1}}$ (corresponding to the straight line from the projection point ($C_{241}$) to the center $C_{231-a1}$ of the cubic first dipole magnet ($231_{a1}$)) and $\overrightarrow{C_{241}C_{231-a2}}$; the vectors $\overrightarrow{C_{241}C_{231-a2}}$ and $\overrightarrow{C_{241}C_{23-a3}}$; and the vectors $\overrightarrow{C_{241}C_{23-a3}}$ and $\overrightarrow{C_{241}C_{231-a1}}$ were equal to each other, in particular 120°.

The distances Y between the projection point ($C_{241}$) of the center of the cylindrical second dipole magnet (241) and the center ($C_{231-a1}$, $C_{231-a2}$ and $C_{231-a3}$) of each of said three cubic first dipole magnets ($231_{a1}$, $231_{a2}$, $231_{a3}$) were equal to each other, said distances Y being 4.5 mm.

The square-shaped supporting matrix (233) had the following dimensions: 30 mm×30 mm×5.5 mm and was made of polyoxymethylene (POM). The square-shaped supporting matrix (233) comprised three indentations for holding the three cubic first dipole magnets ($231_{a1}$, $231_{a2}$, $231_{a3}$), said indentations having the same shape and dimensions as said three cubic first dipole magnets ($231_{a1}$, $231_{a2}$, $231_{a3}$) so that the uppermost surface of said three cubic first dipole magnets ($231_{a1}$, $231_{a2}$, $231_{a3}$) was flush with the uppermost surface of the square-shaped supporting matrix (233).

The cylindrical second dipole magnet (241) had its magnetic axis substantially perpendicular to the Lto plane (P) and substantially perpendicular to the substrate (220) with its North pole pointing towards (i.e. facing) the substrate (220). The cylindrical second dipole magnet (241) was disposed in direct contact and above the square-shaped supporting matrix (233).

The center of the first magnetic-field generating device (230) and the center of the second magnetic-field generating device (240) were substantially centered with respect to one another and were substantially centered with respect to the projection point ($C_{241}$) of the center of the cylindrical dipole magnet (241).

The distance (e) from the uppermost surface of the second magnetic-field generating (240) and the lowermost surface of the substrate (220) facing the device (200) was 0.5 mm, i.e. the distance between the uppermost surface of the cylindrical second dipole magnet (241) of the second magnetic-field generating device (240) and the lowermost surface of the substrate (220) was 0.5 mm.

The distance (d) (not shown in FIG. 2A for clarity purpose) from the uppermost surface of the first magnetic-field generating device (230), i.e. the uppermost surface of the three cubic first dipole magnets ($231_{a1}$, $231_{a2}$, $231_{a3}$) (also corresponding to the uppermost surface of the square-shaped supporting matrix (233)) and the lowermost surface of the second magnetic-field generating device (240), i.e. the cylindrical second dipole magnet (241), was 0 mm.

The resulting OEL produced with the magnetic assembly (200) illustrated in FIG. 2A-B is shown in FIG. 2C at different viewing angles by tilting the substrate (220) between −20° and +20°. The so-obtained OEL provides the optical impression of a ring surrounded by three loop-shaped bodies having their shape and their brightness varying upon tilting the optical effect layer (OEL).

Example 2 (FIG. 3A-C)

The magnetic assembly (300) used to prepare the optical effect layer (OEL) of Example 2 on the substrate (320) is illustrated in FIG. 3A-B. The magnetic assembly (300) was configured for receiving the substrate (320) in an orientation substantially parallel to a first plane (P).

The magnetic assembly (300) comprised a first magnetic-field generating device (330) comprising six cylindrical first dipole magnets ($331_{a1}, \ldots, 331_{a6}$) embedded in a square-shaped supporting matrix (333), a second magnetic-field generating device (340) comprising a cylindrical second dipole magnet (341) and a third magnetic-field generating device (350) comprising six cylindrical third dipole magnets (351) embedded in the square-shaped supporting matrix (333), wherein the second magnetic-field generating device (340) was disposed above the first magnetic-field generating device (330).

The six cylindrical first dipole magnets ($331_{a1}, \ldots, 331_{a6}$) of the first magnetic-field generating device (330) and the six cylindrical third dipole magnets (351) of the third magnetic-field generating device (350) had the following dimensions: 2 mm (diameter)×2 mm (thickness) and were made of NdFeB N45. As shown in FIG. 3B, the six cylindrical first dipole magnets ($331_{a1}, \ldots, 331_{a6}$) were arranged in such a way that each center ($C_{331-a1}, \ldots, C_{331-a6}$) was disposed on a ring (332) in the plane (P) being substantially parallel to the substrate (320).

The cylindrical second dipole magnet (341) of the second magnetic-field generating device (340) had the following dimensions: 4 mm (X, diameter)×3 mm (Z, thickness) and was made of NdFeB N45. The projection of the center of the cylindrical second dipole magnet (341) on the plane (P) was located at the projection point ($C_{341}$) and was symmetrically disposed within the ring (332), i.e. the projection point ($C_{341}$) also corresponded to the center of the symmetric ring (332).

The six cylindrical first dipole magnets ($331_{a1}, \ldots, 331_{a6}$) of the first magnetic-field generating device (330) had their magnetic axes substantially parallel to the plane (P), substantially parallel to the substrate (320), substantially perpendicular to the magnetic axis of the cylindrical second dipole magnet (341) of the second magnetic-field generating device (340) and substantially perpendicular to the magnetic axis of the six cylindrical third dipole magnets (351) of the third magnetic-field generating device (350). As shown in FIG. 3B, the six cylindrical first dipole magnets ($331_{a1}, \ldots, 331_{a6}$) had their North pole pointing all in the same circular direction (i.e. counterclockwise circular direction).

The six angles $\alpha_{1-6}$ respectively formed by i) the vectors ($\overrightarrow{C_{341}C_{331-a1}}, \ldots, \overrightarrow{C_{341}C_{331-a6}}$) (i.e. the vectors between the projection point ($C_{341}$) and the center ($C_{331-a1}, \ldots, C_{331-a6}$) of each respective dipole magnet of the first magnetic-field generating device (330)) and ii) the vectors ($\overrightarrow{h_{331-a1}}, \ldots, \overrightarrow{h_{331-a6}}$); when measured in a counterclockwise direction, were equal to each other, in particular 90°, i.e. the six first dipole magnets ($331_{a1}, \ldots, 331_{a6}$) had their magnetic axes substantially tangential to the ring (332) at the position of their respective center ($C_{331-a1}, \ldots, C_{331-a6}$).

The six cylindrical first dipole magnets ($331_{a1}, \ldots, 331_{a6}$) were evenly distributed around the projection point ($C_{341}$) of the center of the cylindrical second dipole magnet (341). The six angles $\beta$ respectively formed by the vectors $\overrightarrow{C_{341}C_{331-a1}}$ (corresponding to the straight line from the projection point ($C_{341}$) to the center $C_{331-a1}$ of the cylindrical first dipole magnet ($331_{a1}$)) and $\overrightarrow{C_{341}C_{231-a2}}$; the vectors $\overrightarrow{C_{341}C_{331-a2}}$ and $\overrightarrow{C_{341}C_{331-a3}}$; the vectors $\overrightarrow{C_{341}C_{331-a3}}$ and $\overrightarrow{C_{341}C_{331-a4}}$; the vectors $\overrightarrow{C_{341}C_{331-a4}}$ and $\overrightarrow{C_{341}C_{331-a5}}$; the vectors $\overrightarrow{C_{341}C_{331-a5}}$ and $\overrightarrow{C_{341}C_{331-a6}}$; and the vectors $\overrightarrow{C_{341}C_{331-a6}}$ and $\overrightarrow{C_{341}C_{331-a1}}$ were equal to each other, in particular 60°.

The distances Y between the projection point ($C_{341}$) of the center of the cylindrical second dipole magnet (341) and the center ($C_{331-a1}, \ldots, C_{331-a6}$) of each of said six cylindrical first dipole magnets ($331_{a1}, \ldots, 331_{a6}$) were equal to each other, said distances Y being 5 mm.

The six cylindrical third dipole magnets (351) of the third magnetic-field generating device (350) were arranged in such a way that each center ($C_{351}$) of said magnets was disposed on the ring (332). The six cylindrical third dipole magnets (351) of the third magnetic-field generating device (350) had their magnetic axes substantially perpendicular to the plane (P), substantially perpendicular to the substrate (320), substantially perpendicular to the magnetic axis of the six cylindrical first dipole magnets ($331_{a1}, 331_{a6}$) of the first magnetic-field generating device (330) and substantially parallel with the magnetic axis of the cylindrical second dipole magnet (341) of the second magnetic-field generating device (340) with the North pole pointing towards (i.e. facing) the substrate (320).

The six cylindrical third dipole magnets (351) of the third magnetic-field generating device (350) were evenly distributed of the ring (332) and around the projection point ($C_{341}$) of the center of the cylindrical second dipole magnet (341).

The angles $\gamma$ respectively formed by the vectors $\overrightarrow{C_{341}C_{331-ax}}$ (x=1-6) (corresponding to the straight line from the projection point ($C_{341}$) to the center $C_{331-ax}$ of a first dipole magnet ($331_{ax}$)) and $\overrightarrow{C_{341}C_{351}}$ (corresponding to the straight line from the projection point ($C_{341}$) to the center of an adjacent cylindrical third dipole magnet (351)) were equal to each other, said value being 30°.

The distances between the projection point ($C_{341}$) of the center of the cylindrical second dipole magnet (341) and the center of each of the six cylindrical third dipole magnets (351) equal to each other, said distances being 5 mm.

The square-shaped supporting matrix (333) had the following dimensions: 30 mm×30 mm×6 mm and was made of polyoxymethylene (POM). The square-shaped supporting matrix (333) comprised twelve cubic indentations for holding the six cylindrical first dipole magnets ($331_{a1}, \ldots, 331_{a6}$) and the six cylindrical third dipole magnets (351), said indentations having the following dimensions: 2 mm×2 mm×2 mm so that the uppermost surface of said twelve cylindrical dipole magnets ($331_{a1}, \ldots, 331_{a6}$ and 351) was flush with the uppermost surface of the square-shaped supporting matrix (333).

The cylindrical second dipole magnet (341) had its magnetic axis substantially perpendicular to the plane (P), perpendicular to the substrate (320), substantially perpendicular to the magnetic axis of the six cylindrical first dipole magnets ($331_{a1}, \ldots, 331_{a6}$) of the first magnetic assembly (330), substantially parallel to the magnetic axis of the six cylindrical third dipole magnets (351) of the third magnetic assembly (350) with its North pole pointing towards (i.e. facing) the substrate (320). The cylindrical second dipole magnet (341) was disposed in direct contact and above the square-shaped supporting matrix (333).

The center of the first magnetic-field generating device (330) and the center of the second magnetic-field generating device (340) were substantially centered with respect to one another and were substantially centered with respect to the projection point ($C_{341}$) of the center of the cylindrical dipole magnet (341).

The distance (e) from the uppermost surface of the second magnetic-field generating device (340) and the lowermost surface of the substrate (320) facing the device (300) was 0.6 mm, i.e. the distance from the uppermost surface of the cylindrical second dipole magnet (341) of the second magnetic-field generating device (340) and the lowermost surface of the substrate (320) was 0.6 mm.

The distance (d) (not shown in FIG. 3A for clarity purpose) from the uppermost surface of the first magnetic-field generating device (330), i.e. the uppermost surface of the twelve cylindrical dipole magnets (331 and 351) of the first and third magnetic-field generating devices (330 and 350) (also corresponding to the uppermost surface of the square-shaped supporting matrix (333)) and the lowermost surface of the second magnetic-field generating device (340), i.e. the lowermost surface of the cylindrical second dipole magnet (341), was 0 mm.

The resulting OEL produced with the magnetic assembly (300) illustrated in FIG. 3A-B is shown in FIG. 3C at different viewing angles by tilting the substrate (320) between −20° and +20°. The so-obtained OEL provides the optical impression of a ring surrounded by six loop-shaped bodies having their shape and their brightness varying upon tilting the optical effect layer (OEL).

Example 3 (FIG. 4A-C)

The magnetic assembly (400) used to prepare the optical effect layer (OEL) of Example 3 on the substrate (420) is illustrated in FIG. 4A-B. The magnetic assembly (400) was configured for receiving the substrate (420) in an orientation parallel to a first plane (P).

The magnetic assembly (400) comprised a first magnetic-field generating device (430) comprising eight cylindrical first dipole magnets ($431_{a1}, \ldots, 431_{a8}$) embedded in a square-shaped supporting matrix (433), a second magnetic-field generating device (440) comprising a cylindrical second dipole magnet (441) and a third magnetic-field generating device (450) comprising four cylindrical third dipole magnets (451) embedded in the square-shaped supporting matrix (433), wherein the second magnetic-field generating device (440) was disposed above the first magnetic-field generating device (430).

The eight cylindrical first dipole magnets ($431_{a1}, \ldots, 431_{a8}$) of the first magnetic-field generating device (430) and the four cylindrical third dipole magnets (451) of the third magnetic-field generating device (450) had the following dimensions: 2 mm (diameter)×2 mm (thickness) and were made of NdFeB N45. As shown in FIG. 4B, the eight cylindrical first dipole magnets ($431_{a1}, \ldots, 431_{a8}$) were arranged in such a way that each center ($C_{431-a1}, \ldots, C_{431-a8}$) was disposed on a ring (432) in the plane (P) being substantially parallel to the substrate (420).

The cylindrical second dipole magnet (441) of the second magnetic-field generating device (440) had the following dimensions: 4 mm (X, diameter)×3 mm (Z, thickness) and was made of NdFeB N45. The projection of the center of the cylindrical second dipole magnet (441) of the second magnetic-field generating device (440) on the plane (P) was located at the projection point ($C_{441}$) and was symmetrically disposed within the ring (432), i.e. the projection point ($C_{441}$) also corresponded to the center of the symmetric the ring (432).

The eight cylindrical first dipole magnets ($431_{a1}, \ldots, 431_{a8}$) of the first magnetic-field generating device (430) had their magnetic axes substantially parallel to the plane (P), substantially perpendicular to the magnetic axis of the cylindrical second dipole magnet (441) of the second magnetic-field generating device (440) and substantially perpendicular to the magnetic axis of the four cylindrical third dipole magnets (451) of the third magnetic-field generating device (450). As shown in FIG. 4B, the eight cylindrical first dipole magnets ($431_{a1}, \ldots, 431_{a8}$) had their North pole pointing all in the same circular direction (i.e. counterclockwise circular direction).

The eight angles $\alpha_{1-8}$ respectively formed by i) the vectors ($\overrightarrow{C_{441}C_{431-a1}}, \ldots, \overrightarrow{C_{441}C_{431-a8}}$) (i.e. the vectors between the projection point ($C_{441}$) to the center ($C_{431-a1}, \ldots, C_{431-a8}$) of each respective dipole magnet of the first magnetic-field generating device (430)) and ii) the vectors ($\overrightarrow{h_{431-a1}}, \ldots, \overrightarrow{h_{431-a8}}$) when measured in a counterclockwise direction, were equal to each other, in particular 90°, i.e. the eight first dipole magnets ($431_{a1}, \ldots, 431_{a8}$) had their magnetic axes substantially tangential to the ring (432) at the position of their respective center ($C_{431-a1}, \ldots, C_{431-a8}$).

The eight cylindrical first dipole magnets ($431_{a1}, \ldots, 431_{a8}$) of the first magnetic-field generating device (430) and the four cylindrical third dipole magnets (451) of the third magnetic-field generating device (450) were regularly disposed on the ring (432). Four sets of two cylindrical first dipole magnets ($431_{a1/a2}; 431_{a3/a4}; 431_{a5/a6}; 431_{a7/a8}$) of the first magnetic-field generating device (430) and one cylindrical third dipole magnet (451) of the third magnetic-field generating device (450) were disposed in an alternating manner on the ring-shaped body (432).

The eight cylindrical first dipole magnets ($431_{a1}, 431_{a8}$) were distributed around the projection point ($C_{441}$) of the center of the cylindrical second dipole magnet (441). The four angles $\beta$ respectively formed by the vectors $\overrightarrow{C_{441}C_{331-a1}}$ (corresponding to the straight line from the projection point ($C_{441}$) to the center $C_{431-a1}$ of the cylindrical first dipole magnet ($431_{a1}$) and $\overrightarrow{C_{441}C_{431-a2}}$; the vectors $\overrightarrow{C_{441}C_{431-a3}}$ and $\overrightarrow{C_{441}C_{431-a4}}$; the vectors $\overrightarrow{C_{441}C_{431-a5}}$ and $\overrightarrow{C_{441}C_{431-a6}}$; and the vectors $\overrightarrow{C_{441}C_{431-a7}}$ and $\overrightarrow{C_{441}C_{431-a8}}$ were equal to each other, in particular 30°. The four angles $\beta_2$ respectively formed by the vectors $\overrightarrow{C_{441}C_{431-a2}}$ (corresponding to the straight line from the projection point ($C_{441}$) to the center $C_{431-a2}$ of cylindrical first dipole magnet ($431_{a2}$)) and $\overrightarrow{C_{441}C_{431-a3}}$; the vectors $\overrightarrow{C_{441}C_{431-a4}}$ and $\overrightarrow{C_{441}C_{431-a5}}$; the vectors $\overrightarrow{C_{441}C_{431-a6}}$ and $\overrightarrow{C_{441}C_{431-a7}}$; and the vectors $\overrightarrow{C_{441}C_{431-a8}}$ and $\overrightarrow{C_{441}C_{431-a1}}$ were equal to each other, in particular 60°.

The distances Y between the projection point ($C_{441}$) of the center of the cylindrical second dipole magnet (441) and the center ($C_{431-a1}, \ldots, C_{431-a8}$) of each of said eight cylindrical first dipole magnets ($431_{a1}, \ldots, 431_{a8}$) were equal to each other, said distances Y being 5 mm.

The four cylindrical third dipole magnets (451) of the third magnetic-field generating device (450) were arranged in such a way that each center ($C_{451}$) of said magnets was disposed on the ring (432). The four cylindrical third dipole magnets (451) of the third magnetic-field generating device (450) had their magnetic axes substantially perpendicular to the plane (P), substantially perpendicular to the substrate (420), substantially perpendicular to the magnetic axis of the eight cylindrical first dipole magnets ($431_{a1}, \ldots, 431_{a8}$) of the first magnetic-field generating device (430) and substantially parallel with the magnetic axis of the cylindrical second dipole magnet (441) of the second magnetic-field generating device (440) with the North pole pointing towards (i.e. facing) the substrate (420).

The four cylindrical third dipole magnets (451) of the third magnetic-field generating device (450) were evenly distributed on the ring (432) and around the projection point ($C_{441}$) of the center of the cylindrical second dipole magnet (441). The angles γ respectively formed by the vectors $\overrightarrow{C_{441}C_{431-ax}}$ (corresponding to the straight lines from the projection point ($C_{441}$) to the center $C_{431-ax}$ of a first dipole magnet ($431_{ax}$)) and $\overrightarrow{C_{441}C_{451}}$ (corresponding to the straight line from the projection point ($C_{441}$) to the center of an adjacent cylindrical third dipole magnet (451)) were equal to each other, said value being 30°.

The distances between the projection point ($C_{441}$) of the center of the cylindrical second dipole magnet (441) and the center of each of the four cylindrical third dipole magnets (451) were equal to each other, said distances being 5 mm.

The square-shaped supporting matrix (433) had the following dimensions: 30 mm×30 mm×6 mm and was made of polyoxymethylene (POM). The square-shaped supporting matrix (433) comprised twelve cubic indentations for holding the eight cylindrical first dipole magnets ($431_{a1}$, ..., $431_{a8}$) and the four cylindrical third dipole magnets (451), said indentations having the following dimensions: 2 mm×2 mm×2 mm so that the uppermost surface of said twelve cylindrical dipole magnets ($431_{a1}$, ..., $431_{a8}$ and 451) was flush with the uppermost surface of the square-shaped supporting matrix (433).

The cylindrical second dipole magnet (441) had its magnetic axis substantially perpendicular to the plane (P), perpendicular to the substrate (420), substantially perpendicular to the magnetic axis of the eight cylindrical first dipole magnets ($431_{a1}$, ..., $431_{a8}$) of the first magnetic assembly (430), substantially parallel to the magnetic axis of the four cylindrical third dipole magnet (451) of the third magnetic assembly (450) with its North pole pointing towards (i.e. facing) the substrate (420). The cylindrical second dipole magnet (441) was disposed in direct contact and above the square-shaped supporting matrix (433).

The center of the first magnetic-field generating device (430) and the center of the second magnetic-field generating device (440) were substantially centered with respect to one another and were substantially centered with respect to the projection point ($C_{441}$) of the center of the cylindrical dipole magnet (441).

The distance (e) from the uppermost surface of the second magnetic-field generating device (440) and the lowermost surface of the substrate (420) facing the device (400) was 0.6 mm, i.e. the distance from the uppermost surface of the cylindrical second dipole magnet (441) of the second magnetic-field generating device (340) and the lowermost surface of the substrate (420), was 0.6 mm.

The distance (d) (not shown in FIG. 4A for clarity purpose) from the uppermost surface of the first magnetic-field generating device (430), i.e. the uppermost surface of the twelve cylindrical dipole magnets (431 and 451) of the first and third magnetic-field generating devices (430 and 450) (also corresponding to the uppermost surface of the square-shaped supporting matrix (433)), and the lowermost surface of the second magnetic-field generating device (440), i.e. the lowermost surface of the cylindrical dipole magnet (441), was 0 mm.

The resulting OEL produced with the magnetic assembly (400) illustrated in FIG. 4A-B is shown in FIG. 4C at different viewing angles by tilting the substrate (420) between −20° and +20°. The so-obtained OEL provides the optical impression of a ring surrounded by four loop-shaped bodies having their shape and their brightness varying upon tilting the optical effect layer (OEL).

Example 4 (FIG. 5A-C)

The magnetic assembly (500) used to prepare the optical effect layer (OEL) of Example 4 on the substrate (520) is illustrated in FIG. 5A-B. The magnetic assembly (500) was configured for receiving the substrate (520) in an orientation parallel to a first plane (P).

The magnetic assembly (500) comprised a first magnetic-field generating device (530) comprising nine cylindrical first dipole magnets ($531_{a1}$, ..., $531_{a9}$) embedded in a square-shaped supporting matrix (533), a second magnetic-field generating device (540) comprising a cylindrical dipole magnet (541), a third magnetic-field generating device (550) comprising three cylindrical third dipole magnets (551) embedded in the square-shaped supporting matrix (533), a square-shaped pole piece (560) and a fourth magnetic-field generating device (570) comprising a disc-shaped fourth dipole magnet (571). The second magnetic-field generating device (540) was disposed above the first magnetic-field generating device (530), the first magnetic-field generating device (530) was disposed above the square-shaped pole piece (560) and the square-shaped pole piece (560) was disposed above the fourth magnetic-field generating device (570). The nine cylindrical first dipole magnets ($531_{a1}$, ..., $531_{a9}$) of the first magnetic-field generating device (530) and the three cylindrical third dipole magnets (551) of the third magnetic-field generating device (550) had the following dimensions: 2 mm (diameter)×2 mm (thickness) and were made of NdFeB N45. As shown in FIG. 5B, the nine cylindrical first dipole magnets ($531_{a1}$, ..., $531_{a9}$) were arranged in such a way that each center ($C_{531-a1}$, ..., $C_{531-a9}$) was disposed on a ring (532) in the plane (P) being substantially parallel to the substrate (520).

The cylindrical second dipole magnet (541) of the second magnetic-field generating device (540) had the following dimensions: 4 mm (X, diameter)×3 mm (Z, thickness) and was made of NdFeB N45. The projection of the center of the cylindrical second dipole magnet (541) on the plane (P) was located at the projection point ($C_{541}$) and was symmetrically disposed within the ring (532), i.e. the projection point ($C_{541}$) also corresponded to the center of the symmetric the ring (532).

The nine cylindrical first dipole magnets ($531_{a1}$, ..., $531_{a8}$) of the first magnetic-field generating device (530) had their magnetic axes substantially parallel to the plane (P), substantially parallel to the substrate (520), substantially perpendicular to the magnetic axis of the cylindrical second dipole magnet (541) of the second magnetic-field generating device (540) and substantially perpendicular to the magnetic axis of the three cylindrical third dipole magnets (551) of the third magnetic-field generating device (550). As shown in FIG. 5B, the nine cylindrical first dipole magnets ($531_{a1}$, ..., $531_{a9}$) their North pole pointing all in the same circular direction (i.e. counterclockwise circular direction).

The nine first dipole magnets ($531_{a1}$, ..., $531_{a9}$) are distributed around the projection point ($C_{541}$) of the center of the second dipole magnet (541). The nine angles $α_{1-9}$ respectively formed by i) the vectors ($\overrightarrow{C_{541}C_{531-a1}}$, ..., $\overrightarrow{C_{541}C_{531-a9}}$) (i.e. the vectors between the projection point ($C_{541}$) and the center ($C_{531-a1}$, ..., $C_{531-a9}$) of each respective dipole magnet of the first magnetic-field generating device (530)) and ii) the vectors ($\overrightarrow{h_{531\text{-}a1}}, \ldots, \overrightarrow{h_{531\text{-}a8}}$) when measured in a counterclockwise direction, were equal to each other, in particular 90°, i.e. the nine first dipole magnets ($531_{a1}, \ldots, 531_{a9}$) had their magnetic axes substantially tangential to the ring (532) at the position of their respective center ($C_{631\text{-}a1}, \ldots, C_{531\text{-}a9}$).

The nine cylindrical first dipole magnets ($531_{a1}, \ldots, 531_{a9}$) of the first magnetic-field generating device (530) and the three cylindrical third dipole magnets (551) of the third magnetic-field generating device (550) were regularly disposed on the ring (532). Three sets of three cylindrical first dipole magnets ($531_{a1/a2/a3}$; $531_{a4/a5/a6}$; $531_{a7/a8/a9}$) of the first magnetic-field generating device (530) and one cylindrical third dipole magnet (551) of the third magnetic-field generating device (550) were disposed in an alternating manner on the ring (532).

The nine cylindrical first dipole magnets ($531_{a1}, \ldots, 531_{a9}$) were distributed around the projection point ($C_{541}$) of the center of the cylindrical dipole magnet (541). The six angles $\beta_1$ respectively formed by the vectors $\overrightarrow{C_{541}C_{531\text{-}a1}}$ (corresponding to the straight line from the projection point ($C_{541}$) to the center $C_{531\text{-}a1}$ of the cylindrical first dipole magnet ($531_{a1}$)) and $\overrightarrow{C_{541}C_{531\text{-}a2}}$; the vectors $\overrightarrow{C_{541}C_{531\text{-}a2}}$ and $\overrightarrow{C_{541}C_{531\text{-}a3}}$; the vectors $\overrightarrow{C_{541}C_{531\text{-}a4}}$ and $\overrightarrow{C_{541}C_{531\text{-}a5}}$; the vectors $\overrightarrow{C_{541}C_{531\text{-}a5}}$ and $\overrightarrow{C_{541}C_{551\text{-}a6}}$; the vectors $\overrightarrow{C_{541}C_{531\text{-}a7}}$ and $\overrightarrow{C_{541}C_{551\text{-}a8}}$; and the vectors $\overrightarrow{C_{541}C_{531\text{-}a8}}$ and $\overrightarrow{C_{541}C_{551\text{-}a9}}$ were equal to each other, in particular 30°. The three angles $\beta_2$ respectively formed by the vectors $\overrightarrow{C_{541}C_{531\text{-}a3}}$ (corresponding to the straight line from the projection point ($C_{441}$) to the center $C_{431\text{-}a3}$ of the cylindrical first dipole magnet ($531_{a1}$)) and $\overrightarrow{C_{541}C_{531\text{-}a4}}$; the vectors $\overrightarrow{C_{541}C_{531\text{-}a6}}$ and $\overrightarrow{C_{541}C_{531\text{-}a7}}$; and the vectors $\overrightarrow{C_{541}C_{531\text{-}a9}}$ and $\overrightarrow{C_{541}C_{531\text{-}a1}}$ were equal to each other, in particular 60°.

The distances Y between the projection point ($C_{541}$) of the center of the cylindrical second dipole magnet (541) and the center ($C_{531\text{-}a1}, \ldots, C_{531\text{-}a9}$) of each of said nine cylindrical dipole magnets ($531_{a1}, \ldots, 531_{a9}$) were equal to each other, said distances being 5 mm.

The three cylindrical third dipole magnets (551) of the third magnetic-field generating device (550) were arranged in such a way that each center ($C_{551}$) of said magnets was disposed on the ring (532). The three cylindrical third dipole magnets (551) of the third magnetic-field generating device (550) had their magnetic axes substantially perpendicular to the plane (P), substantially perpendicular to the substrate (520), substantially perpendicular to the magnetic axis of the nine cylindrical first dipole magnets ($531_{a1}, \ldots, 531_{a9}$) of the first magnetic-field generating device (530) and substantially parallel with the magnetic axis of the cylindrical second dipole magnet (541) of the second magnetic-field generating device (540) with the North pole pointing towards (i.e. facing) the substrate (520).

The three cylindrical third dipole magnets (551) of the third magnetic-field generating device (550) were evenly distributed on the ring (532) and around the projection point ($C_{541}$) of the center of the cylindrical dipole magnet (541).

The angles γ respectively formed by the vectors $\overrightarrow{C_{541}C_{531\text{-}ax}}$ (corresponding to the straight line from the projection point ($C_{541}$) to the center $C_{531\text{-}ax}$ of a first dipole magnet ($531_{ax}$)) and $\overrightarrow{C_{541}C_{551}}$ (corresponding to the straight line from the projection point ($C_{541}$) to the center of an adjacent cylindrical third dipole magnet (551)) were equal to each other, said value being 30°.

The distances between the projection point ($C_{541}$) of the center of the cylindrical second dipole magnet (541) and the center of each of the three cylindrical third dipole magnets (551) were equal to each other, said distances being 5 mm.

The square-shaped supporting matrix (533) had the following dimensions: 30 mm×30 mm×6 mm and was made of polyoxymethylene (POM). The square-shaped supporting matrix (533) comprised twelve cubic indentations for holding the nine cylindrical first dipole magnets ($531_{a1}, \ldots, 531_{a9}$) and the three cylindrical third dipole magnets (551), said indentations having the following dimensions: 2 mm×2 mm×2 mm so that the uppermost surface of said twelve cylindrical dipole magnets ($531_{a1}, \ldots, 531_{a9}$ and 551) was flush with the uppermost surface of the square-shaped supporting matrix (533).

The cylindrical second dipole magnet (541) had its magnetic axis substantially perpendicular to the plane (P), perpendicular to the substrate (520), substantially perpendicular to the magnetic axis of the nine cylindrical dipole magnets ($531_{a1}, \ldots, 531_{a9}$) of the first magnetic assembly (530), substantially parallel to the magnetic axis of the three cylindrical third dipole magnet (551) of the third magnetic assembly (550) with its North pole pointing towards (i.e. facing) the substrate (520). The cylindrical second dipole magnet (541) was disposed in direct contact and above the square-shaped supporting matrix (533). The square-shaped pole piece (560) had the following dimensions: 30 mm×30 mm×1 mm and was made iron.

The disc-shaped dipole magnet (571) of the fourth magnetic-field generating device (570) had the following dimensions: 15 mm (diameter)×1 mm (thickness) and was made of NdFeB N35. The disc-shaped fourth dipole magnet (571) of the fourth magnetic-field generating device (570) had its magnetic axis substantially perpendicular to the plane (P), substantially perpendicular to the substrate (520) and substantially perpendicular to the magnetic axis of the nine cylindrical first dipole magnets ($531_{a1}, \ldots, 531_{a9}$) of the first magnetic assembly (530) with its South pole pointing towards (i.e. facing) the substrate (520).

The center of the first magnetic-field generating device (530) and the center of the second magnetic-field generating device (540) were substantially centered with respect to one another and were substantially centered with respect to the projection point ($C_{541}$) of the center of the cylindrical dipole magnet (541). The center of the square-shaped pole piece (560) and the center of the disc-shaped fourth dipole magnet (571) were substantially centered with respect to one another and were substantially centered with respect to the projection point ($C_{541}$) of the center of the cylindrical dipole magnet (541).

The distance (e) from the uppermost surface of the second magnetic-field generating device (540), i.e. the uppermost surface of the cylindrical second dipole magnet (541), and the lowermost surface of the substrate (520) facing the device (500) was 0.6 mm.

The distance (d) (not shown in FIG. 5A for clarity purpose) from the uppermost surface of the first magnetic-field generating device (530), i.e. the uppermost surface of the twelve cylindrical dipole magnets (531 and 551) of the first and third magnetic-field generating devices (530 and 550) (also corresponding to the uppermost surface of the square-shaped supporting matrix (533)), and the lowermost surface of the second magnetic-field generating device (540), i.e. the lowermost surface of the cylindrical dipole magnet (541), was 0 mm.

The distance (f) from the lowermost surface of the first magnetic-field generating device (530), i.e. the lowermost surface of the square-shaped supporting matrix (533), and the uppermost surface of the square-shaped pole piece (560) was 0 mm, i.e. the square-shaped supporting matrix (533) and the square-shaped pole piece (560) were in direct contact (the distance from the lowermost surface of the twelve cylindrical dipole magnets (531 and 551) and the uppermost surface of the square-shaped pole piece (560) was about 4 mm).

The distance (h) from the lowermost surface of the square-shaped pole piece (560) and the uppermost surface of the fourth magnetic-field generating device (570), i.e. the uppermost surface of the disc-shaped fourth dipole magnet (571), was 0 mm, i.e. the square-shaped pole piece (560) and the disc-shaped fourth dipole magnet (571) were in direct contact.

The resulting OEL produced with the magnetic assembly (500) illustrated in FIG. 5A-B is shown in FIG. 5C at different viewing angles by tilting the substrate (520) between −20° and +20°. The so-obtained OEL provides the optical impression of a ring surrounded by three loop-shaped bodies having their shape and their brightness varying upon tilting the optical effect layer (OEL).

Example 5 (FIG. 6A-C)

The magnetic assembly (600) used to prepare the optical effect layer (OEL) of Example 5 on the substrate (620) is illustrated in FIG. 6A-B. The magnetic assembly (600) was configured for receiving the substrate (620) in an orientation parallel to a first plane (P).

The magnetic assembly (600) comprised a first magnetic-field generating device (630) comprising three cubic first dipole magnets (631$_{a1}$, 631$_{a2}$, 631$_{a3}$) embedded in a square-shaped supporting matrix (633) a second magnetic-field generating device (640) comprising a cylindrical dipole magnet (641), a square-shaped pole piece (660) and a fourth magnetic-field generating device (670) comprising a disc-shaped fourth dipole magnet (671). The second magnetic-field generating device (640) was disposed above the first magnetic-field generating device (630), the first magnetic-field generating device (630) was disposed above the square-shaped pole piece (660) and the square-shaped pole piece (660) was disposed above the fourth magnetic-field generating device (670).

The three cubic first dipole magnets (631$_{a1}$, 631$_{a2}$, 631$_{a3}$) of the first magnetic-field generating device (630) had the following dimensions: 3 mm×3 mm×3 mm and were made of NdFeB N45. As shown in FIG. 6B, the three cubic first dipole magnets (631$_{a1}$, 631$_{a2}$, 631$_{a3}$) were arranged in such a way that each center ($C_{631-a1}$, $C_{631-a2}$ and $C_{631-a3}$) was disposed on a ring (632) in the plane (P) being substantially parallel to the substrate (620).

The cylindrical second dipole magnet (641) of the second magnetic-field generating device (640) had the following dimensions: 4 mm (X, diameter)×3 mm (Z, thickness) and was made of NdFeB N45. The projection of the center of the cylindrical second dipole magnet (641) on the plane (P) was located at the projection point ($C_{641}$) and was symmetrically disposed within the ring (632), i.e. the projection point ($C_{641}$) also corresponded to the center of the symmetric the ring (632).

The three cubic first dipole magnets (631$_{a1}$, 631$_{a2}$, 631$_{a3}$) of the first magnetic-field generating device (630) had their magnetic axes substantially parallel to the plane (P), substantially parallel to the substrate (620) and substantially perpendicular to the magnetic axis of the cylindrical second dipole magnet (641) of the second magnetic-field generating device (640). As shown in FIG. 6B, the three cubic first dipole magnets (631$_{a1}$, 631$_{a2}$, 631$_{a3}$) had their North pole pointing all in the same circular direction (i.e. counterclockwise circular direction).

The oriented three angles $\alpha_{1/2/3}$ respectively formed by i) the vectors ($\overrightarrow{C_{641}C_{631-a1}}$, $\overrightarrow{C_{641}C_{631-a2}}$, $\overrightarrow{C_{241}C_{631-a2}}$) (i.e. the vectors between the projection point ($C_{641}$) and the center ($C_{631-a1}$, $C_{631-a2}$ and $C_{631-a3}$) of each respective first dipole magnet of the first magnetic-field generating device (630)) and ii) the vectors ($\overrightarrow{h_{631-a1}}$, $\overrightarrow{h_{631-a2}}$, $\overrightarrow{h_{631-a3}}$), when measured in a counterclockwise direction, were equal to each other, in particular 90°, i.e. the three first dipole magnets (631$_{a1}$, 631$_{a2}$, 631$_{a3}$) had their magnetic axes substantially tangential to the ring (632) at the position of their respective center ($C_{631-a1}$, $C_{631-a2}$ and $C_{631-a3}$).

The three cubic first dipole magnets (631$_{a1}$, 631$_{a2}$, 631$_{a3}$) were evenly distributed around the projection point ($C_{641}$) of the center of the cylindrical dipole magnet (641). The three angles β respectively formed by the vectors $\overrightarrow{C_{641}C_{631-a1}}$ (corresponding to the straight line from the projection point ($C_{641}$) to the center $C_{631-a1}$ of the cubic first dipole magnet (631$_{a1}$)) and $\overrightarrow{C_{641}C_{631-a2}}$; the vectors $\overrightarrow{C_{641}C_{631-a2}}$ and $\overrightarrow{C_{641}C_{631-a3}}$; and the vectors $\overrightarrow{C_{641}C_{631-a3}}$ and $\overrightarrow{C_{641}C_{631-a1}}$ were equal to each other, in particular 120°.

The distances Y between the projection point ($C_{641}$) of the center of the cylindrical second dipole magnet (641) and the center ($C_{631-a1}$, $C_{631-a2}$ and $C_{631-a3}$) of each of said three cubic first dipole magnets (631$_{a1}$, 631$_{a2}$, 631$_{a3}$) were equal to each other, said distances being 3.5 mm.

The square-shaped supporting matrix (633) had the following dimensions: 30 mm×30 mm×5.5 mm and was made of polyoxymethylene (POM). The square-shaped supporting matrix (633) comprised three indentations for holding the three cubic first dipole magnets (631$_{a1}$, 631$_{a2}$, 631$_{a3}$), said indentations having the same shape and dimensions as said three cubic first dipole magnets (631$_{a1}$, 631$_{a2}$, 631$_{a3}$) so that the uppermost surface of said three cubic first dipole magnets (631$_{a1}$, 631$_{a2}$, 631$_{a3}$) was flush with the uppermost surface of the square-shaped supporting matrix (633).

The cylindrical second dipole magnet (641) had its magnetic axis substantially perpendicular to the plane (P) and substantially perpendicular to the substrate (620) with its North pole pointing towards (i.e. facing) the substrate (620). The cylindrical second dipole magnet (641) was disposed in direct contact and above the square-shaped supporting matrix (633).

The square-shaped pole piece (660) had the following dimensions: 30 mm×30 mm×1 mm and was made of iron.

The disc-shaped fourth dipole magnet (671) of the fourth magnetic-field generating device (670) had the following dimensions: 20 mm (diameter)×1.5 mm (thickness) and was made of NdFeB N40. The disc-shaped fourth dipole magnet (671) of the fourth magnetic-field generating device (670) had its magnetic axis substantially perpendicular to the plane (P), substantially perpendicular to the substrate (620) and substantially perpendicular to the magnetic axis of the three cylindrical first dipole magnets (631$_{a1}$, 631$_{a2}$, 631$_{a3}$) of the first magnetic assembly (630) with its North pole pointing towards (i.e. facing) the substrate (620).

The center of the first magnetic-field generating device (630) and the center of the second magnetic-field generating device (640) were substantially centered with respect to one another and were substantially centered with respect to the projection point ($C_{641}$) of the center of the cylindrical dipole magnet (641). The center of the square-shaped pole piece (660) and the center of the disc-shaped fourth dipole magnet (671) were substantially centered with respect to one another and were substantially centered with respect to the projection point ($C_{641}$) of the center of the cylindrical dipole magnet (641).

The distance (e) from the uppermost surface of the second magnetic-field generating device (340), i.e. the uppermost surface of the cylindrical second dipole magnet (641), and the lowermost surface of the substrate (620) facing the device (600) was 0.6 mm.

The distance (d) (not shown in FIG. 6A for clarity purpose) from the uppermost surface of the first magnetic-field generating device (630), i.e. the uppermost surface of the three cubic first dipole magnets ($631_{a1}$, $631_{a2}$, $631_{a3}$) of the first magnetic-field generating device (630) (also corresponding to the uppermost surface of the square-shaped supporting matrix (633), and the lowermost surface of the second magnetic-field generating device (640), i.e. the lowermost surface of the cylindrical dipole magnet (641), was 0 mm.

The distance (f) from the lowermost surface of the first magnetic-field generating device (630), i.e. the lowermost surface of the square-shaped supporting matrix (633), and the uppermost surface of the square-shaped pole piece (660) was 0 mm, i.e. the square-shaped supporting matrix (633) and the square-shaped pole piece (660) were in direct contact (the distance from the lowermost surface of the three cubic first dipole magnets ($631_{a1}$, $631_{a2}$, $631_{a3}$) and the uppermost surface of the square-shaped pole piece (660) was about 2.5 mm).

The distance (h) from the lowermost surface of the square-shaped pole piece (660) and the uppermost surface of the fourth magnetic-field generating device (670), i.e. the lowermost surface of the disc-shaped fourth dipole magnet (671), was 0 mm, i.e. the square-shaped pole piece (660) and the disc-shaped fourth dipole magnet (671) were in direct contact.

The resulting OEL produced with the magnetic assembly (600) illustrated in FIG. 6A-B is shown in FIG. 6C at different viewing angles by tilting the substrate (620) between −20° and +20°. The so-obtained OEL provides the optical impression of a ring surrounded by more than one loop-shaped bodies having their shape and their brightness varying upon tilting the optical effect layer (OEL).

Example 6 (FIG. 7A-C)

The magnetic assembly (700) used to prepare the optical effect layer (OEL) of Example 6 on the substrate (720) is illustrated in FIG. 7A-B. The magnetic assembly (700) was configured for receiving the substrate (720) in an orientation parallel to a first plane (P).

The magnetic assembly (700) comprised a first magnetic-field generating device (730) comprising six parallelepiped first dipole magnets ($731_{a1}$, ..., $731_{a6}$) embedded in a square-shaped supporting matrix (733), a second magnetic-field generating device (740) comprising a cylindrical dipole magnet (741), a square-shaped pole piece (760) and a fourth magnetic-field generating device (770) comprising a disc-shaped fourth dipole magnet (771). The second magnetic-field generating device (740) was disposed above the first magnetic-field generating device (730), the first magnetic-field generating device (730) was disposed above the square-shaped pole piece (760) and the square-shaped pole piece (760) was disposed above the fourth magnetic-field generating device (770).

The six parallelepiped first dipole magnets ($731_{a1}$, ..., $731_{a6}$) of the first magnetic-field generating device (730) had the following dimensions: 10 mm×4 mm×1 mm and were made of NdFeB N45. As shown in FIG. 7B, the six parallelepiped first dipole magnets ($731_{a1}$, ..., $731_{a6}$) were arranged in such a way that each center ($C_{731-a1}$, ..., $C_{731-a6}$) was disposed on a ring (732) in the plane (P) being substantially parallel to the substrate (720).

The cylindrical second dipole magnet (741) of the second magnetic-field generating device (740) had the following dimensions: 3 mm (X, diameter)×3 mm (Z, thickness) and was made of NdFeB N45. The projection of the center of the cylindrical second dipole magnet (741) on the plane (P) was located at the projection point ($C_{741}$) and was symmetrically disposed within the ring (732), i.e. the projection point (741) also corresponded to the center of the symmetric the ring (732).

The six parallelepiped first dipole magnets ($731_{a1}$, ..., $731_{a6}$) of the first magnetic-field generating device (730) had their magnetic axes substantially parallel to the plane (P), substantially parallel to the substrate (720) and substantially perpendicular to the magnetic axis of the cylindrical second dipole magnet (741) of the second magnetic-field generating device (740). As shown in FIG. 7B, the six parallelepiped first dipole magnets ($731_{a1}$, ..., $731_{a6}$) had their North pole pointing to the North pole of the adjacent dipole magnet and their South pole pointing to the South pole of the adjacent dipole magnet.

The three angles $\alpha_{1/3/5}$ respectively formed by i) the vectors ($\overrightarrow{C_{741}C_{731-a1}}$, $\overrightarrow{C_{741}C_{731-a3}}$, $\overrightarrow{C_{741}C_{731-a5}}$) (i.e. the vectors between the projection point ($C_{741}$) and the center ($C_{731-a1}$, $C_{731-a3}$ and $C_{731-a5}$) of each respective first dipole magnet of the first magnetic-field generating device (730)) and ii) the vectors ($\overrightarrow{h_{731-a1}}$, $\overrightarrow{h_{731-a3}}$, $\overrightarrow{h_{731-a5}}$), when measured in a counterclockwise direction, were equal to each other, in particular 90°, i.e. the three first dipole magnets ($731_{a1}$, $731_{a3}$, $731_{a5}$) had their magnetic axes substantially tangential to the ring (732) at the position of their respective center ($C_{731-a1}$, $C_{731-a3}$ and $C_{731-a5}$). The three angles $\alpha_{2/4/6}$ respectively formed by i) the vectors ($\overrightarrow{C_{741}C_{731-a2}}$, $\overrightarrow{C_{741}C_{731-a4}}$, $\overrightarrow{C_{741}C_{731-a6}}$) (i.e. the vectors between the projection point ($C_{241}$) and the center ($C_{731-a2}$, $C_{731-a4}$ and $C_{731-a6}$) of each respective first dipole magnet of the first magnetic-field generating device (730)) and ii) the vectors ($\overrightarrow{h_{731-a2}}$, $\overrightarrow{h_{731-a4}}$, $\overrightarrow{h_{731-a6}}$) ; when measured in a counterclockwise direction, were equal to each other, in particular 270°, i.e. the three first dipole magnets ($731_{a2}$, $731_{a4}$, $731_{a6}$) had their magnetic axes substantially tangential to the ring (732) at the position of their respective center ($C_{731-a2}$, $C_{731-a4}$ and $C_{731-a6}$).

The six parallelepiped first dipole magnets ($731_{a1}$, ..., $731_{a6}$) were evenly distributed around the projection point ($C_{741}$) of the center of the cylindrical dipole magnet (741). The six angles β respectively formed by the vectors $\overrightarrow{C_{741}C_{731-a1}}$ (corresponding to the straight line from the projection point ($C_{741}$) to the center $C_{731-a1}$ of the parallelepiped first dipole magnet ($731_{a1}$)) and $\overrightarrow{C_{741}C_{731\text{-}a}}$; the vectors $\overrightarrow{C_{741}C_{731\text{-}a}}$ and $\overrightarrow{C_{741}C_{731\text{-}a3}}$; the vectors $\overrightarrow{C_{741}C_{731\text{-}a3}}$ and $\overrightarrow{C_{741}C_{731\text{-}a4}}$; the vectors $\overrightarrow{C_{741}C_{731\text{-}a4}}$ and $\overrightarrow{C_{741}C_{731\text{-}a5}}$; the vectors $\overrightarrow{C_{741}C_{731\text{-}a5}}$ and $\overrightarrow{C_{741}C_{731\text{-}a6}}$; and the vectors $\overrightarrow{C_{741}C_{731\text{-}a6}}$ and $\overrightarrow{C_{741}C_{731\text{-}a1}}$ were equal to each other, in particular 60°.

The distances Y between the projection point ($C_{741}$) of the center of the cylindrical second dipole magnet (741) and the center ($C_{731\text{-}a1}, \ldots, C_{731\text{-}a6}$) of each of said six parallelepiped first dipole magnets ($731_{a1}, \ldots, 731_{a6}$) were equal to each other, said distances Y being 5.9 mm.

The square-shaped supporting matrix (733) had the following dimensions: 30 mm×30 mm×6 mm and was made of polyoxymethylene (POM). The square-shaped supporting matrix (733) comprised six indentations for holding the six parallelepiped first dipole magnets ($731_{a1}, \ldots, 731_{a6}$), said indentations having the same shape and dimensions as said six parallelepiped first dipole magnets ($731_{a1}, \ldots, 731_{a6}$) so that the top of said six parallelepiped first dipole magnets ($731_{a1}, \ldots, 731_{a6}$) was flush with the uppermost surface of the square-shaped supporting matrix (733).

The cylindrical second dipole magnet had its magnetic axis substantially perpendicular to the plane (P), substantially perpendicular to the substrate (720) and substantially perpendicular to the magnetic axis of the six parallelepiped first dipole magnets ($731_{a1}, \ldots, 731_{a6}$) of the magnetic assembly (730) with its North pole pointing towards (i.e. facing) the substrate (720). The cylindrical second dipole magnet (741) was disposed in direct contact and above the square-shaped supporting matrix (733).

The square-shaped pole piece (760) had the following dimensions: 30 mm×30 mm×1 mm and was made of iron.

The disc-shaped fourth dipole magnet (771) of the fourth magnetic-field generating device (770) had the following dimensions: 20 mm (diameter)×4 mm (thickness) and was made of NdFeB N45. The disc-shaped fourth dipole magnet (771) of the fourth magnetic-field generating device (770) had its magnetic axis substantially perpendicular to the plane (P), substantially perpendicular to the substrate (720) and substantially perpendicular to the magnetic axis of the six parallelepiped first dipole magnets ($731_{a1}, \ldots, 731_{a6}$) of the first magnetic assembly (730) with its North pole pointing towards (i.e. facing) the substrate (720).

The center of the first magnetic-field generating device (730) and the center of the second magnetic-field generating device (740) were substantially centered with respect to one another and were substantially centered with respect to the projection point ($C_{741}$) of the center of the cylindrical dipole magnet (741). The center of the square-shaped pole piece (760) and the center of the disc-shaped fourth dipole magnet (771) were substantially centered with respect to one another and were substantially centered with respect to the projection point ($C_{741}$) of the center of the cylindrical dipole magnet (741).

The distance (e) from the uppermost surface of the second magnetic-field generating device (740) and the lowermost surface of the substrate (720) facing the device (700) was 0.4 mm, i.e. the distance from the uppermost surface of the cylindrical second dipole magnet (741) of the second magnetic-field generating device (740) and the lowermost surface of the substrate (720) was 0.4 mm.

The distance (d) (not shown in FIG. 7A for clarity purpose) from the uppermost surface of the first magnetic-field generating device (730), i.e. the uppermost surface of the six parallelepiped first dipole magnets ($731_{a1}, \ldots, 731_{a6}$) (also corresponding to the uppermost surface of the square-shaped supporting matrix (733)), and the lowermost surface of the second magnetic-field generating device (440), i.e. the lowermost surface of the cylindrical dipole magnet (741), was 0 mm.

The distance (f) from the lowermost surface of the first magnetic-field generating device (730), i.e. the lowermost surface of the supporting matrix (733), and the uppermost surface of the square-shaped pole piece (760) was 0 mm, i.e. the square-shaped supporting matrix (733) and the square-shaped pole piece (760) were in direct contact (the distance from the lowermost surface of the six parallelepiped first dipole magnets ($731_{a1}, \ldots, 731_{a6}$) and the uppermost surface of the square-shaped pole piece (760) was about 2 mm).

The distance (h) from the lowermost surface of the square-shaped pole piece (760) and the uppermost surface of the fourth magnetic-field generating device (770), i.e. the uppermost surface of the disc-shaped fourth dipole magnet (771), was 0 mm, i.e. the square-shaped pole piece (760) and the disc-shaped fourth dipole magnet (771) were in direct contact.

The resulting OEL produced with the magnetic assembly (700) illustrated in FIG. 7A-B is shown in FIG. 7C at different viewing angles by tilting the substrate (720) between −20° and +20°. The so-obtained OEL provides the optical impression of a ring surrounded by three loop-shaped bodies having their shape and their brightness varying upon tilting the optical effect layer (OEL).

Example 7 (FIG. 8A-C)

The magnetic assembly (800) used to prepare the optical effect layer (OEL) of Example 7 on the substrate (820) is illustrated in FIG. 8A-B. The magnetic assembly (800) was configured for receiving the substrate (820) in an orientation parallel to a first plane (P).

The magnetic assembly (800) comprised a first magnetic-field generating device (830) comprising six cylindrical first dipole magnets ($831_{a1}, \ldots, 831_{a6}$) embedded in a square-shaped supporting matrix (833), a second magnetic-field generating device (840) comprising a cylindrical first dipole magnet (841) a square-shaped pole piece (860) and a fourth magnetic-field generating device (870) comprising a disc-shaped fourth dipole magnet (871). The second magnetic-field generating device (840) was disposed above the first magnetic-field generating device (830), the first magnetic-field generating device (830) was disposed above the square-shaped pole piece (860) and the square-shaped pole piece (860) was disposed above the fourth magnetic-field generating device (870).

The six cylindrical first dipole magnets ($831_{a1}, \ldots, 831_{a6}$) of the first magnetic-field generating device (830) had the following dimensions: 2 mm (diameter)×4 mm (length) and were made of NdFeB N45. As shown in FIG. 8B, the six cylindrical first dipole magnets ($831_{a1}, , 831_{a6}$) were arranged in such a way that each center ($C_{831\text{-}a1}, \ldots, C_{831\text{-}a6}$) was disposed on a ring (832) in the plane (P) being substantially parallel to the substrate (820).

The cylindrical second dipole magnet (841) of the second magnetic-field generating device (840) had the following dimensions: 4 mm (X, diameter)×2 mm (Z, thickness) and was made of NdFeB N45. The projection of the center of the cylindrical second dipole magnet (841) on the plane (P) was located at the projection point ($C_{841}$) and was symmetrically disposed within the ring (832), i.e. the projection point ($C_{841}$) also corresponded to the center of the symmetric the ring (832).

The six cylindrical first dipole magnets ($831_{a1}, \ldots, 831_{a6}$) of the first magnetic-field generating device (830) had their magnetic axes substantially parallel to the plane (P), substantially parallel to the substrate (820) and substantially perpendicular to the magnetic axis of the cylindrical second dipole magnet (841) of the second magnetic-field generating device (840). As shown in FIG. 8B, the six cylindrical first dipole magnets ($831_{a1}, \ldots, 831_{a6}$) had their North pole pointing all in the same circular direction (i.e. counterclockwise circular direction).

The six angles $\alpha_{1-6}$ respectively formed by i) the vectors ($\overrightarrow{C_{841}C_{831-a1}}, \ldots, \overrightarrow{C_{841}C_{831-a6}}$) (i.e. the vectors between the projection point ($C_{841}$) and the center ($C_{831-a1}, \ldots, C_{831-a9}$) of each respective dipole magnet of the first magnetic-field generating device (830)) and ii) the vectors ($\overrightarrow{h_{431-a1}}, \ldots, \overrightarrow{h_{431-a8}}$) when measured in a counterclockwise direction, were equal to each other, in particular 225°.

The six cylindrical first dipole magnets ($831_{a1}, 831_{a6}$) were evenly distributed around the projection point ($C_{841}$) of the center of the cylindrical second dipole magnet (841). The six angles β respectively formed by the vectors $\overrightarrow{C_{841}C_{831-a1}}$ (corresponding to the straight line from the projection point ($C_{841}$) to the center $C_{831-a1}$ of the cylindrical first dipole magnet ($831_{a1}$)) and $\overrightarrow{C_{841}C_{831-a2}}$; the vectors $\overrightarrow{C_{841}C_{831-a2}}$ and $\overrightarrow{C_{841}C_{831-a3}}$; the vectors $\overrightarrow{C_{841}C_{831-a3}}$ and $\overrightarrow{C_{841}C_{831-a4}}$; the vectors $\overrightarrow{C_{841}C_{831-a4}}$ and $\overrightarrow{C_{841}C_{831-a5}}$; the vectors $\overrightarrow{C_{841}C_{831-a5}}$ and $\overrightarrow{C_{841}C_{831-a6}}$, and the vectors $\overrightarrow{C_{841}C_{831-a6}}$ and $\overrightarrow{C_{841}C_{831-a1}}$ were equal to each other, in particular 60°.

The distances Y between the projection point ($C_{841}$) of the center of the cylindrical second dipole magnet (841) and the center ($C_{831-a1}, \ldots, C_{831-a6}$) of each of said six cylindrical first dipole magnets ($831_{a1}, \ldots, 831_{a6}$) were equal to each other, said distances Y being 4 mm.

The square-shaped supporting matrix (833) had the following dimensions: 30 mm×30 mm×4 mm and was made of polyoxymethylene (POM). The square-shaped supporting matrix (833) comprised six parallelepiped indentations for holding the six cylindrical dipole magnets ($831_{a1}, \ldots, 831_{a6}$), said indentations having the following dimensions: 2 mm×2 mm×4 mm so that the top of said six cylindrical dipole magnets ($831_{a1}, \ldots, 831_{a6}$) was flush with the uppermost surface of the square-shaped supporting matrix (833).

The cylindrical second dipole magnet (841) had its magnetic axis substantially perpendicular to the plane (P), perpendicular to the substrate (820), and substantially perpendicular to the magnetic axis of the six first cylindrical dipole magnets ($831_{a1}, \ldots, 831_{a6}$) of the first magnetic assembly (830) with its North pole pointing towards (i.e. facing) the substrate (820). The cylindrical second dipole magnet (841) was disposed in direct contact and above the square-shaped supporting matrix (833).

The square-shaped pole piece (860) had the following dimensions: 30 mm×30 mm×1 mm and was made of iron.

The disc-shaped fourth dipole magnet (871) of the fourth magnetic-field generating device (870) had the following dimensions: 20 mm (diameter)×3 mm (thickness) and was made of NdFeB N40. The disc-shaped fourth dipole magnet (871) of the third magnetic-field generating to the plane (P), substantially perpendicular to the substrate (820), substantially perpendicular to the magnetic axis of the six first cylindrical dipole magnets ($831_{a1}, \ldots, 831_{a6}$) of the first magnetic assembly (830) and substantially parallel to the magnetic axis of the cylindrical second dipole magnet (841) of the second magnetic assembly (840) with its North pole pointing towards (i.e. facing) the substrate (820).

The center of the first magnetic-field generating device (830) and the center of the second magnetic-field generating device (840) were substantially centered with respect to one another and were substantially centered with respect to the projection point ($C_{841}$) of the center of the cylindrical dipole magnet (541). The center of the square-shaped pole piece (860) and the center of the disc-shaped fourth dipole magnet (871) were substantially centered with respect to one another and were substantially centered with respect to the projection point ($C_{841}$) of the center of the cylindrical dipole magnet (841).

The distance (e) from the uppermost surface of the second magnetic-field generating device (840), i.e. the uppermost surface of the cylindrical second dipole magnet (841), and the lowermost surface of the substrate (820) facing the device (800) was 0.4 mm.

The distance (d) from the uppermost surface of the first magnetic-field generating device (830), i.e. the uppermost surface of the six cylindrical first dipole magnets ($831_{a1}, \ldots, 831_{a6}$) (also corresponding to the uppermost surface of the square-shaped supporting matrix (833)) and the lowermost surface of the second magnetic-field generating device (840), i.e. the lowermost surface of the cylindrical second dipole magnet (841) was 0 mm.

The distance (f) from the lowermost surface of the first magnetic-field generating device (830), i.e. the lowermost surface of the square-shaped supporting matrix (833), and the uppermost surface of the square-shaped pole piece (860) was 0 mm, i.e. the square-shaped supporting matrix (833) and the square-shaped pole piece (860) were in direct contact (the distance from the lowermost surface of the six cylindrical dipole magnets ($831_{a1}, \ldots, 831_{a6}$) and the uppermost surface of the square-shaped pole piece (860) was about 2 mm).

The distance (h) from the lowermost surface of the square-shaped pole piece (860) and the uppermost surface of the fourth magnetic-field generating device (870), i.e. the uppermost surface of the disc-shaped fourth dipole magnet (871), was 0 mm, i.e. the square-shaped pole piece (860) and the disc-shaped fourth dipole magnet (871) were in direct contact.

The resulting OEL produced with the magnetic assembly (800) illustrated in FIG. 8A-B is shown in FIG. 8C at different viewing angles by tilting the substrate (820) between −20° and +20°. The so-obtained OEL provides the optical impression of a ring surrounded by six loop-shaped bodies having their shape and brightness varying upon tilting the optical effect layer (OEL).

Example 8 (FIG. 9A-C)

The magnetic assembly (900) used to prepare the optical effect layer (OEL) of Example 8 on the substrate (920) is illustrated in FIG. 9A-B. The magnetic assembly (900) was configured for receiving the substrate (920) in an orientation parallel to a first plane (P).

The magnetic assembly (900) comprised a first magnetic-field generating device (930) comprising six cylindrical first dipole magnets ($931_{a1}, \ldots, 931_{a6}$) embedded in a square-shaped supporting matrix (933), a second magnetic-field generating device (940) comprising a cylindrical second dipole magnet (941) a square-shaped pole piece (960) and a fourth magnetic-field generating device (970) comprising a disc-shaped fourth dipole magnet (971). The second magnetic-field generating device (940) was disposed above the first magnetic-field generating device (930), the first magnetic-field generating device (930) was disposed above the square-shaped pole piece (960) and the square-shaped pole piece (960) was disposed above the fourth magnetic-field generating device (970).

The six cylindrical first dipole magnets ($931_{a1}, \ldots, 931_{a6}$) of the first magnetic-field generating device (930) had the following dimensions: 2 mm (diameter)×4 mm (length) and were made of NdFeB N45. As shown in FIG. 9B, the six cylindrical first dipole magnets ($931_{a1}, \ldots, 931_{a6}$) were arranged in such a way that each center ($C_{931-a1}, \ldots, C_{931-a6}$) was disposed on a ring (932) in the plane (P) being substantially parallel to the substrate (920).

The cylindrical second dipole magnet (941) of the second magnetic-field generating device (940) had the following dimensions: 4 mm (X, diameter)×2 mm (Z, thickness) and was made of NdFeB N45. The projection of the center of the cylindrical second dipole magnet (941) on the plane (P) was located at the projection point ($C_{941}$) and was symmetrically disposed within the ring (932), i.e. the projection point ($C_{941}$) also corresponded to the center of the symmetric the ring (932).

The six cylindrical first dipole magnets ($931_{a1}, \ldots, 931_{a6}$) of the first magnetic-field generating device (930) had their magnetic axes substantially parallel to the plane (P), substantially parallel to the substrate (920) and substantially perpendicular to the magnetic axis of the cylindrical second dipole magnet (941) of the second magnetic-field generating device (940). As shown in FIG. 9B, the six cylindrical first dipole magnets ($931_{a1}, \ldots, 931_{a6}$) had their North pole pointing to the North pole of the adjacent dipole magnet and their South pole pointing to the South pole of the adjacent dipole magnet.

The three angles $\alpha_{1/3/5}$ respectively formed by i) the vectors ($\overrightarrow{C_{941}C_{931-a1}}, \overrightarrow{C_{941}C_{931-a3}}, \overrightarrow{C_{741}C_{931-a5}}$) (i.e. the vectors between the projection point ($C_{941}$) and the center ($C_{931-a1}, C_{931-a3}$ and $C_{931-a5}$) of each respective first dipole magnet of the first magnetic-field generating device (930)) and ii) the vectors ($\vec{h}_{931-a1}, \vec{h}_{931-a3}, \vec{h}_{931-a5}$), when measured in a counterclockwise direction, were equal to each other, in particular 225°. The three angles $\alpha_{2/4/6}$ respectively formed by i) the vectors ($\overrightarrow{C_{941}C_{931-a2}}, \overrightarrow{C_{741}C_{931-a4}}, \overrightarrow{C_{941}C_{931-a6}}$) (i.e. the vectors between the projection point ($C_{941}$) and the center ($C_{931-a2}, C_{931-a4}$ and $C_{931-a6}$) of each respective first dipole magnet of the first magnetic-field generating device (930)) and ii) the vector ($\vec{h}_{931-a2}, \vec{h}_{931-a4}, \vec{h}_{931-a6}$), when measured in a counterclockwise direction, were equal to each other, in particular 45°.

The six cylindrical first dipole magnets ($931_{a1}, 931_{a6}$) were evenly distributed around the projection point ($C_{841}$) of the center of the cylindrical second dipole magnet (941). The six angles β respectively formed by the vectors $\overrightarrow{C_{941}C_{931-a1}}$ (corresponding to the straight line from the projection point ($C_{941}$) to the center $C_{931-a1}$ of the cylindrical first dipole magnet ($931_{a1}$)) and $\overrightarrow{C_{941}C_{931-a}}$; the vectors $\overrightarrow{C_{941}C_{931-a2}}$ and $\overrightarrow{C_{941}C_{931-a3}}$; the vectors $\overrightarrow{C_{941}C_{931-a3}}$ and $\overrightarrow{C_{941}C_{931-a4}}$; the vectors $\overrightarrow{C_{941}C_{931-a4}}$ and $\overrightarrow{C_{941}C_{931-a5}}$; the vectors $\overrightarrow{C_{941}C_{831-a5}}$ and $\overrightarrow{C_{941}C_{931-a6}}$; and the vectors $\overrightarrow{C_{941}C_{931-a6}}$ and $\overrightarrow{C_{941}C_{931-a1}}$ were equal to each other, in particular 60°.

The distances Y between the projection point ($C_{941}$) of the center of the cylindrical second dipole magnet (941) and the center ($C_{931-a1}, \ldots, C_{931-a6}$) of each of said six cylindrical first dipole magnets ($931_{a1}, \ldots, 931_{a6}$) were equal to each other, said distances Y being 4 mm.

The square-shaped supporting matrix (933) had the following dimensions: 30 mm×30 mm×4 mm and was made of polyoxymethylene (POM). The square-shaped supporting matrix (933) comprised six parallelepiped indentations for holding the six cylindrical dipole magnets ($931_{a1}, \ldots, C_{931-a6}$), said indentations having following dimensions: 2 mm×2 mm×4 mm so that the top of said six cylindrical dipole magnets ($931_{a1}, \ldots, 931_{a6}$) was flush with the uppermost surface of the square-shaped supporting matrix (933).

The cylindrical second dipole magnet (941) had its magnetic axis substantially perpendicular to the plane (P), perpendicular to the substrate (920) and substantially perpendicular to the magnetic axis of the six first cylindrical dipole magnets ($931_{a1}, \ldots, 931_{a6}$) of the first magnetic assembly (930) with its North pole pointing towards (i.e. facing) the substrate (920). The cylindrical second dipole magnet (941) was disposed in direct contact and above the supporting matrix (933).

The square-shaped pole piece (960) had the following dimensions: 30 mm×30 mm×1 mm and was made of iron.

The disc-shaped fourth dipole magnet (971) of the fourth magnetic-field generating device (970) had the following dimensions: 20 mm (diameter)×3 mm (thickness) and was made of NdFeB N45. The disc-shaped fourth dipole magnet (971) of the third magnetic-field generating to the plane (P), substantially perpendicular to the substrate (920), substantially perpendicular to the magnetic axis of the six first cylindrical dipole magnets ($931_{a1}, \ldots, 931_{a6}$) of the first magnetic assembly (930) and substantially parallel to the magnetic axis of the cylindrical second dipole magnet (941) of the second magnetic assembly (940) with its North pole pointing towards (i.e. facing) the substrate (920).

The center of the first magnetic-field generating device (930) and the center of the second magnetic-field generating device (940) were substantially centered with respect to one another and were substantially centered with respect to the projection point ($C_{941}$) of the center of the cylindrical dipole magnet (941). The center of the square-shaped pole piece (960) and the center of the disc-shaped fourth dipole magnet (971) were substantially centered with respect to one another and were substantially centered with respect to the projection point ($C_{941}$) of the center of the cylindrical dipole magnet (941).

The distance (e) from the uppermost surface of the second magnetic-field generating (940), i.e. the uppermost surface of the cylindrical second dipole magnet (941), and the lowermost surface of the substrate (920) facing the device (900) was 0.4 mm.

The distance (d) from the uppermost surface of the first magnetic-field generating device (930), i.e. the uppermost surface of the six cylindrical first dipole magnets ($931_{a1}, \ldots, 931_{a6}$) (also corresponding to the uppermost surface of the square-shaped supporting matrix (933)) and the lowermost surface of the second magnetic-field generating device (940), i.e. the lowermost surface of the cylindrical second dipole magnet (941), was 0 mm.

The distance (f) from the lowermost surface of the first magnetic-field generating device (930), i.e. the lowermost surface of the square-shaped supporting matrix (933), and the uppermost surface of the square-shaped pole piece (960) was 0 mm, i.e. and the square-shaped supporting matrix (933) and the square-shaped pole piece (960) were in direct contact (the distance between the lowermost surface of the six cylindrical dipole magnets ($931_{a1}, \ldots, 931_{a6}$) and the uppermost surface of the square-shaped pole piece (960) was about 2 mm).

The distance (h) from the lowermost surface of the square-shaped pole piece (960) and the uppermost surface of the fourth magnetic-field generating device (970), i.e. the lowermost surface of the disc-shaped fourth dipole magnet (971), was 0 mm, i.e. the square-shaped pole piece (960) and the disc-shaped fourth dipole magnet (971) were in direct contact.

The resulting OEL produced with the magnetic assembly (900) illustrated in FIG. 9A-B is shown in FIG. 9C at different viewing angles by tilting the substrate (920) between −20° and +20°. The so-obtained OEL provides the optical impression of a ring surrounded by three loop-shaped bodies having their shape and brightness varying upon tilting the optical effect layer (OEL).

The invention claimed is:

1. A magnetic assembly for producing an optical effect layer on a substrate, said magnetic assembly being configured for receiving the substrate in an orientation substantially parallel to a first plane and above the first plane, and further comprising:
  a) a first magnetic-field generating device comprising three or more first dipole magnets ($x31_{ai}$, each of said first dipole magnets having its center ($C_{x31-ai}$) disposed on a loop in the first plane,
  wherein said first dipole magnets ($x31_{ai}$) have their magnetic axes oriented to be substantially parallel to the first plane, wherein said first dipole magnets ($x31_{ai}$) are at least partially embedded in a supporting matrix; and
  b) a second magnetic-field generating device comprising a second dipole magnet (x41) having its magnetic axis oriented to be substantially perpendicular to the first plane and being arranged to have a projection of its center on the first plane be located at a projection point ($C_{x41}$) within the loop,
  wherein the second magnetic-field generating device is disposed above the first magnetic-field generating device,
  wherein angles $\alpha_i$ are formed between each of the vectors $\overrightarrow{C_{x41}C_{x31-ai}}$ and the vector $\vec{h}_{x31-ai}$ of the magnetic axis of the respective first dipole magnet wherein all of the angles $\alpha_i$, when measured in a counterclockwise direction, are in the range from about 20° to about 160° or in the range from about 200° to about 340°, and
  wherein each of the first dipole magnets ($x31_{ai}$) is disposed at a first distance, said first distance being on the first plane between the projection point ($C_{x41}$) and the center ($C_{x31-ai}$) of the first dipole magnet ($x31_{ai}$).

2. The magnetic assembly according to claim 1, wherein all the first distances between the projection point ($C_{x41}$) and the centers ($C_{x31-ai}$) of the first dipole magnets are equal to each other.

3. The magnetic assembly according to claim 1, wherein all the angles di are equal to each other.

4. The magnetic assembly according to claim 3, wherein all the first dipole magnets ($x31_{ai}$) have their magnetic axes substantially tangential to the loop at the position of their center ($C_{x31-ai}$).

5. The magnetic assembly according to claim 1, wherein angles $\beta_i$ are formed between the vectors $\overrightarrow{C_{x41}C_{x31-ax}}$ of $\overrightarrow{C_{x41}C_{x31-ax+1}}$ adjacent ones of the first dipole magnets ($x31_{ai}$), at least two of said angles $\beta_i$.

6. The magnetic assembly according to claim 5, wherein all of said angles $\beta_i$ are equal to each other.

7. The magnetic assembly according to claim 1, wherein the three or more first dipole magnets ($x31_{ai}$) have the same size, the same shape, the same dimensions, and/or are made of the same material.

8. The magnetic assembly according to claim 1, further comprising a third magnetic-field generating device comprising one or more third dipole magnets (x51) having their magnetic axes oriented to be substantially perpendicular to the first plane, wherein said one or more third dipole magnets (x51) are at least partially embedded in the supporting matrix, and wherein said one or more third dipole magnets (x51).

9. The magnetic assembly according to claim 8, wherein said one or more third dipole magnets (x51) have their center $C_{x51}$ in the first plane.

10. The magnetic assembly according to claim 1, further comprising one or more pole pieces, being disposed below the first magnetic-field generating device.

11. The magnetic assembly according to claim 10, wherein the one or more pole pieces are made of iron.

12. The magnetic assembly according to claim 1, further comprising a fourth magnetic-field generating device comprising a fourth dipole magnet (x71) having its magnetic axis oriented to be substantially perpendicular to the first plane and being disposed below the first magnetic-field generating device.

13. A printing apparatus comprising a rotating magnetic cylinder comprising one or more of the magnetic assemblies recited in claim 1, or a flatbed printing unit comprising one or more of the magnetic assemblies recited in claim 1, or a belt comprising one or more of the magnetic assemblies recited in claim 1.

14. A process for producing an optical effect layer on a substrate, said process comprising the steps of:
  i) applying on the substrate a radiation curable coating composition comprising non-spherical magnetic or magnetizable pigment particles, said radiation curable coating composition being in a first state so as to form a coating layer;
  ii) exposing the radiation curable coating composition to a magnetic field of a magnetic assembly recited in claim 1 so as to magnetically orient at least a part of the non-spherical magnetic or magnetizable pigment particles;
  iii) at least partially curing the radiation curable coating composition of step ii) to a second state so as to fix the non-spherical magnetic or magnetizable pigment particles in their adopted positions and orientations.

15. The process according to claim 14, wherein step iii) is carried out by UV-Vis light radiation curing.

16. The process according to claim 15, wherein step iii) is carried out partially simultaneously with the step ii).

17. The process according to claim 14, wherein at least a part of the plurality of non-spherical magnetic or magnetizable particles is constituted by non-spherical colorshifting magnetic or magnetizable pigment particles.

18. The process according to claim 17, wherein the non-spherical colorshifting magnetic or magnetizable pigments are selected from the group consisting of magnetic thin-film interference pigments, magnetic cholesteric liquid crystal pigments and mixtures thereof.

19. The process according to claim 14, wherein the non-spherical magnetic or magnetizable particles are platelet-shaped magnetic or magnetizable particles and wherein said process further comprises a step of exposing the coating layer to a dynamic magnetic field of a device so as to bi-axially orient at least a part of the platelet-shaped magnetic or magnetizable pigment particles, said step occurring prior to or at least partially simultaneously with step ii) and before step iii).

20. The magnetic assembly according to claim 1, wherein the three or more first dipole magnets ($x31_{ai}$) have the same size, the same shape, the same dimensions, and are made of the same material.

* * * * *